(12) United States Patent
Graef et al.

(10) Patent No.: US 9,022,284 B2
(45) Date of Patent: *May 5, 2015

(54) BANKING SYSTEM CONTROLLED RESPONSIVE TO DATA READ FROM DATA BEARING RECORDS

(71) Applicant: Diebold, Incorporated, North Canton, OH (US)

(72) Inventors: H. Thomas Graef, Bolivar, OH (US); Robert V. Artino, North Canton, OH (US); Rodney J. Reese, New Philadelphia, OH (US); Michael A. Meffie, North Canton, OH (US); J. Richard Hanna, Massillon, OH (US); Randall W. Jenkins, Orrville, OH (US); Mark A. Depietro, Canton, OH (US); Steven R. Davis, North Lawrence, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,495

(22) Filed: Nov. 26, 2013

(65) Prior Publication Data

US 2014/0131439 A1 May 15, 2014

Related U.S. Application Data

(60) Continuation of application No. 13/487,501, filed on Jun. 4, 2012, now Pat. No. 8,590,780, which is a (Continued)

(51) Int. Cl.
*G07F 19/00* (2006.01)
*G06Q 40/02* (2012.01)
(Continued)

(52) U.S. Cl.
CPC .............. *G07F 19/201* (2013.01); *G06Q 40/02* (2013.01); *G06Q 20/1085* (2013.01); *G07F 19/20* (2013.01); *G07F 19/202* (2013.01); *G07F 19/207* (2013.01); *G06Q 20/327* (2013.01); *G07D 1/00* (2013.01); *G07D 11/0018* (2013.01); *G07D 11/0081* (2013.01); *G07D 11/0087* (2013.01); *G07D 11/0096* (2013.01); *H01Q 1/2208* (2013.01); *Y10S 902/08* (2013.01);
(Continued)

(58) Field of Classification Search
USPC ............... 235/379; 902/8–9, 13–14; 232/43.3
See application file for complete search history.

(56) References Cited

U.S. PATENT DOCUMENTS 6,745,939 B2* 6/2004 Force et al. .................... 235/379
8,590,780 B2* 11/2013 Graef et al. .................... 235/379

*Primary Examiner* — Kristy A Haupt
(74) *Attorney, Agent, or Firm* — Diebold, Incorporated

(57) ABSTRACT

A banking system is controlled responsive to data included on data bearing records. The system includes a deposit accepting machine for accepting deposit items, such as deposit bags, currency, and checks. The deposit accepting machine includes a card reader operable to read financial account data from cards of depositors. The machine includes a RFID reader that wirelessly reads data from RFID tags on deposited items, including account number and deposit amount data. A computer credits the account for the read deposit amount. The machine, which can also dispense cash, further includes an NFC reader that can wirelessly receive cash loading data from an NFC component on a cash handler's cash transport bag. The cash loading data can include an amount of cash loaded into the machine. The machine can wirelessly transmit to the bag, dispense data that includes the amount of cash dispensed since the last cash loading.

23 Claims, 51 Drawing Sheets

Related U.S. Application Data continuation-in-part of application No. 13/135,614, filed on Jul. 11, 2011, now Pat. No. 8,191,771, which is a continuation of application No. 12/928,711, filed on Dec. 17, 2010, now Pat. No. 7,975,911, which is a continuation of application No. 12/151,731, filed on May 8, 2008, now Pat. No. 7,883,005, and a continuation-in-part of application No. 11/789,657, filed on Apr. 25, 2007, now abandoned, which is a division of application No. 10/621,433, filed on Jul. 16, 2003, now abandoned, which is a continuation-in-part of application No. 09/408,858, filed on Sep. 30, 1999, now Pat. No. 6,761,308.

(60) Provisional application No. 60/928,486, filed on May 9, 2007, provisional application No. 60/109,941, filed on Nov. 25, 1998, provisional application No. 60/135,720, filed on May 25, 1999.

(51) Int. Cl.
*G06Q 20/10* (2012.01)
*G06Q 20/32* (2012.01)
*G07D 1/00* (2006.01)
*G07D 11/00* (2006.01)
*H01Q 1/22* (2006.01)

(52) U.S. Cl.
CPC ............... *Y10S902/09* (2013.01); *Y10S 902/13* (2013.01); *Y10S 902/14* (2013.01)

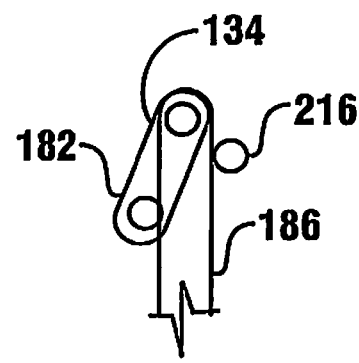
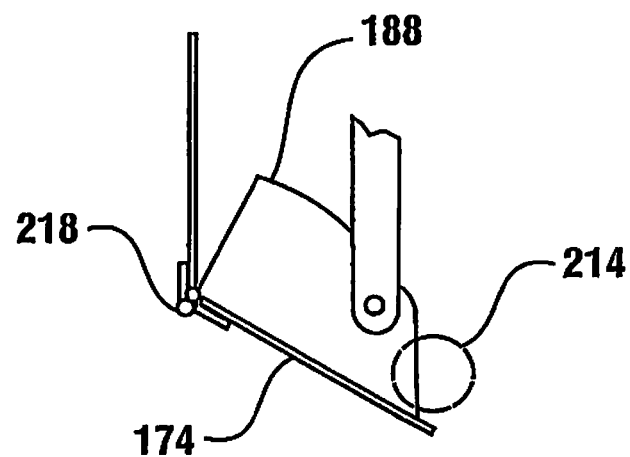
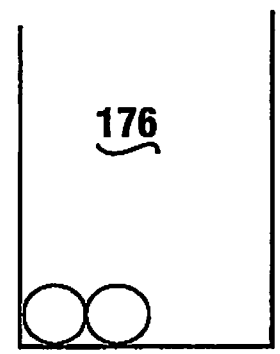
FIG. 17

```
MERCHANT BANKING CENTER
CHANGE TRANSACTION DATA

CARD #:        ************8789
NAME:      OUR TERMINAL
LOCATION:  CANTON, OH
DATE       TIME              SERIAL#
07/21/88   11:10am           0057
------------------------------------
        CHANGE REQUESTED
                  QTY      AMOUNT
$.01   ROLL       02       $1.00
$.05   ROLL       00       $0.00
$.10   ROLL       00       $0.00
$.25   ROLL       02       $20.00
$1     BILL       003      $3.00
$5     BILL       000      $0.00
$10    BILL       000      $0.00
$20    BILL       000      $0.00
------------------------------------
        CHANGE DISPENSED
                  QTY      AMOUNT
$.01   ROLL       02       $1.00
$.05   ROLL       00       $0.00
$.10   ROLL       00       $0.00
$.25   ROLL       02       $20.00
$1     BILL       003      $3.00
$5     BILL       000      $0.00
$10    BILL       000      $0.00
$20    BILL       000      $0.00
------------------------------------
CHANGE REQUESTED:          $24.00
AMOUNT ACCEPTED:           $25.00
SERVICE FEE:               $1.00
CUSTOMER RECEIVED:         $24.00
------------------------------------
```
— 396

FIG. 44

Money Exchange Transaction Receipt

Deposit Transaction Receipt

RECONCILIATION REPORT

NAME: OUR TERMINAL
TERMINAL LOCATION: CANTON, OH
DATE: Jul 17, 1998
TIME: 1:52pm
SERVICED BY: 000000000000

CHANGE DISPENSED (INC DIVERTS)

| | QTY | AMOUNT |
|---|---|---|
| .01 | 10 | $5.00 |
| .05 | 14 | $28.00 |
| .10 | 13 | $65.00 |
| .25 | 11 | $110.00 |
| $1 | 121 | $121.00 |
| $5 | 39 | $195.00 |
| $10 | 43 | $430.00 |
| $20 | 0 | $0.00 |

CHANGE AVAILABLE

| | QTY | AMOUNT |
|---|---|---|
| .01 | 500 | $245.00 |
| .05 | 500 | $972.00 |
| .10 | 500 | $2435.00 |
| .25 | 500 | $4890.00 |
| $1 | 6000 | $6679.00 |
| $5 | 3000 | $14805.00 |
| $10 | 3000 | $29570.00 |
| $20 | 0 | $0.00 |

CURRENCY ACCEPTED

| | QTY | AMOUNT |
|---|---|---|
| $1 | 0 | $0.00 |
| $2 | 0 | $0.00 |
| $5 | 2 | $10.00 |
| $10 | 7 | $70.00 |
| $20 | 50 | $1000.00 |
| $50 | 6 | $300.00 |
| $100 | 0 | $0.00 |

MISCELLANEOUS TOTALS

| | QTY | AMOUNT |
|---|---|---|
| CURRENCY DISPENSED | N/A | $854.00 |
| CURRENCY AVAILABLE | N/A | $59750.00 |
| CURRENCY ACCEPTED | 65 | $1055.00 |
| FEES ASSESSED | 21 | $40.00 |
| VOUCHERS | 0 | $0.00 |

```
              DETAILED DEPOSIT REPORT

NAME:    OUR  TERMINAL
 TERMINAL LOCATION:   CANTON. OH
 DATE:    Jul 28. 1998
 TIME:    3:16pm
 SERVICED BY:   000000000000
 -------------------------------------------

-------------------------------------------
                 DEPOSIT LOG
 -------------------------------------------

ACCOUNT #:    12345678901234567B9
 TERMINAL ID:  OUR  TERMINAL
 TERMINAL LOCATION:  CANTON. OH
 DATE:    Jul 28. 1998
 TIME:    2:27pm
 SERIAL#:    0010
 DEPOSIT BAG ID:          55555
 AMOUNT:    $450.00
 -------------------------------------------

ACCOUNT #:    12345678901234567B9
 TERMINAL ID: OUR TERMINAL
 TERMINAL LOCATION: CANTON, OH
 DATE:    Jul 28,  1998
 TIME:    2:30pm
 SERIAL#:    0012
 DEPOSIT BAG ID:          55555
 AMOUNT:    $20.00

-------------------------------------------

TOTAL DEPOSITS:    0002
 TOTAL AMOUNT:      $470.00
```
— 454

FIG. 58

```
          DEPOSIT SUMMARY REPORT
..................................................

NAME:   OUR   TERMINAL
TERMINAL  LOCATION:  CANTON,  OH
DATE:     Jul 28,  1998
TIME:    3:16pm
SERVICED BY:   000000000000

..................................................
..................................................

SUMMARY TOTALS
..................................................

TOTAL DEPOSITS:       0002
TOTAL  AMOUNT:       $470.00
```
— 452

FIG. 59

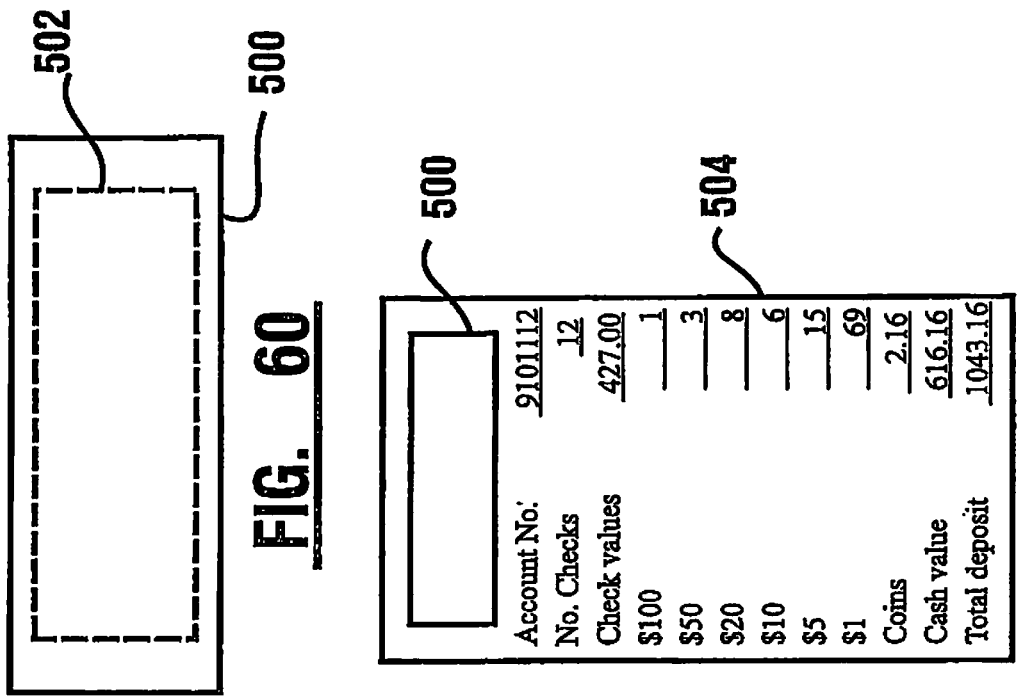

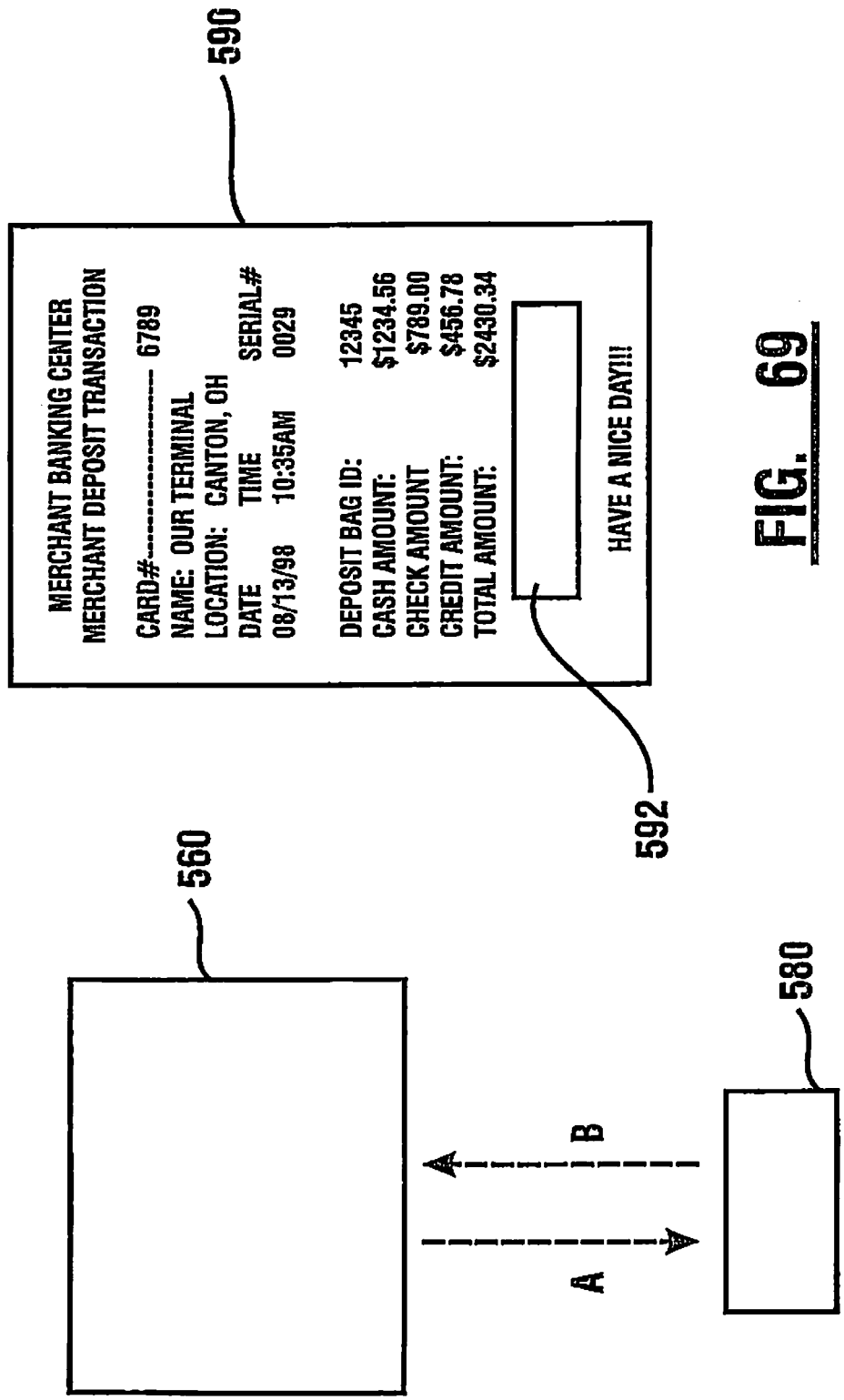

BANKING SYSTEM CONTROLLED RESPONSIVE TO DATA READ FROM DATA BEARING RECORDS

CROSS REFERENCE TO RELATED APPLICATIONS

This application is a continuation of U.S. application Ser. No. 13/487,501 filed Jun. 4, 2012, now U.S. Pat. No. 8,590,780, which is a continuation-in-part of U.S. application Ser. No. 13/135,614 filed Jul. 11, 2011, now U.S. Pat. No. 8,191,771, which is a continuation of U.S. application Ser. No. 12/928,711 filed Dec. 17, 2010, now U.S. Pat. No. 7,975,911, which is a continuation of U.S. application Ser. No. 12/151,731 filed May 8, 2008, now U.S. Pat. No. 7,883,005 which claims benefit under 35 U.S.C. §119(e) of Provisional Application 60/928,486 filed May 9, 2007. The disclosures of each of these Applications are herein incorporated by reference in their entirety.

TECHNICAL FIELD

This invention relates to banking systems that are controlled by data read from data bearing records, including user cards, and may be classified in U.S. Class 235, Subclass 379.

BACKGROUND OF INVENTION

An automated banking system comprising an automated banking machine can include a card reader that operates to read data from a bearer record such as a user card. Automated banking machines can operate to cause the data read from the card to be compared with other computer stored data related to the bearer or their financial account. The machine can operate in response to the comparison determining that the bearer record corresponds to an authorized machine user or an authorized financial account, to carry out at least one transaction which can cause transfer of value to or from at least one account. A record of the transaction is also often printed through operation of the automated banking machine and provided to the user. Automated banking machines may be used to carry out transactions such as dispensing cash, making deposits, transfer of funds between accounts and account balance inquiries. The types of banking transactions that may be carried out with an automated banking machine are determined by the capabilities of the particular banking machine and automated banking system, as well as the programming of the institution or service operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine, an automated transaction machine, or an automated teller machine (ATM) shall be deemed to include any machine that may be used to automatically carry out transactions involving transfers of value.

Automated banking systems and automated banking machines may benefit from improvements.

OBJECTS OF EXEMPLARY EMBODIMENTS

It is an object of an exemplary embodiment to provide a banking system controlled responsive to data read from data bearing records.

It is an object of an exemplary embodiment to provide an apparatus for carrying out banking transactions commonly required by customers.

It is an object of an exemplary embodiment to provide an apparatus for carrying out banking transactions commonly required by merchants.

It is a further object of an exemplary embodiment to provide an apparatus that both dispenses and receives currency in the form of notes and coins.

It is a further object of an exemplary embodiment to provide an apparatus that can exchange currency or credit for notes or coins.

It is a further object of an exemplary embodiment to provide an apparatus that accepts deposits of notes, cash, coins, credit slips, checks or other instruments.

It is a further object of an exemplary embodiment to provide an apparatus that provides an operator with written documentation of the transactions they have conducted.

It is a further object of an exemplary embodiment to provide an apparatus for carrying out merchant banking transactions that has improved capabilities.

It is a further object of an exemplary embodiment to provide an apparatus that dispenses rolled coins and which provides for retracting coins which are not taken by a user.

It is a further object of an exemplary embodiment to provide an apparatus for conducting merchant banking transactions that includes accepting deposit items that include data bearing records thereon.

It is a further object of an exemplary embodiment to provide an apparatus and system that notifies different selected entities of a variety of conditions or requirements which exist at the apparatus.

It is a further object of an exemplary embodiment to provide an apparatus which communicates transaction messages to a remote computer which includes information as to the denominations of notes and coins which make up a deposit or withdrawal.

It is a further object of an exemplary embodiment to provide an automated banking machine system which can receive depositor input via remote communication through an input device, wherein the depositor input includes data corresponding to at least one item in the deposit.

It is a further object of an exemplary embodiment to provide a method of operating an automated merchant banking apparatus.

It is a further object of an exemplary embodiment to provide apparatus and method that can reduce cash handler time spent during cash loading of an automated banking machine.

It is a further object of an exemplary embodiment to provide apparatus and method that can increase accounting accuracy regarding cash balancing of an automated banking machine.

Further objects of exemplary embodiments will be made apparent in the following Detailed Description of Exemplary Embodiments and the appended claims.

The foregoing objects are accomplished in an exemplary embodiment by an automated merchant banking apparatus. The apparatus includes a user interface. The user interface includes output devices such as a screen and/or audio speakers. The interface further includes input devices such as a card reader, a keypad, function keys and/or a touch screen. The card reader is operative to read data from user cards corresponding to financial accounts. The interface is operative to provide instructions to and to receive inputs from users. The interface is operatively connected to one or more terminal processors which are in operative connection with one or more data stores. The data stores include instructions for operating the apparatus in response to various inputs and conditions. The data store further includes records pertaining to transactions conducted using the apparatus as well as data corresponding to connected computers and systems with which the apparatus may exchange messages for carrying out transactions.

The exemplary at least one terminal processor is in operative connection with a variety of transaction function devices. The transaction function devices include a note dispenser which selectively dispenses several common varieties of currency notes. The terminal processor is further in operative connection with a note acceptor. The note acceptor is operative to identify and validate a number of different denominations of currency notes. Valid currency notes are accepted into the machine and the user is afforded a corresponding credit.

The banking apparatus of the exemplary embodiment further includes a rolled coin dispenser. The rolled coin dispenser dispenses coin rolls in various denominations. The rolled coin dispenser is operative to present coins to a user. If the user fails to take any of the presented rolls a mechanism retracts them into the machine.

The merchant banking apparatus of the exemplary embodiment further includes a depository. The depository is operative to receive deposit envelopes in some exemplary embodiments. In other embodiments the depository is operative to receive instruments such as checks, and to cancel such checks and to generate and store images of the deposited instruments.

The merchant banking apparatus of an exemplary embodiment further includes a bag depository. The bag depository is operative to accept and secure the deposited parcels containing cash, coin, credit slips, checks and the like.

The exemplary embodiment enables a merchant user to receive selected quantities and denominations of coins and notes. The user may pay for these notes either with cash, which is accepted by the note acceptor, or by using a card based account, such as an account associated with a debit or credit card. The user may also make deposits in the form of envelopes or instruments into the depository. A user may further make deposits of large parcels into the bag depository. Using the interface of the machine, the user is enabled to specify precisely what is deposited into the machine and is provided with detailed receipts concerning the deposit. The user is further afforded the opportunity to obtain multiple receipts for a single deposit so that the user may deliver at least one of the receipts to their employer to evidence the making of the deposit, and also maintain at least one for their records in the event the one provided to their employer is lost.

The exemplary embodiment further provides a visually reproducible record associated with deposit transactions. This includes in the case of bag deposits, for example, concurrent images or combined images of both the user making the deposit as well as what is deposited. These concurrent images are presented to the user on the screen of the device at the time of the deposit to provide the user further assurance that the deposit is documented. Such records pertaining to deposits may be stored along with transaction information as stored data in the memory in the apparatus, or at another location. This enables the operator of the apparatus to review both transaction and visual image data pertaining to such transactions.

The exemplary embodiment further enables the operator of the merchant banking apparatus to monitor levels of dispensed items such as currency and coin. Appropriate entities are given notice selectively concerning the need to replenish such items. Similarly, the exemplary embodiment monitors the level of deposits accepted by the note acceptor, envelope or instrument depository and bag depository. Appropriate personnel are selectively given notice of the need to service or take action to remove accumulated deposits.

The exemplary form of the automated merchant banking apparatus and method enables merchants to carry out transactions on an automated basis that are necessary to support their business activities. Exemplary embodiments accept deposits including data bearing records, including RFID tags. Such records include deposit and content indicating data. Transactions can be carried out at the convenience of the merchant to conform to their hours of operation. Further, the automated merchant banking apparatus of the exemplary embodiment is secure yet relatively economical to produce and operate. Of course the systems and apparatus shown are exemplary.

BRIEF DESCRIPTION OF DRAWINGS

FIG. 17 is a schematic view of the roll coin retraction unit in a position for supporting coin rolls for presentation to a user.

FIG. 44 is an exemplary money exchange transaction receipt output by the exemplary embodiment.

FIG. 57 is an exemplary reconciliation report produced responsive to transactions conducted at the apparatus shown in FIG. 1.

FIG. 58 is an exemplary detailed deposit report output responsive to transactions conducted at the apparatus shown in FIG. 1.

FIG. 59 is an exemplary deposit summary report summarizing deposit transactions conducted at the apparatus shown in FIG. 1.

FIG. 60 is an exemplary showing of a label having an RFID tag.

FIG. 61 is an exemplary showing of a deposit ticket having an RFID label.

FIG. 62 is an exemplary showing of a deposit bag having an RFID tag.

FIG. 63 is an exemplary showing of a zippered cash bag having an RFID tag.

FIG. 68 is an exemplary showing of communication paths between an RFID tag reader and an RFID tag.

FIG. 69 is an exemplary showing of a deposit transaction receipt having an RFID tag.

DETAILED DESCRIPTION OF EXEMPLARY EMBODIMENTS

Figure 1:
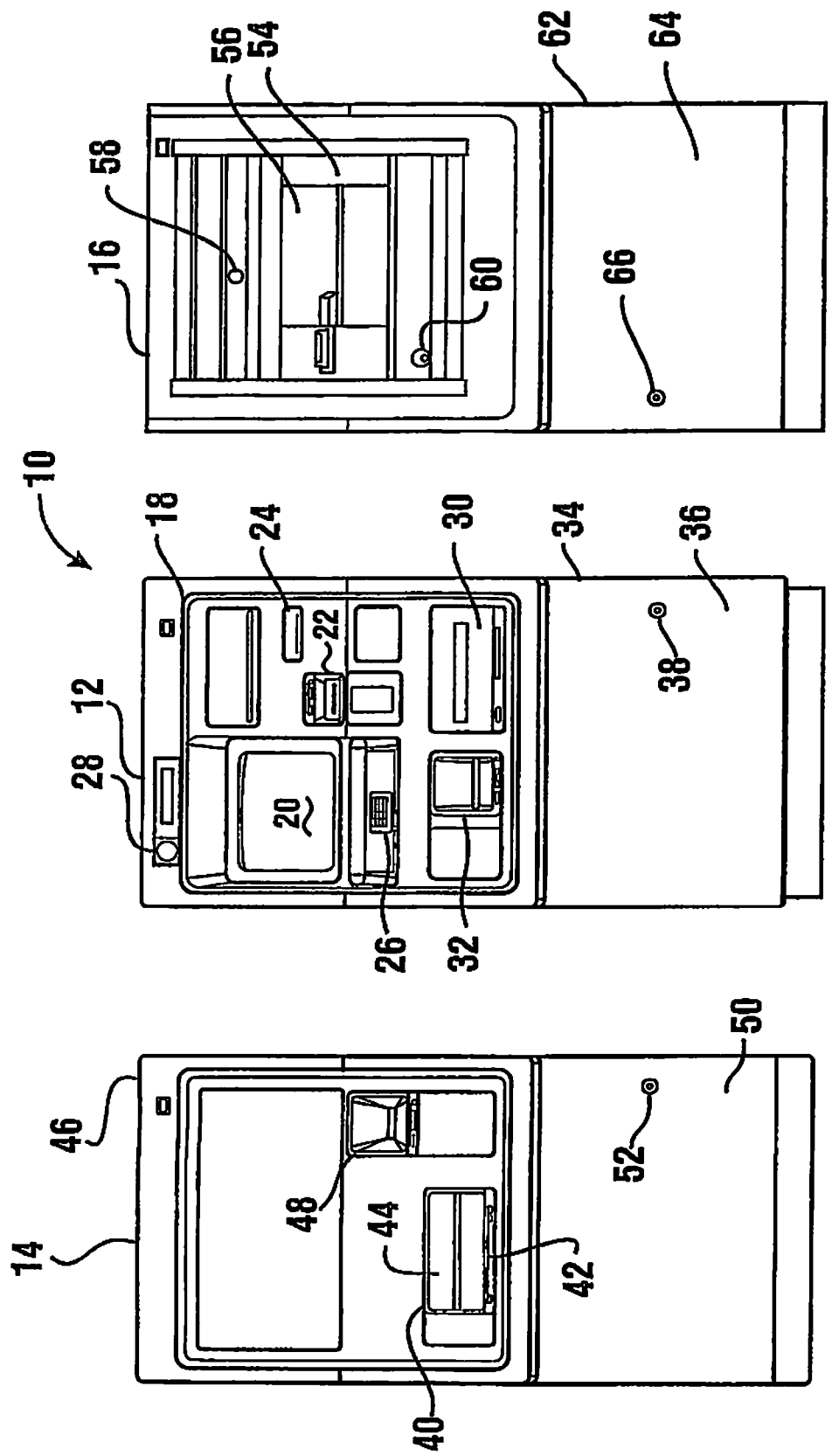
FIG. 1 is a front plan view of an exemplary embodiment of an automated banking apparatus.

Referring now to the drawings and particularly to FIG. 1, there is shown therein an exemplary automated merchant banking apparatus generally indicated 10. The apparatus of this exemplary embodiment includes a first housing portion 12. Apparatus 10 further includes a second housing portion 14 and a third housing portion 16. It should be understood that while the exemplary embodiment of the apparatus includes three separate housing portions, other embodiments may have a single housing portion or other multiples of separate housings.

First housing portion 12 has in supporting connection therewith a user interface 18 (or customer interface or user fascia). Interface 18 includes input and output devices for providing communications to and for receiving instructions from users of the apparatus. The exemplary user interface 18 includes a screen 20. Screen 20 serves as an output device for providing visual instructions to a user. In an exemplary embodiment, screen 20 is a touch screen and also serves as an input device for receiving inputs when a user brings their finger adjacent to selected areas of the screen.

Interface 18 also includes a card reader schematically indicated 22. Card reader 22 reads data from cards or other data bearing records associated with users. In the described embodiment card reader 22 is operative to read indicia encoded on a magnetic stripe card. In alternative embodiments card reader 22 may be operative to read information recorded in other forms such as information stored on a chip of a "smart card," optical indicia encoded through bar coding or other optical indicia, radio frequency identification (RFID) tags, or other data bearing records. The data may include data corresponding to users and/or user's financial accounts. The particular type of card reader or similar reading device used and the data that is read through operation thereof depends on the requirements of the machine.

Interface 18 further includes a printer schematically indicated 24. Printer 24 is operative to deliver printed articles through a printer slot shown in the interface of the machine. Printer 24 is operative to deliver a plurality of different types of printed documents to a user, examples of which are later described.

Interface 18 further includes a keypad 26. Keypad 26 is operative to accept manual inputs from a user operating the machine. It should be understood that while in the exemplary embodiment shown, a telephone type keypad is used, other embodiments may include typewriter type keyboards and other types of key sets including function keys or other types of instruction keys. The type of keypad and/or other input keys used will depend on the types of inputs that are required to be received for operation of the machine.

It should be understood that the input and output devices described in connection with the apparatus are exemplary and other embodiments may include additional and other types of input and output devices. Such devices may include, for example, audio output devices, touch sensitive output devices and other devices for indicating information to a user. Likewise, other types of input devices may be used for receiving information from users. These may include, for example, visual input devices, audio input devices, a mouse, fingerprint, iris, retina or other biometric reading devices and other types of devices which are capable of receiving information and/or instructions from the user.

First housing portion 12 further includes a camera 28. Camera 28 in this exemplary embodiment serves as an input device for capturing images of persons conducting transactions at the machine. In alternative embodiments camera 28 may function as part of a user identification system which is used for identifying users by their appearance and voice such as is shown in U.S. patent application Ser. No. 09/037,559 filed Mar. 9, 1998, the disclosure of which is incorporated herein by reference.

The automated merchant banking apparatus 10 can include one or more cash dispensers. A cash dispenser 30 includes one or more mechanisms that operate to selectively dispense cash (currency notes, currency bills) stored within the machine to users of the machine. The cash dispenser 30 can be operative to dispense various denominations of notes to machine users in response to instructions input to the machine. The note dispenser apparatus 30 may have various forms, such as a mechanism that dispenses notes of various denominations from storage canisters housed within the housing of the machine. Alternative embodiments can include note dispensers that have the capabilities of both accepting, identifying, storing, and dispensing notes such as is shown in U.S. Pat. No. 6,109,522 and/or Application 60/067,319 filed Nov. 28, 1997, or U.S. Pat. Nos. 6,273,413; 7,261,236; 6,331,000; and/or application Ser. No. 08/980,467 filed Nov. 28, 1997, all of which are owned by the Assignee of the present invention, and which are herein incorporated by reference as if fully rewritten herein.

Apparatus 10 further includes a depository schematically indicated 32. Depository 32 in some embodiments may include a depository for accepting envelope-type deposits. Envelope-type deposits may include cash, checks or other items representative of value which are inserted and stored in depository envelopes. Alternatively or in addition, depository 32 may include a depository mechanism for accepting and identifying instruments such as checks, such as a mechanism of the type shown in U.S. Pat. Nos. 5,422,467, 7,213,746 and/or 7,314,163 the disclosures of which are incorporated herein by reference as if fully rewritten herein.

Depositories which are operative to accept instruments such as checks may be operative to cancel and image such instruments. Such mechanisms may be further operative to generate messages which enable the machine to credit the user's account responsive to the information which is obtained from the instruments through their processing in the machine. It should be understood that the cash accepting and/or dispensing functions as well as the instrument accepting and imaging functions may be carried out using a single mechanism such as is shown in U.S. Pat. No. 6,273,413 which is incorporated herein by reference. Of course, other types of depository and dispensing mechanisms may be used.

Figure 27:
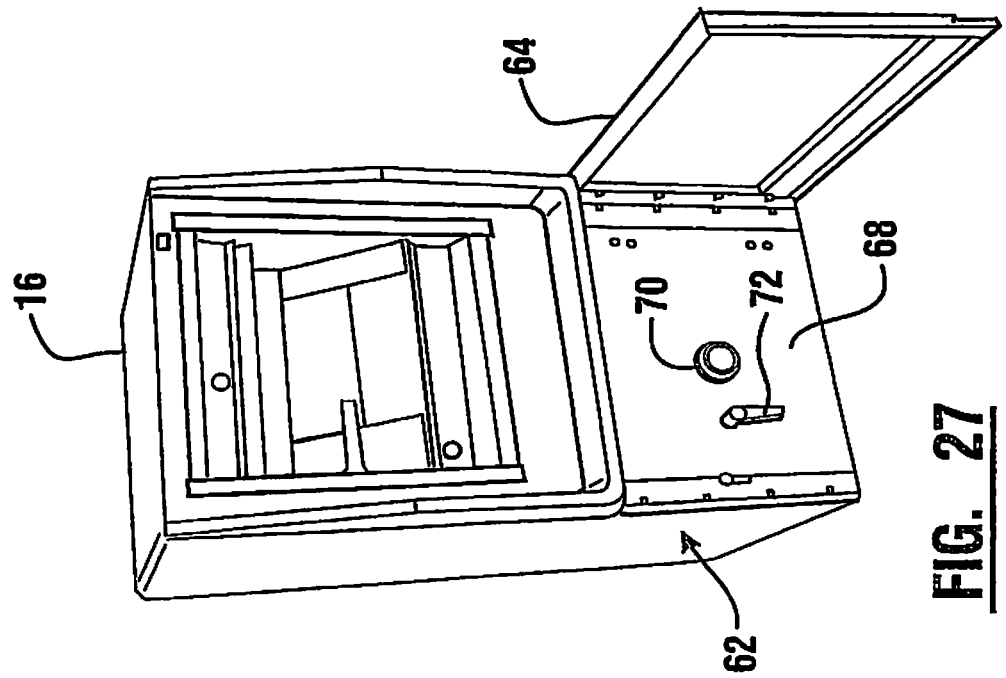
FIG. 27 is a view similar to FIG. 26 with the lower fascia door shown in an open condition.

Apparatus 10 further includes in first housing portion 12 a secure chest portion 34. Secure chest portion 34 resides in the lower portion of housing portion 12 in the exemplary embodiment and is used to secure notes for later dispense as well as deposited items therein. A fascia cover 36 overlies a door which can be opened by authorized persons to obtain access to the interior of the secure chest portion. The fascia cover 36 has a lock 38 thereon. Lock 38 can be opened by persons having a key thereto. Once the fascia cover is opened with the key, access to the outer face of the door of the secure chest is obtained. In this condition the handle and dial input device for the lock are exposed. A similar handle and dial input device along with a fascia cover are employed on third housing portion 16. FIG. 27 shows the fascia cover on that housing in an open position with the dial and handle of a secure chest door exposed thereon. Authorized personnel who have the key to lock 38 as well as the combination which enables accessing the chest portion of housing portion 12 are enabled to access the notes, instruments and other items stored in the chest. Such persons are enabled to remove and/or replenish such items. It should be understood that in some embodiments the same individuals may be authorized to access and service components within all of the housing portions of the apparatus, while in alternative embodiments different persons may be authorized to access the interior of certain housing portions and not others.

Second housing portion 14 includes a rolled coin dispenser unit schematically indicated 40. Rolled coin dispenser unit is operative to selectively dispense various denominations of coin rolls. As later described in detail, the rolled coin dispenser is in operative connection with a coin presenter and retraction unit 42 that enables users to access dispensed coin rolls and retracts untaken coin rolls into an area of the machine that is not generally accessible by a user. The coin presenter and retraction unit generally includes a door 44 in overlying relation thereof. The coin presenter and retraction unit is accessible through an opening in a movable fascia cover unit 46 that is later described in detail. The movable fascia cover unit is operative to move outward responsive to unlocking a door which secures an interior area of second housing portion 14. The outward movement of the movable fascia cover unit enables the unit to be opened without interfering with other components of the apparatus.

The apparatus further includes a note acceptor schematically indicated 48. Note acceptor 48 is operative to accept and identify various denominations of currency bills inserted by user. As later discussed, the note acceptor 48 is further operative to credit a user for the value of accepted notes. A user may use the credit for purposes of exchanging such notes for other denominations of notes or rolled coin, or for crediting the user's account. In alternative embodiments the note acceptor may be combined with a note dispenser 30 and/or the instrument acceptor 32 which operate in the manner of the devices described in the disclosures which are incorporated herein by reference.

Second housing portion 14 further includes a fascia cover 50. Fascia cover 50 can the opened by opening a lock 52 which can be opened by authorized persons. Opening lock 52 enables a fascia cover 50 to be moved to expose a combination dial of a lock, and a handle or other mechanism that can be used for opening a door overlying the interior of second housing portion 14.

Third housing portion 16 includes a depository. The depository may accept deposit bags or other deposit items. The bag depository includes a depository head portion 54. Depository head portion 54 includes a movable door 56 which covers an access opening 57. Door 56 can be opened by persons authorized to make deposits into an interior area inside the apparatus. Depository head portion 54 further includes a camera 58 which serves as an external imaging device which has a field of view which includes an exterior area outside the housing of the apparatus and is operative to capture images of persons making deposits therein in a manner later discussed. Depository head portion 54 in the exemplary embodiment further includes a key lock 60. Key lock 60 may be operated by keys inserted by authorized persons. In certain embodiments the appropriate key must be inserted before the bag depository door 56 can be opened. Alternatively, the bag depository door may be opened without a key as a result of inputs to the user interface. This may include for example, reading data from a user card through operation of a card reader, and determining through operation of a computer if the card data corresponds to data for an authorized user. In response to the read data corresponding to an authorized user the computer may cause the lock to unlock the door, enabling a deposit item to be input to the housing. The apparatus may alternatively be configured to require both appropriate inputs to one or more input devices of the user interface such as data read from a card, a personal identification number (PIN), biometric data and/or a key to place deposits in the housing.

The third housing portion 16 of the exemplary apparatus further includes a chest portion schematically indicated 62. Chest portion 62 is an internal area of the housing operative to securely hold bags of deposited materials that have been deposited into the apparatus. A fascia cover 64 overlies a chest door of the chest portion. Fascia cover 64 includes a lock 66 which can be opened by authorized persons to provide access to the components which control access to the interior of the secure chest.

FIG. 27 shows housing portion 16 with the fascia cover in an open position. A chest door 68 overlies the chest portion 62 of the housing 16. A combination accepting dial 70 can be used to input combinations. If the correct combination is input, a handle 72 connected to an appropriate boltwork will move the mechanisms holding door 68 in a closed position and enable door 68 to be opened. Opening door 68 enables removal of the bag deposits from an interior area of the housing. After such bag deposits have been removed, the door 68 may be closed and the boltwork resecured. As previously discussed, housing portion 12 may have a similar secure door. The boltwork and locking mechanism used to secure the doors overlying the housings may be similar to that discussed later in connection with housing portion 14 or may be any other suitable locking mechanism and boltwork for purposes of securing the doors.

Figure 2:
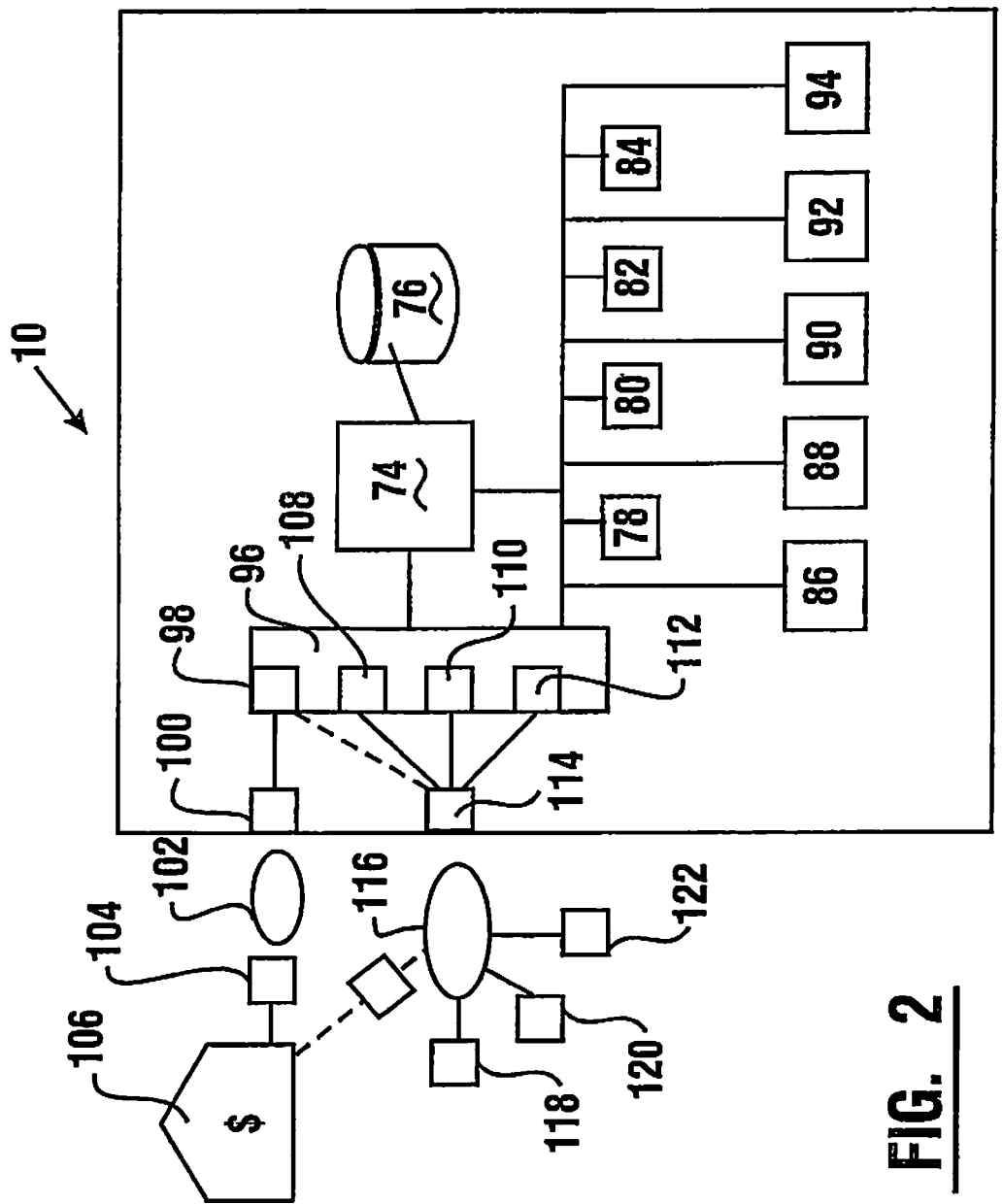
FIG. 2 is a schematic view of hardware and software components which comprise the apparatus shown in FIG. 1 and an exemplary system in which it is operated.

FIG. 2 shows a schematic view of hardware and software components of the apparatus 10. Apparatus 10 includes a terminal processor schematically indicated 74 which serves as a controller for controlling devices in the apparatus. Terminal processor 74 may be a single computer or may include one or more processors or computers which are operative to control the operation of the apparatus. For purposes of this disclosure a controller or computer will be deemed to include one or more processors that are capable of executing software instructions.

Terminal processor 74 is in operative connection with one or more data stores 76. Data store 76 is operative to hold programmed instructions for controlling operation of the apparatus as well as records including information concerning transactions conducted at the apparatus. Terminal processor 74 is in operative connection through appropriate interfaces with transaction function devices 78, 80, 82, 84, 86, 88, 90, 92 and 94. Transaction function devices include devices that are operative to carry out activities related to transaction functions in the machine. The transaction function devices may include for example the input and output devices of the interface 18. The transaction function devices may further include items such as the printers 24, cameras 28, 58 and other devices. The transaction function devices may further include note dispenser 30, depository 32, note acceptor 48 and other devices which are operative to either provide or accept notes or other instruments from users of the machine. The transaction function devices further include roll coin dispenser 40, bag depository head portion 54 and other devices within the machine. The transaction function devices include devices which are controlled or which receive information from one or more terminal processors 74 are required to control or receive information from in the operation of the machine. The particular types of transaction function devices used in the machine depends on the particular apparatus and the transaction functions that it carries out.

In alternative embodiments each transaction function device may have its own processor(s) and data store(s) for purposes of identifying itself to other connected devices, for controlling the associated hardware in response to transaction events and for generating events to which other devices may react. An exemplary system of connected devices of this type may communicate using Universal Serial Bus (USB) communication and/or operate using Jini™ technology from Sun Microsystems. Systems which are connected with such devices may not require a separate device for carrying out the functions of the terminal processor 74. Rather these functions may be accomplished by the multiple processors and data stores distributed among the transaction function devices, each of which serves as a terminal processor. Those skilled in the art may devise other processor configurations for control and coordination of operation between the transaction function devices.

The terminal processor 74 as well as the transaction function devices of the exemplary embodiment shown in FIG. 2 are in operative connection with one or more communication subsystems schematically indicated 96. The communication subsystem provides communication between the apparatus and other components with which the apparatus must communicate to carry out transactions. Subsystem 96 includes for example a software driver 98. Software driver 98 communicates through an interface device 100 with a communications network 102. Communications network 102 in this exemplary embodiment may be an ATM communications network or one or more networks such as CIRRUS®, PLUS® or other suitable communications network. The network is connected through an interface 104 to a source of monetary value schematically indicated 106. The source of monetary value 106 may be a bank or other electronic clearing house, credit card processor or similar entity which through a computer connection is operative to transfer funds between accounts.

In the exemplary embodiment one or more sources of monetary value are accessible through the network 102. The sources affect the transfer of funds between the accounts associated with the merchants who use the merchant banking apparatus and the customers of such merchants who have provided payments through credit slips, checks or other instruments deposited in the apparatus. Such transfers may occur virtually instantaneously or on a periodic batch basis electronically when the apparatus has the capability of automatically reading such instruments. If the apparatus does not have such capabilities the credits are made after the deposits are reviewed and verified. A plurality of sources of monetary value 106 may be connected to the machine through the network. Such entities are capable of transferring funds between the accounts of the user and entities with which the user has accounts, as well as the operator of the banking apparatus, so as to account for funds deposited into or taken from the banking apparatus by the user. Various approaches for connecting to sources of monetary value may be used with various embodiments. These may include for example, lease line connections, dial-up connections, or wireless connections to local and wide-area networks.

The communication subsystem of the exemplary embodiment further includes servers 108, 110 and 112. Servers 108, 110 and 112 are operative to communicate through a communications interface 114 with a network 116. Network 116 may be any suitable local or wide-area network for communicating messages. Network 116 may include the Internet. In this exemplary embodiment network 116 is a network suitable for communicating TCP/IP messages to a variety of remote servers and computers schematically indicated 118, 120 and 122. As schematically indicated in FIG. 2, the sources of monetary value 106 may also be accessible through a network 116 rather than through a separate network connection as previously discussed.

Embodiments may communicate messages between the apparatus 10 and remotely connected servers in the manner described in U.S. patent application Ser. No. 09/077,337 filed May 27, 1998, and/or U.S. Pat. No. 7,266,526 the disclosures of which are incorporated by reference as if fully rewritten herein. In the manner of the incorporated disclosure, apparatus 10 may communicate with various servers operated by financial institutions or other sources of monetary value schematically indicated 118 in FIG. 4. Such sources of monetary value may include a server operated by the bank of the particular merchant user of the machine. The server operated by the merchant's bank may have a particular "home page" or series of pages including HTML, XML or other mark up language documents which make up an application. This application when accessed using a browser operative in a processor of the banking apparatus provides a user interface tailored to the particular merchant user of the machine. The pages may include programs or instructions for carrying out transactions and/or for operating transaction function devices. This may facilitate operation of the apparatus by the merchant and their employees.

Such a customized user interface application may be particularly useful where a merchant user has particular types of documents to be deposited or other types of transactions that may not be common to other merchant users of the machine. This approach enables the presentation of user interfaces which use terminology that will be known to employees of the particular merchant user because they are used in connection with the operations of the user. This may include, for example, deposits of particular types of discount or promotional coupons, vouchers, scrip, or other things that the merchant user may accept as payment for goods or services. It may alternatively involve different language screens for persons whose primary language differs from most users. Such customized interfaces facilitate the operation of the machine by each particular user.

The interfaces and applications may be designed to carry out transactions using the nomenclature and/or trademarks utilized by the merchant user. For example, a user may have certain practices in which it places predetermined types or amounts of items in combination or together as a named article. For example, a merchant user may place a certain type and/or amount of currency in a blue bag, another type and/or amount in a red bag, credit card vouchers from MasterCard® credit cards in a white bag and other types and/or amounts of things in other colored deposit bags. The application may operate to cause the user interface to present instructions for deposit transactions using terminology which refers to the colored bags. The application may also calculate deposit types and amounts based on inputs corresponding to the merchant's nomenclature. Of course the bag example is one of many possible arrangements and business methods under which a merchant may have unique nomenclature or unique things (or collections of things) the merchant has defined. The merchant's unique application preferably uses this nomenclature and knowledge of its meaning in program logic to present an interface that is easy for the merchant's employees to understand and which can carry out any unique transactions or calculations that may be required for the particular merchant's transactions.

Another example of a particular merchant user application may be one where the user has certain types of receipts which are subject to tax, duty or tariff, such as a sales tax, and other types of receipts that are not. Alternatively, the merchant may provide different items that may be subject to taxes, duties or tariffs at different rates. The merchant may segregate receipts on this basis or otherwise categorize the amount of such receipts. The merchant's customized application may be prepared to accept the input of amounts in such multiple categories. The application may also operate to calculate and escrow the amounts of the taxes, duties or tariffs, and/or may coordinate with other systems to electronically transfer the correct portions of the deposited funds to the appropriate collection authorities.

Other examples of customized applications and interfaces may account for the escrowing of amounts paid but not yet earned, as well as for later transfers from escrow accounts to other accounts. Other customized merchant applications may account for the payment of royalties on certain types of receipts, for example a franchisee who pays royalties in calculated amounts to a third party on at least some types of receipts. Other merchants may be entitled to rebates or incentives from third parties on certain types of receipts or for compensation due to acceptance of coupons. Applications for such merchants may include the input of pertinent amounts or other data related to such items and the calculation of the amount of credits or rebates. The application may also operate to coordinate with other systems to receive and transfer the amounts due to the merchant.

Customized merchant applications may also be integrated with computer programs and systems run by the merchant or with third parties to facilitate other activities. Such activities may involve tax calculation and payment on behalf of the merchant, inventory tracking and/or theft or fraud detection. The applications described herein are merely exemplary of the types and uses of customized merchant applications for the merchant banking apparatus.

Alternatively, or in addition, the automated banking machine may include a contact or non contact input device such as an infrared coupler or a data port. The merchant may load data needed by a customized or non customized merchant banking application into a portable memory module. The portable memory module may be a hand held device or may be attached to an article to be deposited. The portable module may include a processor connected to the memory and couplers appropriate for communication. The module may be used to provide inputs to the banking machine in place of at least some manual and card inputs. This speeds transaction times. The machine may in addition receive and/or store certification data in the memory of the module to serve as documentation that the information in the module was communicated to the machine.

The apparatus 10 and its associated terminal processor of the exemplary embodiment shown may further operate in the manner of the incorporated disclosure or through other means to connect to remote marketing servers 120. Marketing servers 120 may be selectively accessed based on rules established by the operators of the machine 10 and the network 16 to provide information which may be of interest to merchant users of apparatus 10. Such information may include, for example, opportunities for loan terms or investments available to small business people which are offered by financial institutions. Such connections may be based on the identity of the particular user operating the machine as determined through the indicia encoded on a card or other information presented to input devices of the apparatus. Marketing servers 120 may be operatively connected to one or more marketing databases 122 to determine appropriate presentations to provide to each particular user of the machine. Such presentations may be made during dwell times during transactions at the apparatus 10, such as when the apparatus is waiting for a response from a remote computer, or at other times as may be appropriate. In certain embodiments the presentations made through the marketing servers are directed specifically at the user on a target market or segment of one basis so as to tailor the presentations to the expected needs or interests of the user.

Figure 3:
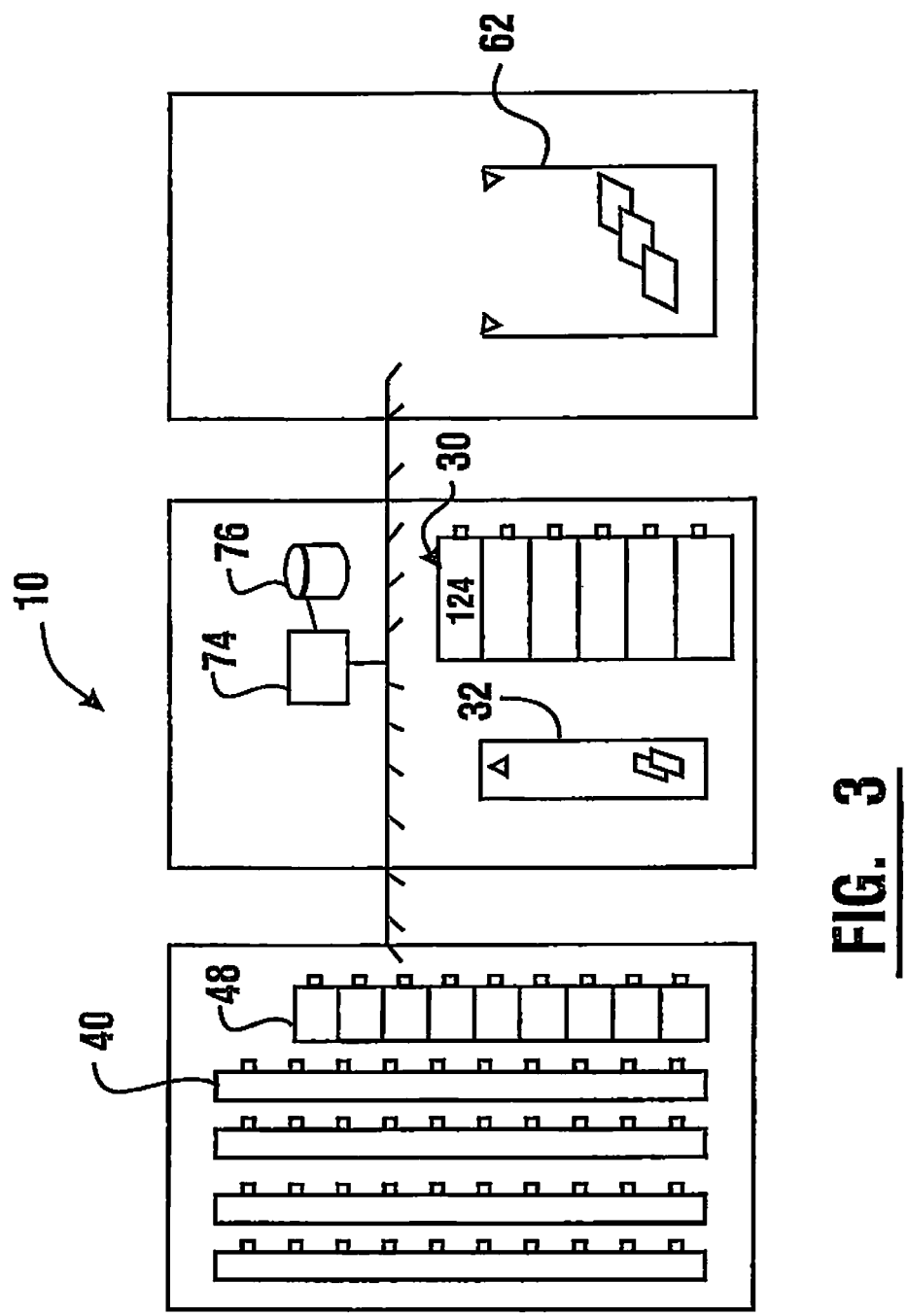
FIG. 3 is a schematic view of exemplary transaction function devices included in the apparatus shown in FIG. 1.

As schematically represented in FIG. 3, the terminal processor 74 is operatively connected to sensors. The sensors sense conditions of transaction function devices. For example, the transaction function devices may include note dispensing mechanisms 30 which have note containing canisters 124. The note containing canisters may be of the type shown in U.S. Pat. Nos. 4,871,085, 7,344,132 and/or 7,293,699 the disclosures of which are incorporated herein by reference in their entirety. Such note containing canisters 124 include indicators which provide signals representative of quantities of notes remaining in such canisters. The terminal processor is operative to receive such signals and to take action in accordance with the programs stored in its data store 76.

Likewise, the terminal processor 74 is in operative connection with other sensors in various transaction devices. For example, a sensor in depository 32 may be operative to provide signals indicative of the depository approaching a filled condition necessitating removal of items deposited therein. Similarly, note acceptor 48 is operative to indicate to the terminal processor 74 signals indicative of a status thereof. Similarly, the roll coin dispensers 40 and the chest portion 62 of the bag depository have sensors operatively connected therewith and provide signals indicative of status or other operational information to the terminal processor 74. The terminal processor 74 operates responsive to the receipt of such signals in accordance with its programming to notify appropriate entities.

Terminal processor 74 is operative to generate messages in response to the signals it receives from the transaction function devices. These messages are delivered through one or more servers residing on computers in the apparatus 10. The messages are delivered through the network 116 to other computers and communication devices. Such messages may be selectively delivered to entities responsible for remedying or reacting to conditions that are sensed at the various transaction function devices. Such messages may include, for example, messages indicative of malfunctions in various devices. Messages about malfunctions may be routed to computers or other devices 126 associated with persons providing repair services. Repair servicers may be selectively notified depending on the particular malfunction being sensed. In addition, the repair servicers may be selectively notified based on time of day, machine location or other parameters which dictate which repair servicer is to be notified of the particular condition. To achieve this, the system may operate in accordance with the teachings of the system shown in U.S. Pat. No. 5,984,178 and/or U.S. Pat. No. 7,036,048, the disclosures of which are incorporated herein by reference as if fully rewritten herein.

Figure 4:
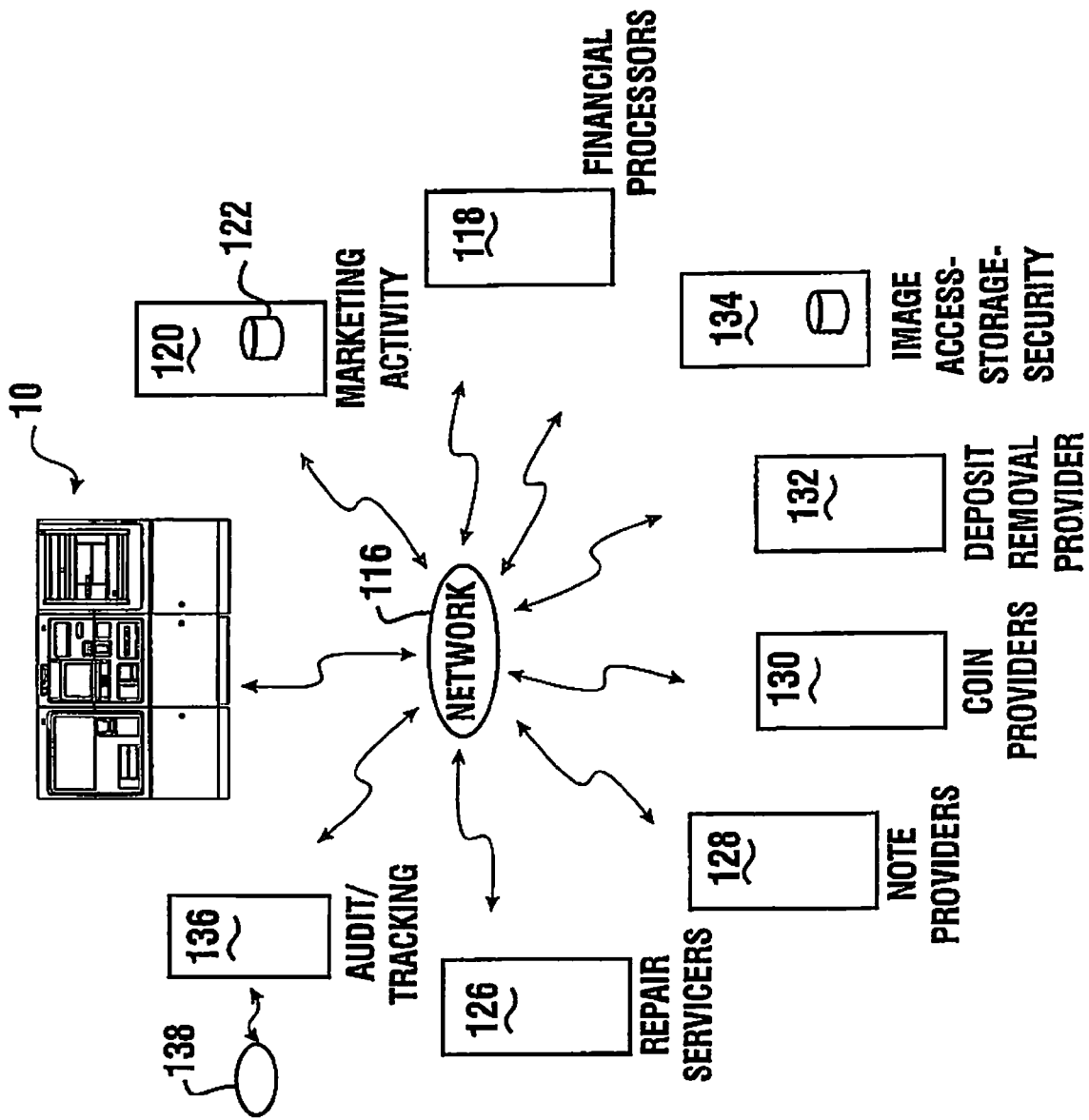
FIG. 4 is a schematic view of the apparatus shown in FIG. 1 in connection with various remote computers to a network.

The terminal processor may further operate to indicate particular conditions to other entities responsible for handling conditions which arise at the apparatus. For example, as indicated in FIG. 4, a need to replenish a note supply may be communicated selectively through the network 16 to a computer 128. Computer 128 may be associated with an entity responsible for replenishing the supply of notes in the dispensers within the machine. When the terminal processor receives signals indicative of a need to replenish coin rolls, messages may be routed through the network 116 to one or more computers schematically indicated 130. Computer 130 may be associated with entities responsible for replenishing rolled coin within the apparatus 10. If the depository 32 or bag depository 62 needs entities to be emptied, appropriate messages may be provided to computers 132 associated with persons responsible for removing items from depositories.

Messages may be provided in the manner of the incorporated disclosure to different entities and through different mediums depending on the nature of the conditions sensed at the apparatus 10. Messages may also be selectively provided based on the type of notes, coins, or deposits which need to be supplied or removed, the time of day, the urgency of the situation, levels of security required and so on. Exemplary embodiments enable selectively providing notices to entities which have the ability to take the appropriate action at the apparatus 10 whenever such conditions occur. Embodiments which are designed to serve merchant banking customers may require particularly prompt action to remedy conditions which might impede operation of the apparatus as merchants may have fewer options for conducting banking transactions than do consumers, particularly during non-banking hours.

The exemplary embodiment of the apparatus includes cameras 28, 58 and 326 later described. These cameras are preferably connected to systems for capturing and delivering image data of the type commercially available as the Accu-Track™ digital recording and playback system commercially available from Diebold, Incorporated and as shown in U.S. Pat. No. 6,583,813 and/or Application Ser. No. 60/103,731 filed Oct. 9, 1998, the disclosures of which are incorporated by reference as if fully rewritten herein. Such cameras operate in the apparatus 10 in connection with the terminal processor or other connected processors and data stores, to capture and store image data in a digital format related to operation of the apparatus by users. The image data may be selectively stored in memory at the apparatus 10 and accessed by appropriate personnel through the network 116 in the manner discussed in the incorporated disclosure.

Image server 134 shown in FIG. 4 is an example of a computer connected to the network for purposes of accessing and receiving image data from the apparatus 10. Image server 134 may be connected to a data storage medium for archiving image data and associated transaction data for purposes of documenting transactions by users at the apparatus 10. Alternatively, banking personnel or authorized merchant users may be provided with access to the network 116 through appropriate servers or other gateways. Such access may enable a merchant to access the image data associated with their particular transactions. In this way a merchant may verify that deposits have been made for the day from each of their outlets. The merchant or bank may also access the image data which shows the particular employee who made deposits from each outlet as well as the transaction data associated with each such deposit. In this way, a merchant may keep track of the status of their accounts as well as the employees who are responsible for making such deposits.

The ability to determine remotely the making of deposits, the amounts and the times that such deposits are made, enable a merchant to keep close track of their accounts as well as other information concerning their business. This also enables a merchant to keep better track of cash flows and to make the best use of available resources. This may include making transfers of funds as soon as they become available. For example, merchants may be enabled to make deposits of funds into overnight accounts on which they may earn interest, and then obtain reversion of the funds the following business day into their non-interest or lower interest checking accounts. The ability to track and obtain the immediate use of funds may be valuable particularly in a merchant banking environment.

Computer 136 represents an audit and tracking server which may be used by merchants or banking personnel in reviewing available information concerning activity within the system. As previously discussed, computer 136 may also serve as a gateway or firewall for providing access from other networks such as a schematically indicated network 138. It should be understood that in various embodiments, network 138 may include a publicly accessible network including a wide-area network such as the Internet. It should be understood, however, that in embodiments of the invention appropriate security measures should be taken to prevent access by unauthorized persons to financial and other data.

Figure 5:
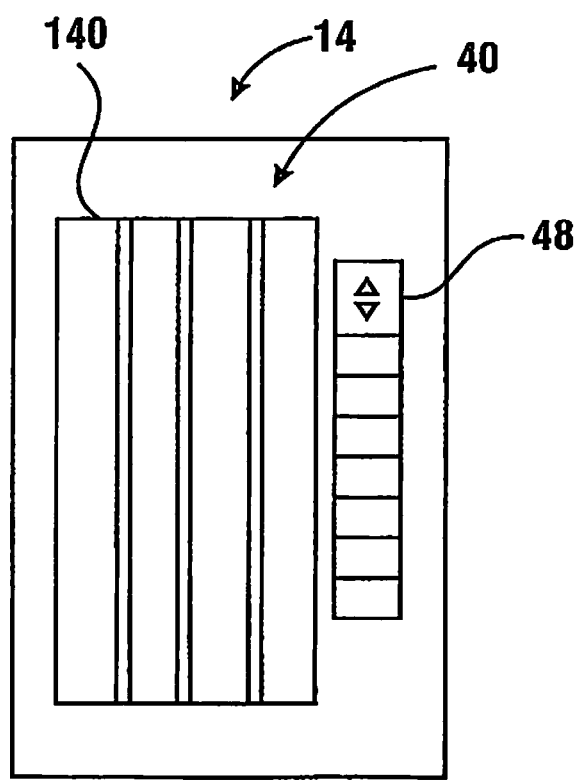
FIG. 5 is a schematic view of the rolled coin dispenser and note acceptor units of the embodiment shown in FIG. 1.
Figure 6:
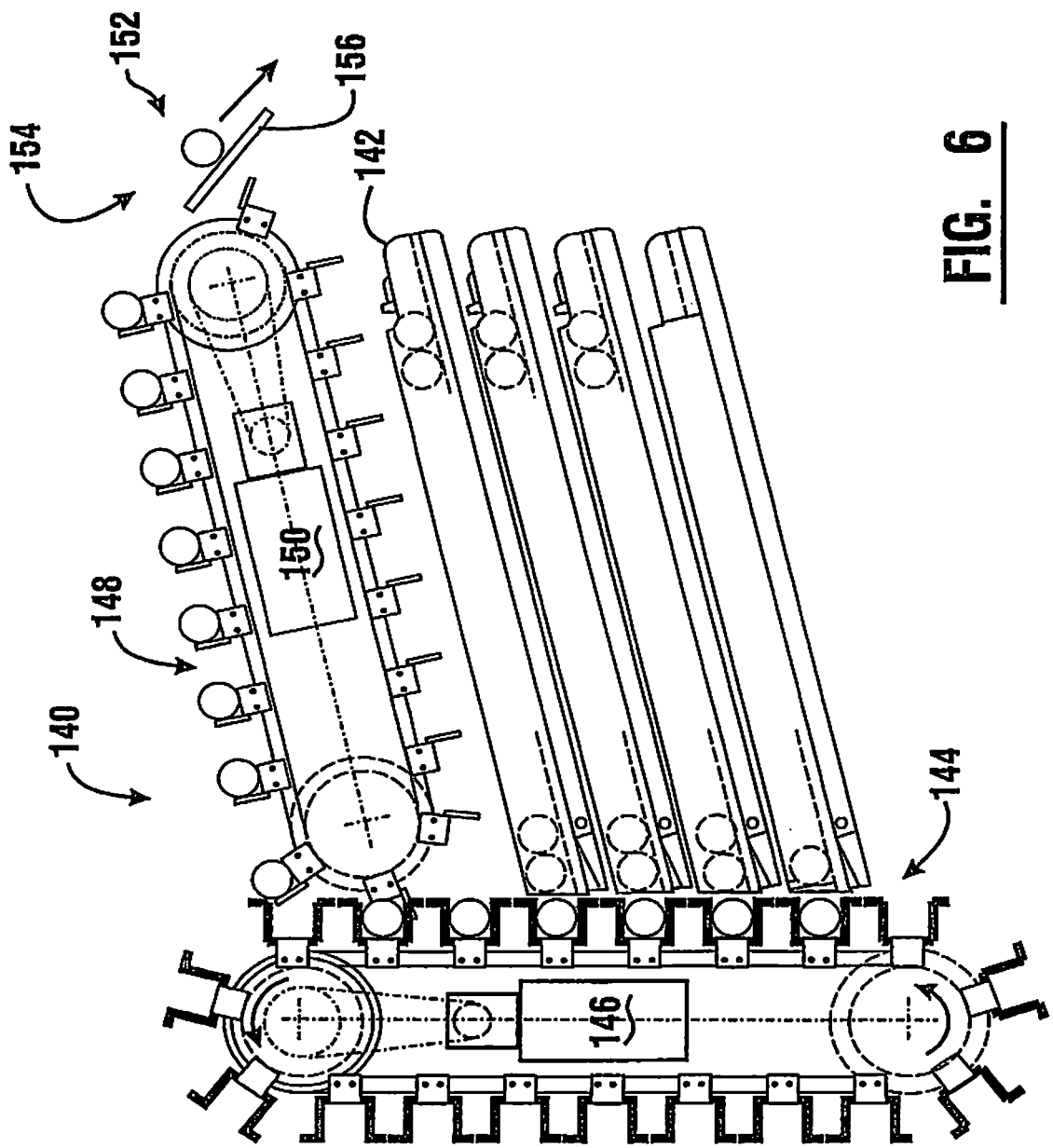
FIG. 6 is an exemplary embodiment of a rolled coin dispenser unit used in connection with an exemplary apparatus.

FIG. 5 shows schematically the components housed in the second housing portion 14 of the apparatus 10. In the described embodiment, housing portion 14 includes the note acceptor apparatus 48 for accepting currency bills as well as a rolled coin dispenser device 40. The rolled coin dispenser device in the exemplary embodiment includes a plurality of rolled coin dispensers 140. An example of a rolled coin dispenser 140 is shown schematically in FIG. 6. Rolled coin dispenser 140 in this exemplary embodiment is similar in construction to that shown in UK Patent Application No. 2,314,062 which is incorporated herein by reference. Of course in other embodiments, other types of rolled coin dispensers may be used.

In this exemplary embodiment rolled coins of similar size and denomination are stored in cassettes 142. Cassettes 142 are configured to bias the coin rolls therein toward a vertical elevator conveyor 144. The elevator conveyor 144 is driven by a drive 146 in the direction indicated to accept coin rolls from the cassettes and to move coin rolls to an outlet conveyor 148. The outlet conveyor 148 is driven by a drive 150 to move coin rolls from the elevator conveyor to a coin outlet 152. Sensors schematically indicated 154 are positioned adjacent to the coin outlet for detecting when coin rolls are dispensed therethrough. The coin rolls passing through the coin outlet are supported on a ramp 156. The coin ramp 156 directs coins to a straightening, delivery and retracting mechanism. In an exemplary embodiment, the apparatus includes at least one coin dispensing mechanism 140 for four denominations of coins, specifically pennies, nickels, dimes and quarters. Of course in other embodiments, additional coin types and coin dispensing mechanisms may be used.

Coins dispensed by the coin dispensing mechanisms 140 in the exemplary embodiment are each delivered through the coin straightening, delivery and retracting mechanism 162. Mechanism 162 is shown in FIGS. 8-11. Mechanism 162 includes a housing 164. Housing 164 is supported on an interior face of door 160. Housing 164 has supported thereon a deflector supporting shaft 166 (see FIG. 10). Deflectors 168 are rotatably supported on shaft 160. Each deflector 168 is mounted in a passage 170. Each passage 170 corresponds to a respective one of the rolled coin dispensers. Dividers 172 separate the passages so that in the exemplary embodiment each passage will receive coin rolls of only one denomination when such rolls are dispensed.

The passages 170 are bounded at the lower end by a movable door member 174. The movable door member is rotatably mounted in supporting connection with the housing through a pivot for a purpose later discussed. The movable door member 174 overlies a coin retraction pocket 176 or container which serves as a storage area (see FIG. 17).

Figure 8:
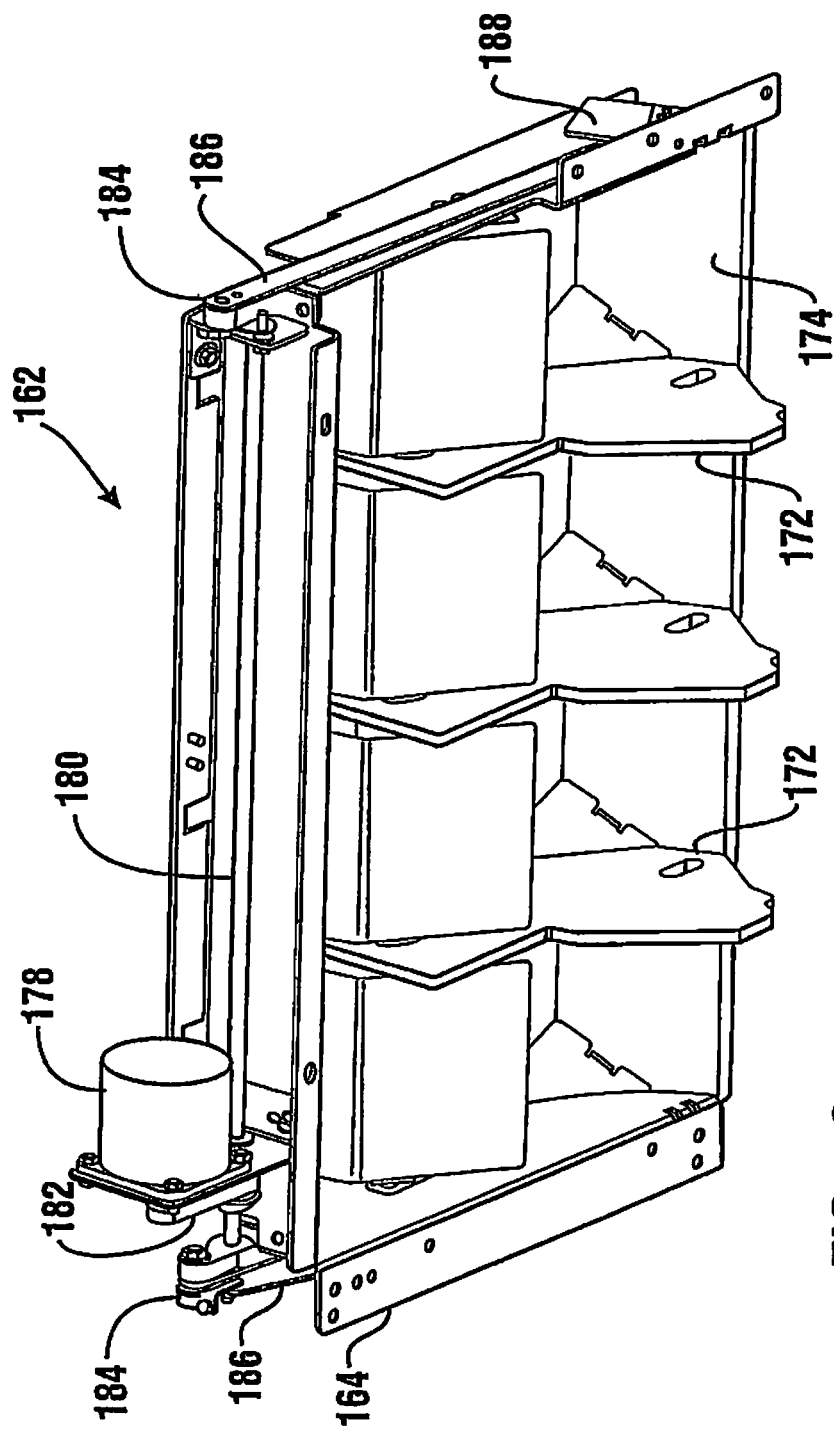
FIG. 8 is an isometric view of a rolled coin delivery and retraction mechanism used in connection with the rolled coin dispenser of the apparatus shown in FIG. 1.

A drive 178 shown in FIG. 8 is operatively connected to the door member 174 through a transmission mechanism. The transmission mechanism includes a rotatable shaft 180 which is connected to a drive shaft of the motor through a belt and pulley arrangement 182. First links 184 are connected at each end of shaft 180. Each first link 184 is connected at an end opposed of shaft 180 to a second link 186. Each second link 186 is connected to a tab 188 which extends upward on a side of door member 174. The drive and transmission mechanism shown are exemplary and other drives suitable for achieving selective movement may be used.

Figure 9:
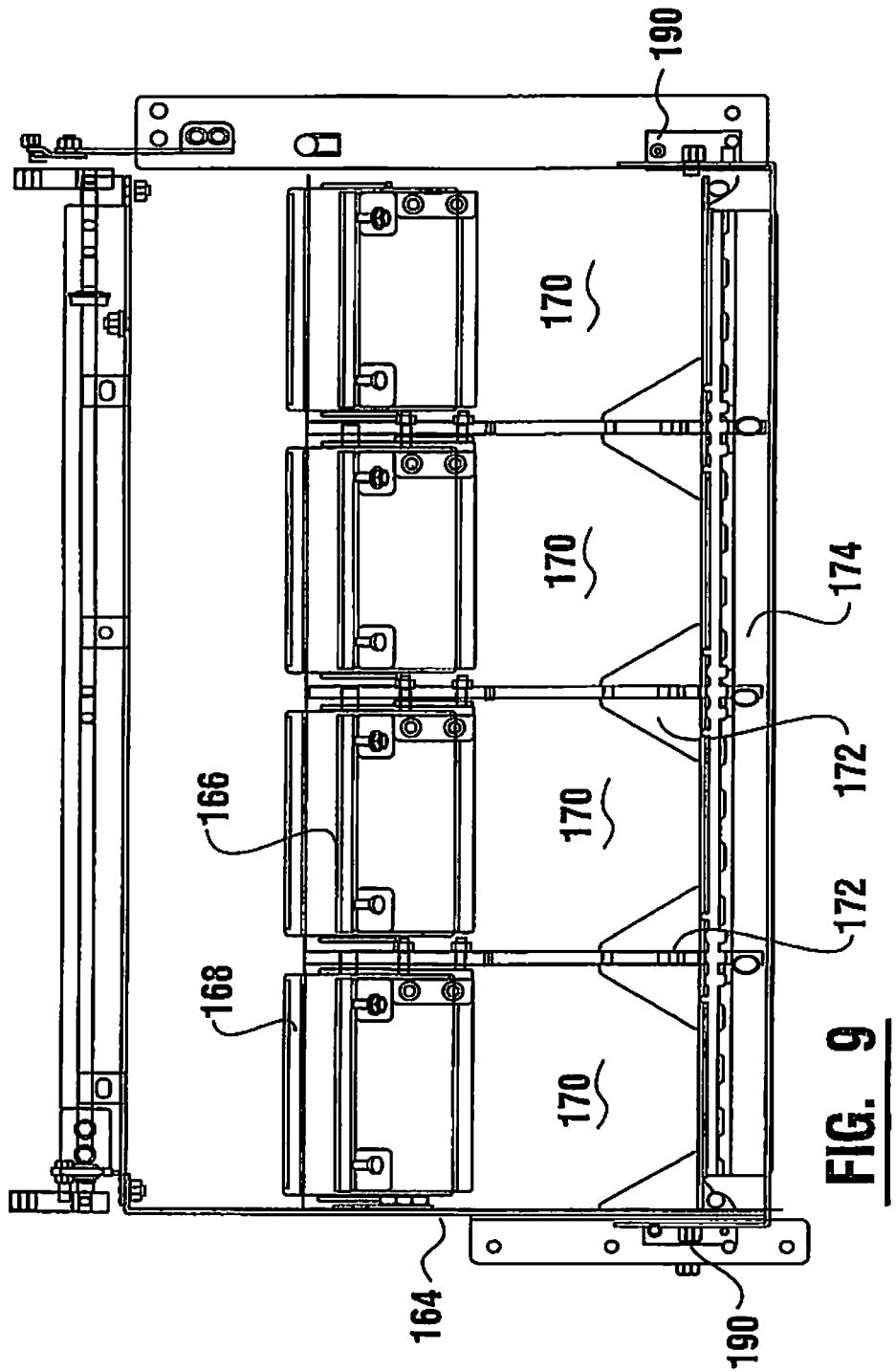
FIG. 9 is a front plan view of the mechanism shown in FIG. 8.
Figure 10:
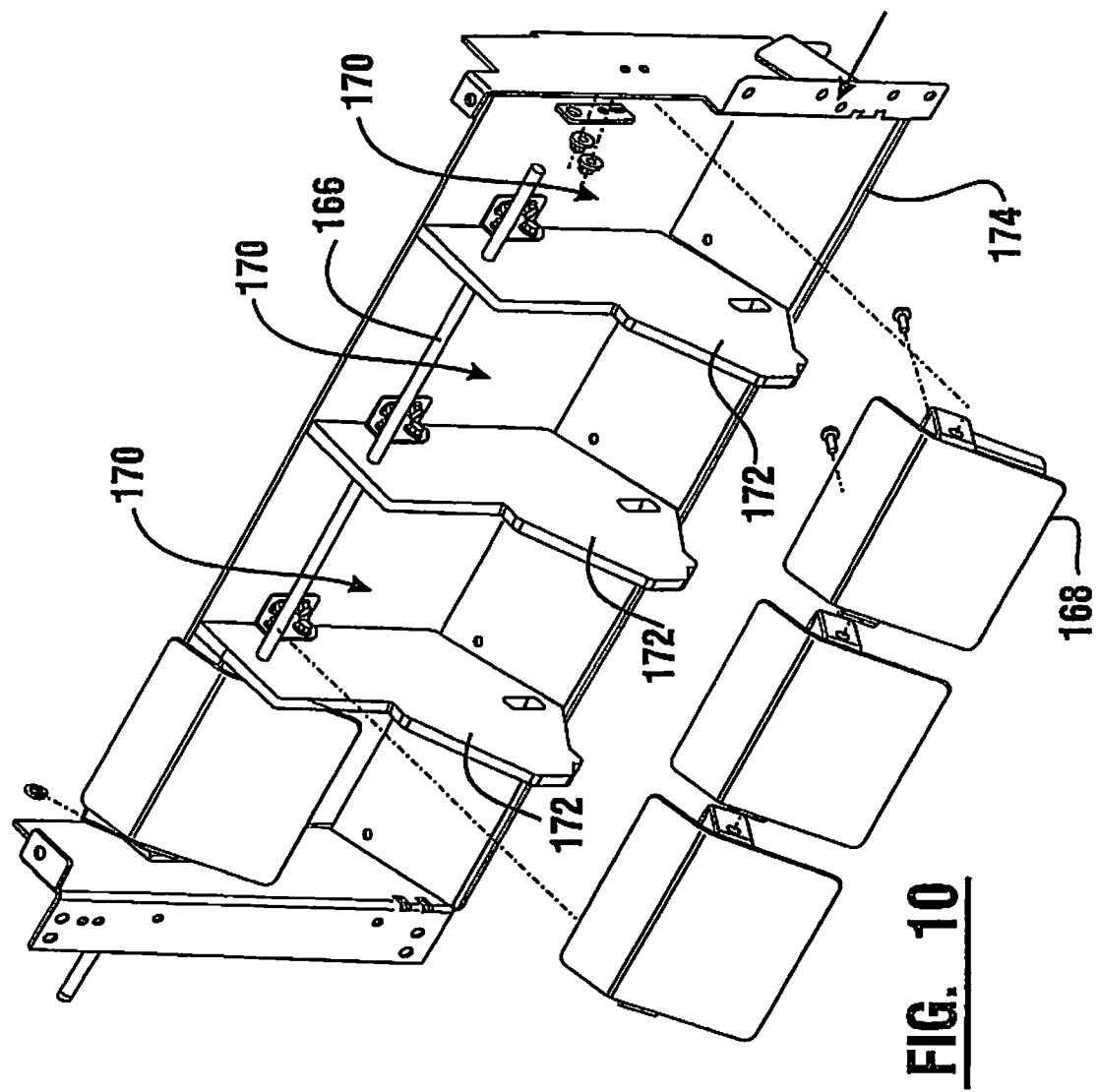
FIG. 10 is a partially exploded isometric view of the mechanism shown in FIG. 8.
Figure 11:
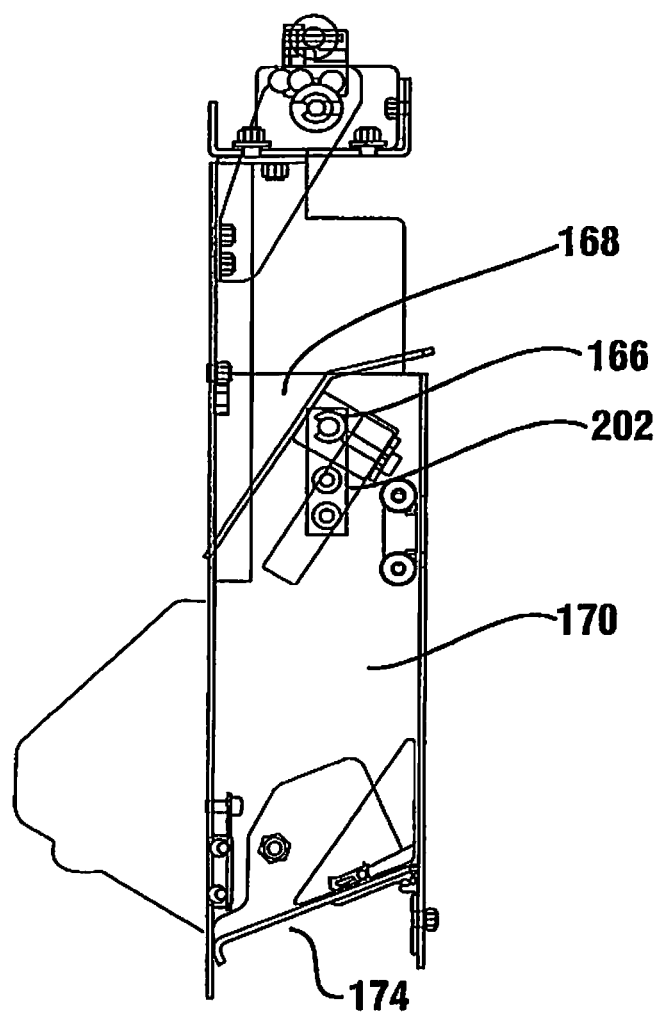
FIG. 11 is a side cross-sectional view of the mechanism shown in FIG. 8.

As shown in FIG. 9, sensors 190 extend at opposed ends of housing 164. In the exemplary embodiment, sensors 190 include a radiation emitter and receiver. The sensors 190 are operative to sense the presence of coin rolls in the passages. Openings 192 or apertures extend in generally aligned relation in each of the dividers 172 so that the presence of coin rolls between any of the dividers is detected. The sensors shown are exemplary and other sensors suitable for sensing coin rolls may be used.

Figure 12:
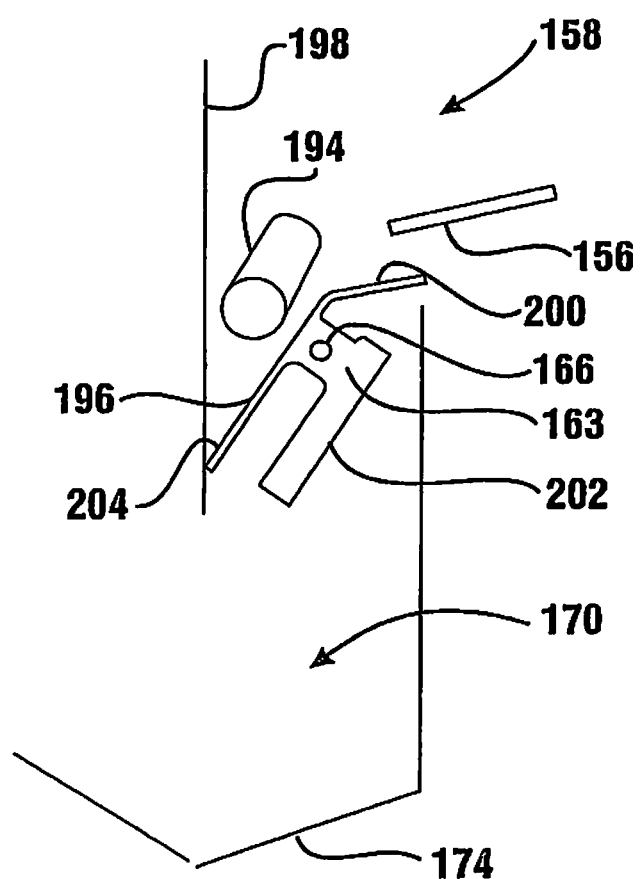
FIGS. 12-14 are side schematic views showing the operation of the rolled coin deflectors in positioning and absorbing energy from a coin roll being dispensed.

In the operation of the exemplary coin straightening, delivery and retracting mechanism, coin rolls dispensed move from the respective rolled coin dispensers 140 on the coin ramps 156 as represented by coin roll 194 in FIG. 12. Such rolled coins are not necessarily traveling along the coin ramp in a condition parallel to deflector support shaft 166. Rather, such coin rolls may be substantially skewed from the desired position as represented in FIG. 12. The deflector 168 includes a first coin engaging surface 196. The first coin engaging surface extends generally adjacent to a coin aligning surface 198 which in the described embodiment is an inner surface of door 160. Coin deflector 168 further includes a second engaging surface 200. Second engaging surface 200 is operative to guide coins to engage the first coin engaging surface 196. In the described embodiment the second engaging surface 200 is also configured to prevent unauthorized access to the coins in the mechanism.

Deflectors 168 further include a counterweight portion 202. Counterweight portion 202 in the exemplary embodiment is disposed on an opposed side of shaft 166 from the coin-engaging surface 196. Counterweight portion 202 is preferably sized and configured to bias the end area 204 of first coin-engaging surface 196 to engage or at least be in close adjacent relation to coin-aligning surface 198. Counterweight portion 202 is preferably configured such that a relatively substantial increase in force is required to move the end area 204 of surface 196 a greater distance away from the coin aligning surface 198 as the end area moves further away from the aligning surface. As a result of this configuration a greater force is required to move a larger diameter coin roll between the coin-aligning surface 198 and the end area 204 than is required to move a smaller diameter coin roll.

Figure 13:
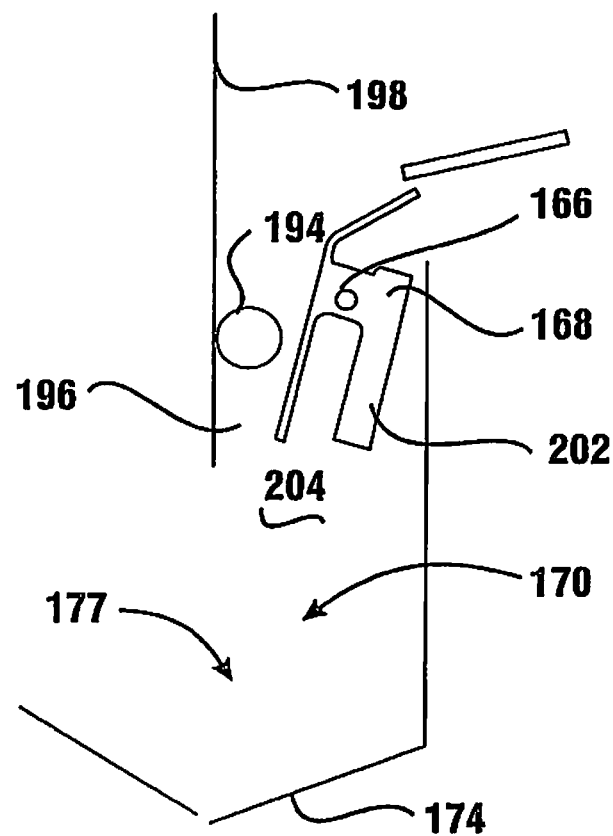

As represented in FIG. 13, the engagement of the coin roll 194 and the surface 196 directs the coin roll to engage the aligning surface 198. The end area 204 extends generally parallel to the aligning surface. As a result the coin roll passing the deflector is generally aligned with its axis parallel to surface 198 and shaft 166. The relatively large mass associated with the deflector 168 and particularly the counterweight portion 202 absorbs kinetic energy from the moving coin roll. As a result the coin roll is slowed when it engages the deflector member. The force associated with the weight of the coin roll 194 causes the deflector member to move and rotate about shaft 166 a sufficient degree to enable the coin roll to move past the deflector in the passage 170. The coin roll generally moves past the deflector in engagement with the aligning surface. As previously discussed, the larger the diameter of the coin roll the greater the force that is required to move the deflector 168 and its associated counterweight portion 202 to enable the roll to pass downward therefrom into a holding area generally indicated 177.

Figure 14:
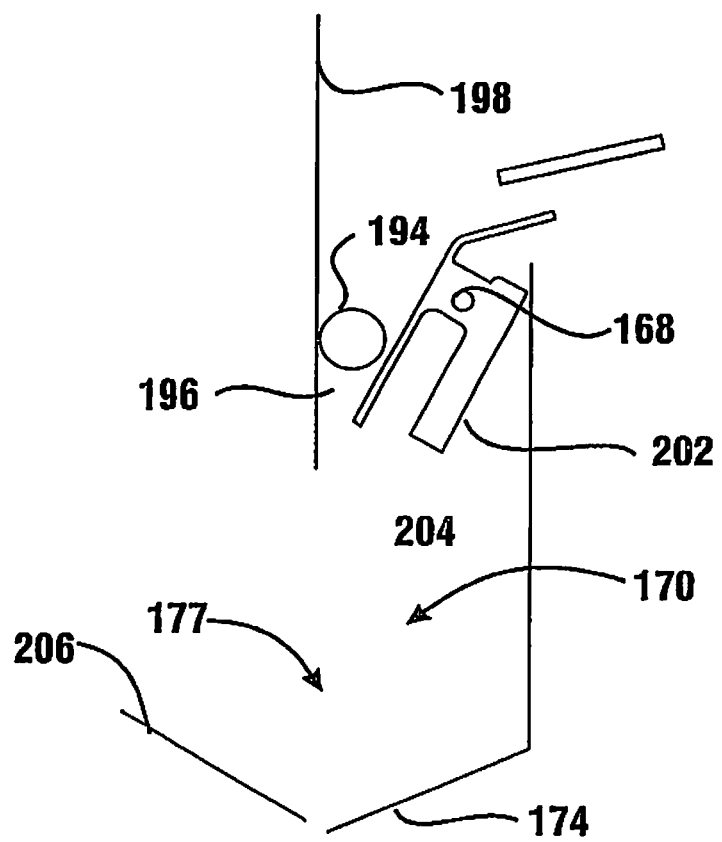

As shown in FIG. 14, the force associated with the weight of the coin roll eventually rotates the deflector 168 sufficiently so that the coin roll is enabled to pass downward in the passage 170. Once the coin roll passes the deflector, it is held in the holding area 177 in supporting connection with the door member 174 and a downward and inward extending ramp surface 206. In the described embodiment the front area 204 and coin aligning surface 198 are generally in alignment with the trough area generally indicated 208 where the ramp surface 206 meets the door member 174 in the closed position. This trough area serves as an impact area from which the surfaces bounding the holding area for the coin rolls extend generally upward in cross section. This configuration generally results in the dispensed coin rolls falling downward in a manner that minimizes bouncing and causes the coin rolls to stack so that they can be readily removed from the holding area by users accessing the mechanism 162.

Figure 15:
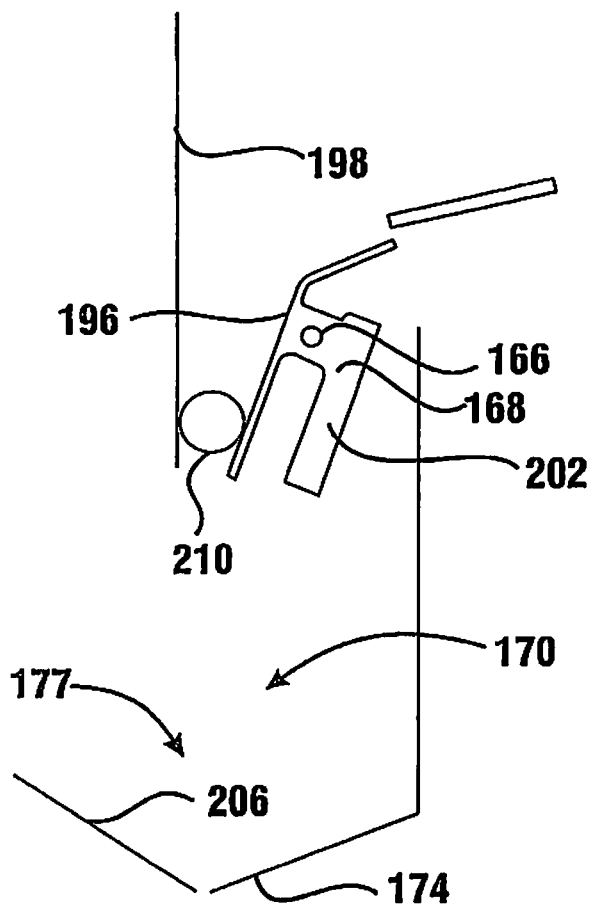
FIG. 15 is a side schematic view showing the operation of the coin deflectors in connection with a small diameter coin roll being dispensed.

The exemplary form of the deflector member 168 is configured such that the counterweight portion 202 has its center of mass generally below and somewhat disposed inward from the axis of rotation of the deflector member 168 about shaft 166. As will be appreciated, the mass of this counterweight portion must be overcome by the mass of the coin rolls which pass the deflector member between the surface 196 and the aligning surface 198. Smaller diameter coin rolls which generally have less mass than larger diameter coin rolls, do not have to move the deflector member as much. As a result, smaller diameter coin rolls are enabled to pass the deflector member and do not become hung-up thereon. In addition, smaller diameter coin rolls which do not possess as much kinetic energy when dispensed are more readily aligned by the deflector. An example of a relatively smaller diameter coin roll 210 being aligned and passed downward past the deflector member in the exemplary embodiment is schematically represented in FIG. 15.

Figure 16:
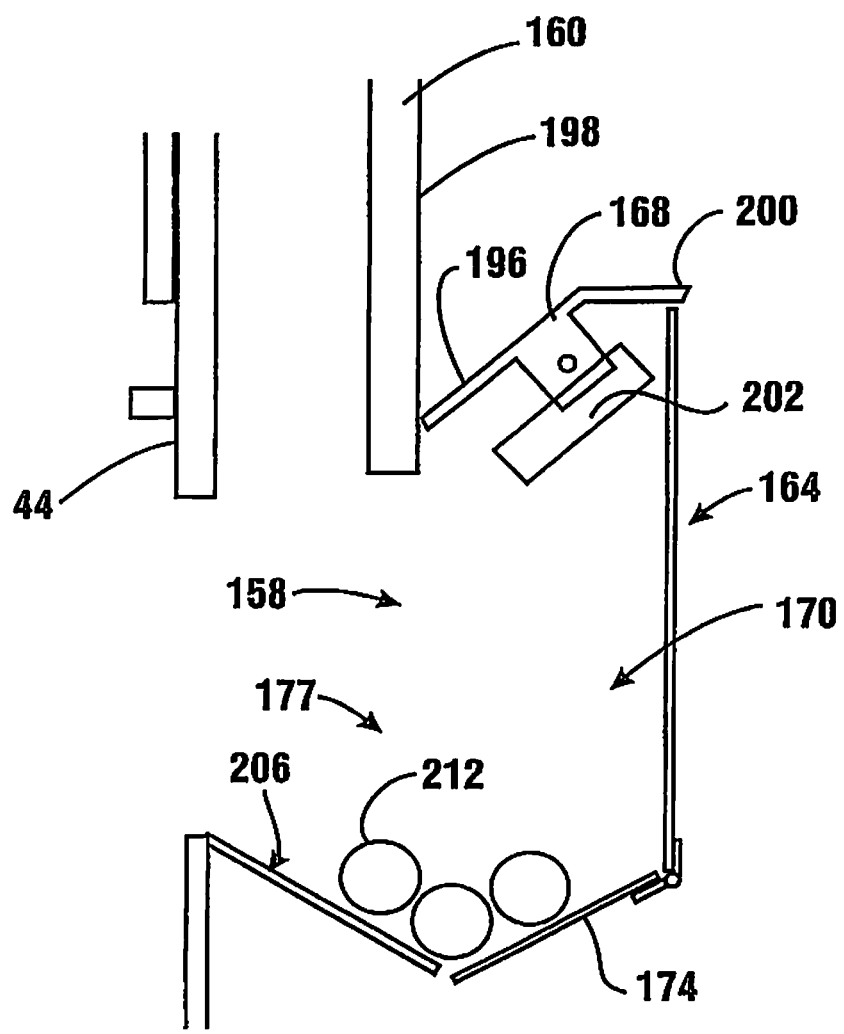
FIG. 16 is a side view of coin rolls in position to be taken by user.

As shown in FIG. 16 coin rolls which have been dispensed, are held in the holding area in supporting connection with the door member 174 and ramp surface 206 in the passages 170. When the door 44 on the fascia cover unit is moved to an open position responsive to the operation of the terminal processor as shown in FIG. 16, the dispensed coin rolls 212 are accessible through an opening to the user from the exterior of the machine. As previously discussed, these dispensed coin rolls are preferably aligned by action of the deflectors and are segregated by denomination in the plurality of holding areas bounded by the dividers 172. A user is enabled to reach in through the opening 158 in the housing door 160 to extract the dispensed coin rolls.

As represented in FIG. 16, the deflectors 168 are also preferably configured to prevent users from reaching upward through the passages to access the coin-dispensing mechanism. This is achieved in the exemplary embodiment by the second-engaging surface 200 being in close relation with a wall of housing 164 and coin-engaging surface 196 being in close proximity to aligning surface 198. This configuration blocks efforts to move an instrument upward in passages 170. Similarly the counterweight portion 202 is operative to resist attacks which may be directed upward through the passage portions. The configuration of the rolled coin dispensers 140 with the coin outlet 152 positioned above the coin roll storage cassettes 142 also reduces the chance of unauthorized personnel gaining access to the interior of the unit.

During the course of transactions in which coin rolls are dispensed, users will generally remove their coin rolls from the passages. If a transaction is concluded and a user has failed to take dispensed coin rolls, the presence of one or more remaining coin rolls is sensed by sensors 190. In response to sensing remaining coin rolls at the end of the transaction, the terminal processor is operative in accordance with its associated programming to cause mechanism 162 to retract such coin rolls into the coin retraction pocket 176 of the machine. In an exemplary embodiment the retraction is done responsive to a user failing to take the dispensed coin rolls a time after they are dispensed or after a transaction. The terminal processor includes a timer function to carry out the retraction of coin rolls in accordance with its programming.

Figure 18:
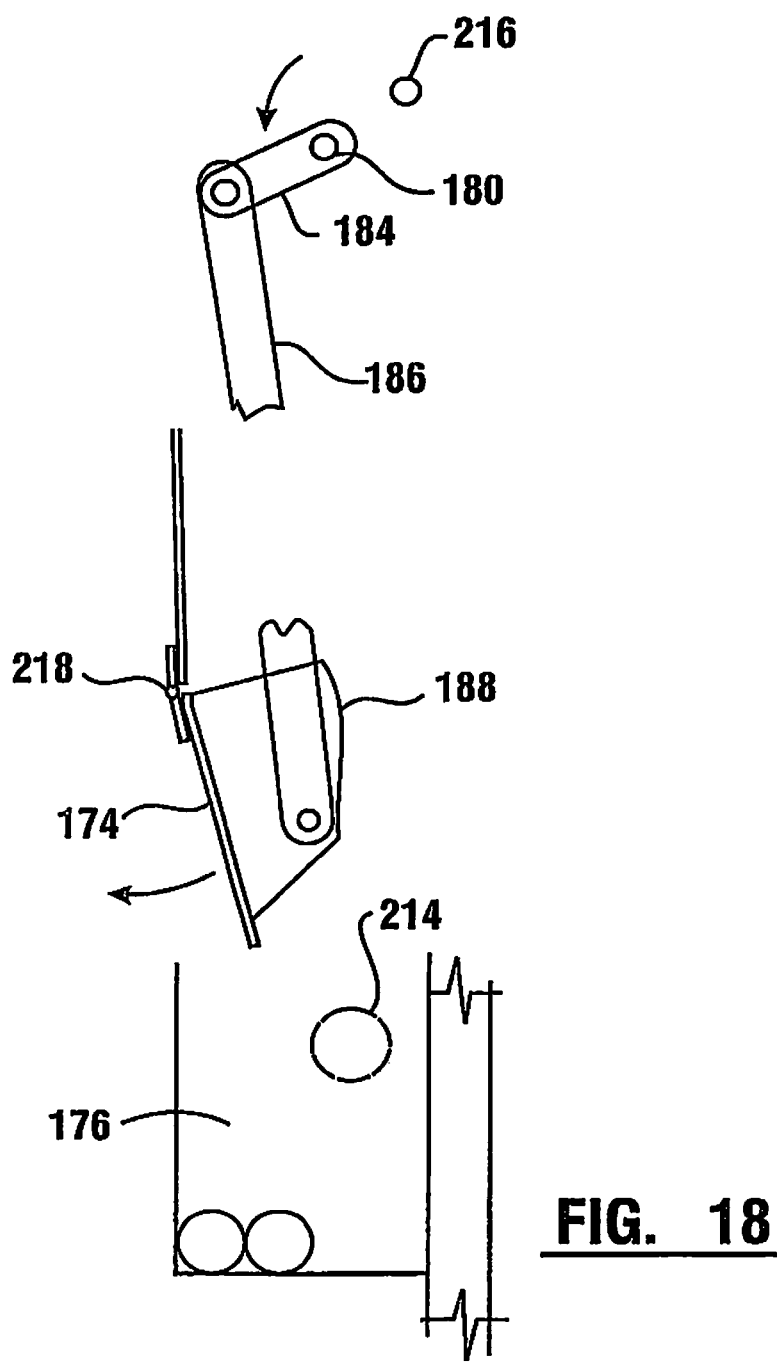
FIG. 18 is a schematic view similar to FIG. 17 with the roll coin retraction unit moved to a position to retract coin rolls within the machine.

How coin rolls are retracted is shown schematically in FIGS. 17 and 18. In response to at least one of sensors 190 sensing a coin roll 214 remaining after a transaction, drive 178 is operative to rotate shaft 180 from the initial position shown in FIG. 17. It should be noted that in this initial position, first link 184 is in an over-center position relative to the axis of rotation of shaft 180. In this over-center position link 186 is engaged with a stop 216. As a result, efforts to move the door member downward from this position will be resisted by the stop 216. This configuration helps to prevent unauthorized persons from gaining access to the coin retraction pocket 176.

When the coin rolls supported on the door member 174 are to be retracted, shaft 180 is rotated so that first link 184 rotates in a counterclockwise direction as shown in FIG. 17. Such movement causes link 186 to move downward rotating door member 174 in a clockwise direction as shown about a pivot hinge connection 218. As a result of door member 174 rotating downward, coin roll 214 in the holding area falls into the coin retraction pocket 176. The retracted coin roll remains in the retraction pocket which serves as a storage area until authorized personnel access the interior of the housing and remove the roll therefrom. The terminal processor then operates the drive 178 to return the door member 174 to the position shown in FIG. 17. If the sensors 190 continue to sense coin rolls in a position within the passages, the terminal processor may be operative to repeat the process in accordance with its programming a number of times until either a failure status is indicated or the coin roll falls into pocket 176. The particular programming of the system may make several attempts to clear coin rolls and may provide an indication of a failure if after several attempts coin rolls are still sensed within the passages 170. As the terminal processor moves the member 174 it operates to maintain coin roll door 44 in a closed position.

Figure 7:
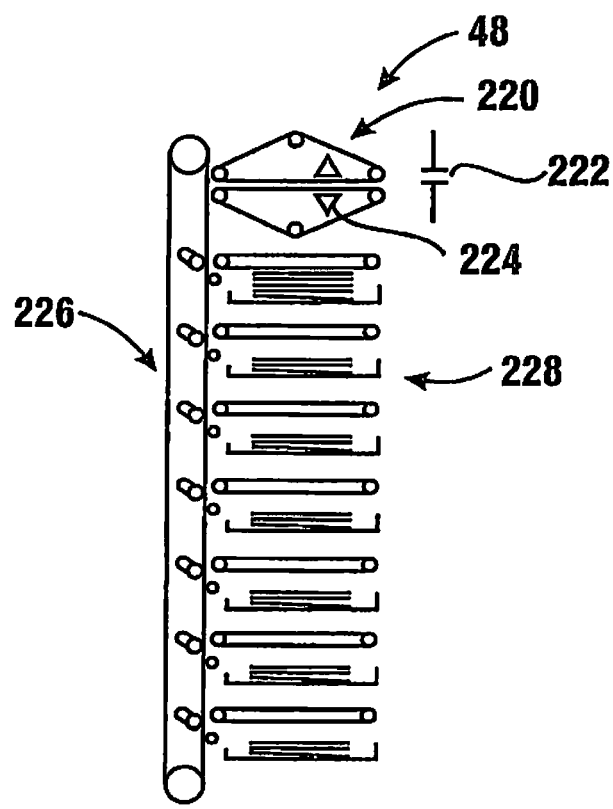
FIG. 7 is a schematic view of a note acceptor unit used in an exemplary embodiment.

Housing portion 214 includes note acceptor 48. The note acceptor 48 is schematically shown in FIG. 7. In embodiments of the note acceptor may be of a type shown in U.S. Pat. No. 6,273,413, U.S. Pat. No. 6,109,522, U.S. Pat. No. 7,331,513 and/or U.S. Pat. No. 7,261,231 the disclosures of which are incorporated herein by reference as if fully rewritten herein. As shown in FIG. 7, the note acceptor of the exemplary embodiment includes a transport 220 for moving notes accepted through an opening 222 which extends through door 160. The transport 220 is operative to move inserted notes past sensory units 224. Sensory units 224 determine the type of notes inserted and distinguish valid notes from invalid notes. Sensory units 224 may be of the type shown in U.S. Pat. No. 5,923,413 owned by the Assignee of the present invention and which is incorporated herein by reference as if fully rewritten herein. Such sensors may work in connection with a terminal processor or other processors within the apparatus 10 for purposes of processing signals from the units to determine the denomination and genuineness of notes passed through the transport 220. Of course, it should be understood that many types of devices for identifying and validating notes may be used in exemplary embodiments.

Notes determined as valid and acceptable by the sensors 224 are passed through further transports 226 to note storage areas 228. Each note storage area 228 is preferably configured for holding a particular type and/or denomination of note therein. The note validator may be operative depending on its programming and the nature of the note acceptor to reject notes which cannot be identified or which are invalid by passing them outward through the opening 222. Alternatively such notes may be accepted into the mechanism and stored in a designated note storage area for later analysis.

The notes accepted into the machine may remain in the note storage areas until removed therefrom by personnel accessing the interior of housing portion 14. Alternatively, embodiments may operate in the manner of the incorporated disclosures, to accept and store notes in the machine as well as to dispense previously accepted notes in response to requests by users. The approach taken will depend on the particular requirements and capabilities required of the apparatus.

Figure 22:
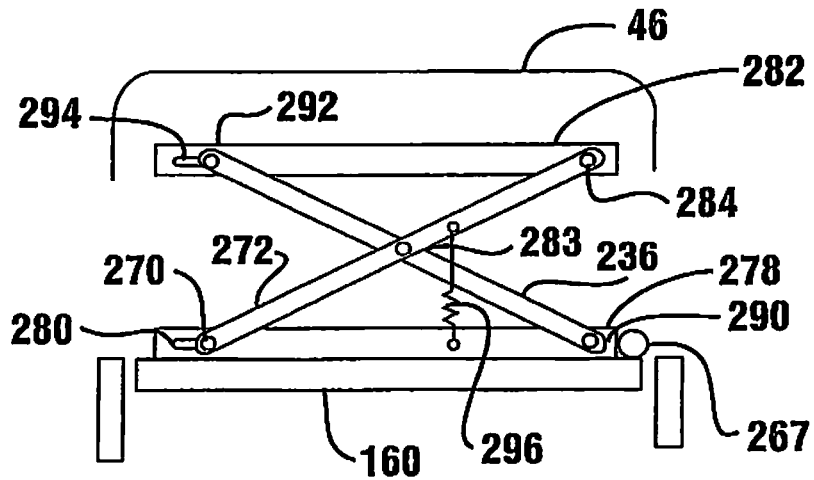
FIG. 22 is a schematic view showing the upper fascia moving mechanism in an extended position.
Figure 23:
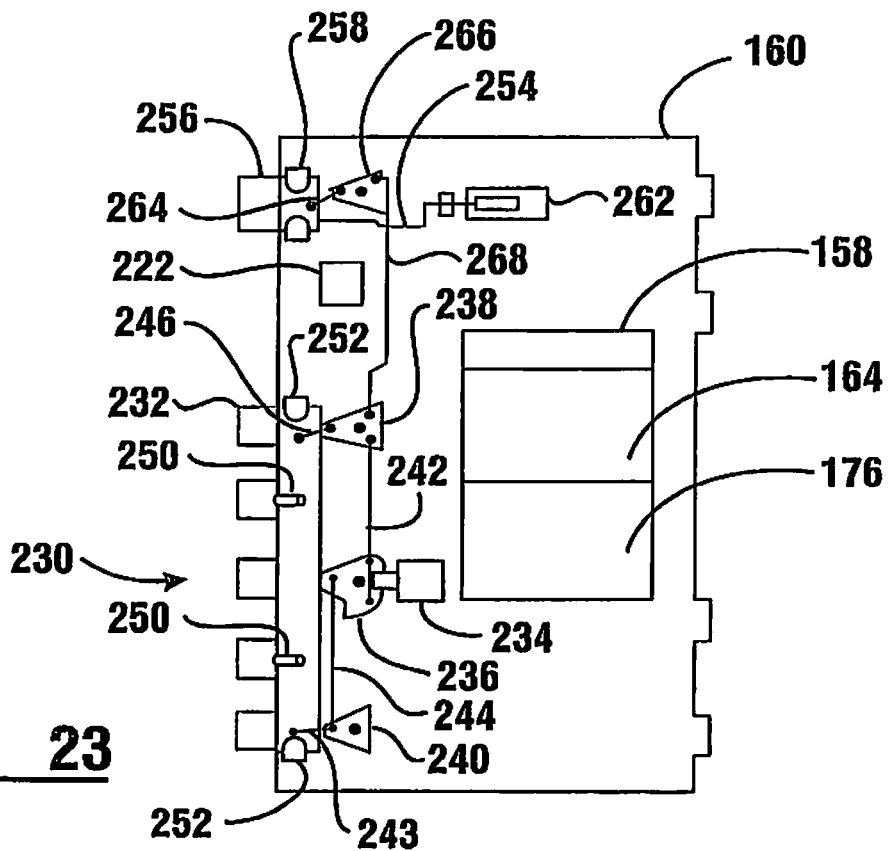
FIG. 23 is a rear schematic view of the boltwork and deadbolt used in connection with the housing for the rolled coin dispenser and note acceptor.

The described exemplary embodiment includes a movable fascia 46 on housing portion 14. The movable fascia is operative to move outward relative to the access door 160 overlying the interior area of the second housing portion 14. This is accomplished in the described embodiment by the mechanism shown in FIGS. 19 through 23. As shown in FIG. 23, the interior of door 160 has a boltwork generally indicated 230 in supporting connection therewith. Boltwork 230 is part of a holding mechanism for door 160 and includes a movable bolt 232, which is movable in an unlocked condition between an extended position in which the bolt engages the housing to hold the door closed, and a retracted position in which the door 160 is enabled to be opened. The ability to move the bolt 232 is controlled by a locking mechanism 234. The locking mechanism is controlled by a lock dial 235 similar to lock dial 70 previously discussed or other suitable locking mechanism. In an unlocked condition of the locking mechanism 234, a rotatable member 236 is enabled to be rotated by rotating a handle 237 extending on the exterior of the door 160. The handle may be of the type previously described or other suitable handle for rotating the rotating member.

Movement of the bolt 232 is accomplished by the rotating member 236 rotating idler members 238 and 240. The idler members are connected to the rotating member 236 through intermediate links 242 and 244. The idler members 238 and 240 are respectively connected to the bolt 232 by further links 246 and 248. The bolt is selectively movable inward and outward in supporting connection with central slotted guides 250 and outer guides 252. Except as otherwise specifically described herein, the boltwork of the described embodiment is similar to the boltwork disclosed in International Publication No. WO98/26380 owned by the Assignee of the present invention and which is incorporated by reference as if fully rewritten herein.

In the exemplary embodiment, a supplemental bolt 256 is disposed adjacent to the upper end of door 160. Bolt 256 is movably mounted in supporting connection with guides 258 which are shown schematically. Supplemental bolt 256 is in operative connection through a tie rod 254 with an actuating member 260. Actuating member 260 extends in a slot 262 in door 160 (see FIGS. 24 and 25).

As shown in FIG. 23 supplemental bolt 256 is connected to a link 264 through a rotatable idler member 266. Idler member 266 is rotatably mounted in a manner similar to members 236, 238 and 240 in supporting connection with door 160. Idler member 266 is connected through a link 268 to idler member 238. As a result of this connection, supplemental bolt 256 moves between the extended and retracted positions in coordinated relation with bolt 232. The supplemental bolt 256 acts with bolt 232 in the extended position to hold door 160 in a closed position. Likewise, in response to opening locking mechanism 234, bolt 232 as well as supplemental bolt 256 may be retracted so that door 160 can be opened.

Figure 25:
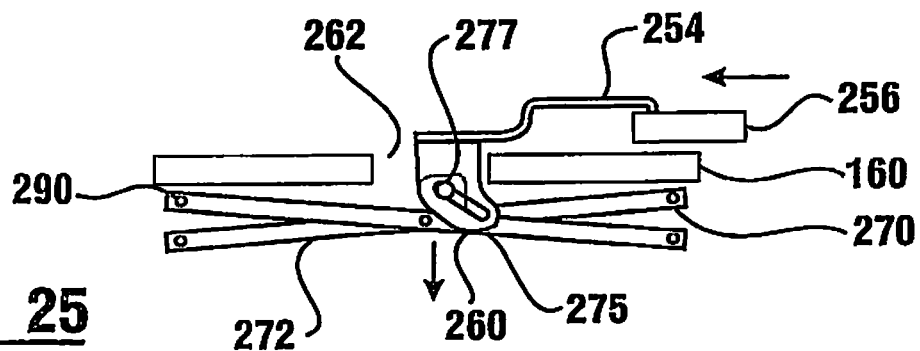
FIG. 25 is the schematic view of the movable upper bolt portion which is operative to move the fascia moving mechanism.
Figure 24:
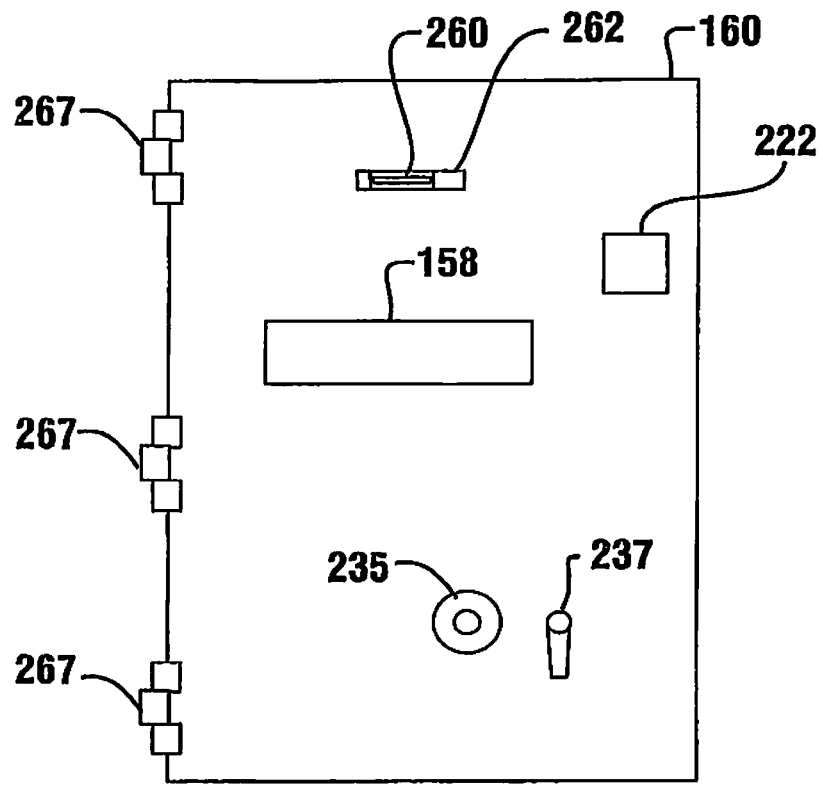
FIG. 24 is a front view of the door of the enclosure housing the rolled coin dispenser and note acceptor.

As can be appreciated in FIGS. 24 and 25, as supplemental bolt 256 moves from the extended to the retracted position, actuating member 260 moves relative to slot 262. Actuating member 260 is a flat cam which includes a slot 275 therein. A pin member 277 is connected to a further member 272. As schematically indicated in FIG. 25, the movement of pin member 277 is operative to cause fascia cover unit 46 to move outward in response to the retraction of supplemental bolt 256. This is desirable in the described exemplary embodiment to enable door 160 to be opened.

Figure 19:
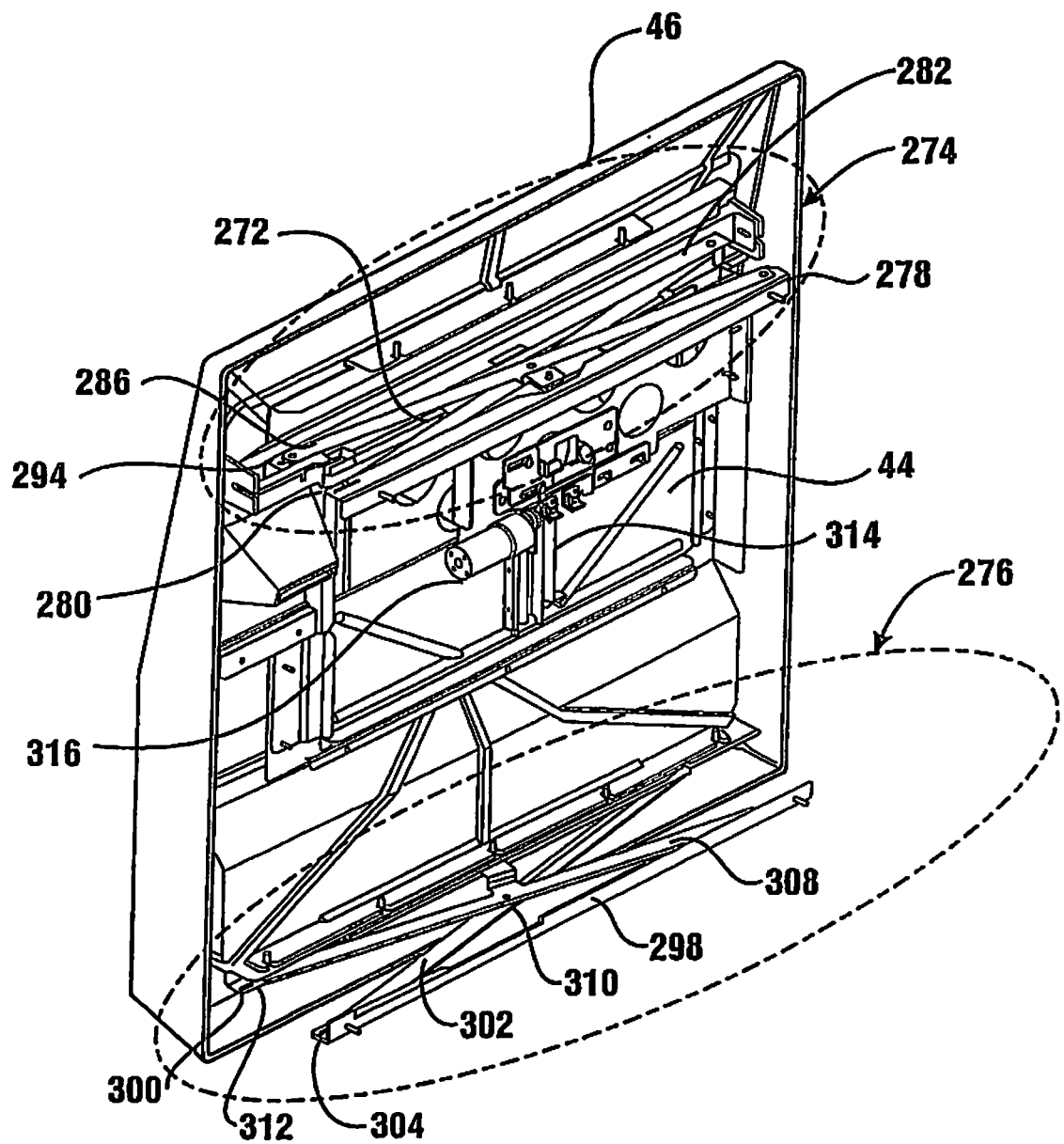
FIG. 19 is a back view of the fascia associated with the rolled coin dispenser and note acceptor unit.
Figure 20:
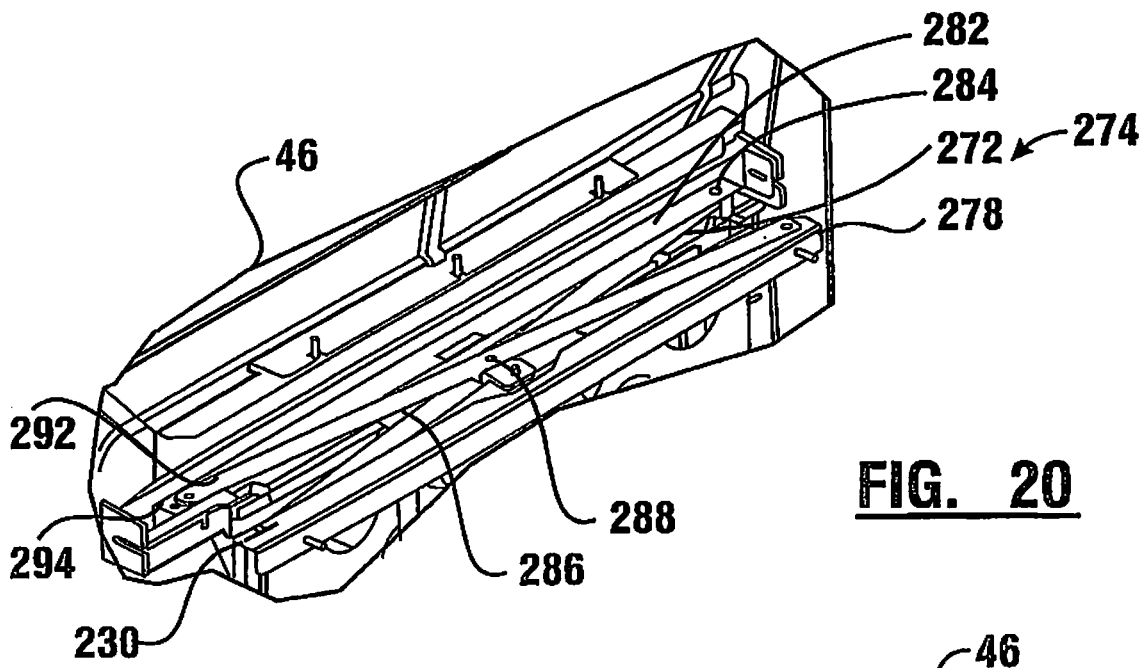
FIG. 20 is an enlarged view of the upper fascia moving mechanism shown in FIG. 19.
Figure 21:
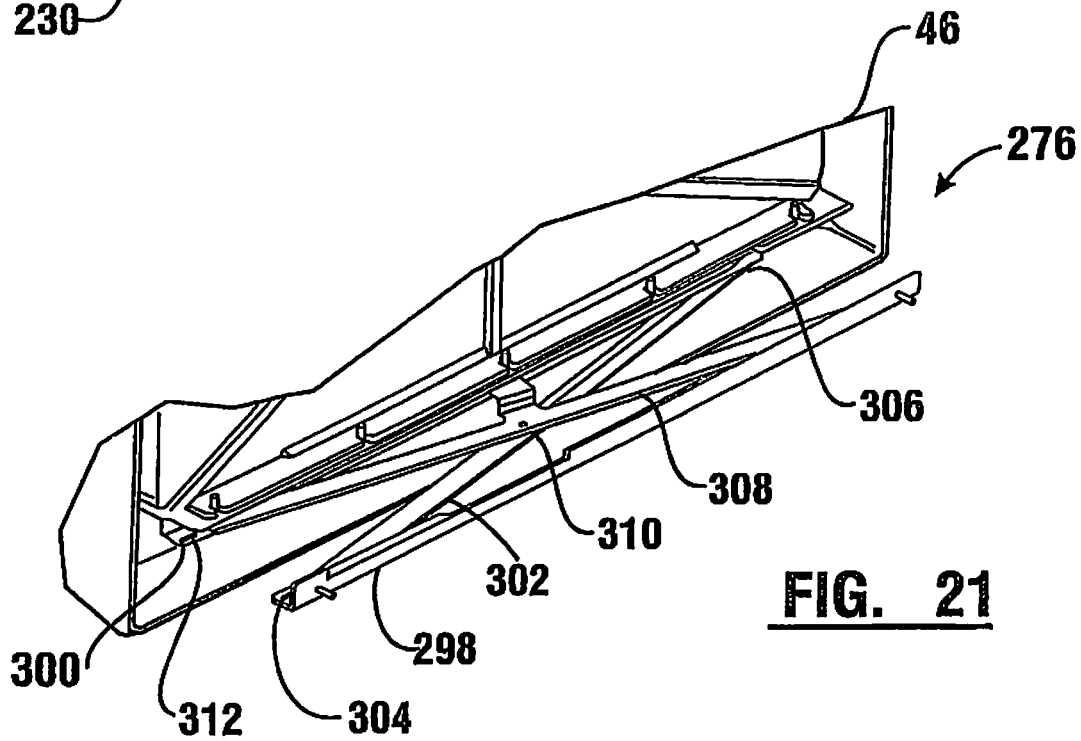
FIG. 21 is an enlarged view of the lower fascia moving mechanism shown in FIG. 19.

In the described embodiment, the fascia unit 46 is configured in the locked condition of the door 160 to fit generally in flush relation against the walls of the housing. To achieve this construction in the closed position of the unit, provisions are made for the fascia 46 to move away from the unit so that the door 160 can be opened. As shown in FIG. 19 through 21 this is achieved by mounting the fascia cover 46 to the door 160 through an upper extension mechanism 274 and a lower extension mechanism 276. The upper extension mechanism 274 is mounted to door 106 through a support 278. The support 278 includes a slot 280 which extends generally parallel to the face of door 160. As best shown schematically in FIG. 22, a pin 270 on member 272 extends through slot 280 so that movement of the actuator member 260 causes the pin 270 to move therein.

A further support 282 is attached to the fascia cover 46. Link 272 is attached in pivoting connection to support 282 at an end opposite of slot 280. The connection of link 272 to support 282 is through a pin 284 having an axis rotation that is fixed relative to support 282.

Link 272 is rotatably connected to a further link 286 about a central pin 288. Link 286 is attached to support 278 through a pin 290 having a fixed axis of rotation. Link 286 is attached to support 282 through pin 292 which is movable in a slot 294. As best shown in FIG. 22, a biasing member 296 acts on the upper extension mechanism in a manner tending to hold cover 46 adjacent to door 160.

The lower extension mechanism 276 generally is constructed in a manner similar to upper extension mechanism 274. Extension mechanism 276 includes a support 298 in operative connection with door 160. A support 300 is in operative connection with the movable cover 46. A link 302 is in movable connection with support 298 through a first slot 304 and is in pivoting connection with support 300 through a pin 306. A further link 308 is connected to link 302 by a pin 310 and is connected to support 298 about a pin not shown. Link 308 is further connected to support 300 through a slot 312. A biasing member (not shown) is connected to the lower extension mechanism 276 to bias the cover 46 in an inward direction.

As will best be appreciated from FIGS. 22 and 23, movement of the supplemental bolt 256 to a retracted position moves actuating member 260 inward relative to slot 262. This moves pin 277 outward relative to slot 275. Such movement causes links 272 and 286 to move in a scissors action moving cover 46 outwardly relative to door 160. Links 302 and 308 of the lower extension mechanism 276 moves similarly further urging the fascia cover 46 outwardly to the position shown in FIG. 22. The access door is connected through hinges 267 to the housing. When the holding mechanism is opened the fascia 46 moves outward away from the hinges and the housing. This enables the door 160 to be opened without interference from the fascia 46.

Similarly when door 160 is closed, movement of the bolt 232 and the supplemental bolt 256 to an extended position moves the actuating member 260 and link 272 to move fascia 46 inward. Thus as the boltwork on door 160 is moved to a secure condition, the cover 46 is moved against the enclosure. As can be appreciated alternative forms of the fascia or other cover may extend around one or both sides and/or the top of the enclosure provided the cover moves outward sufficiently to enable opening the door.

It should be understood that in alternative embodiments the movement of the bolt 232 may be used to move the lower extension mechanism 276 in a manner similar to the way that the upper extension mechanism 274 is moved by the supplemental bolt 256. In such alternative embodiments the positive movement of the mechanisms at both ends of the fascia provide for reliable and controlled movement of the cover 46.

As shown in FIG. 19 the cover 46 includes the movable door 44 which is moved to provide a user with access to dispensed coin rolls. Door 44 in this exemplary embodiment has thereon projections generally indicated 314. The projections 314 generally define one or more Z-shaped slots on an inner face of the door. An actuator 316 is operative to move a follower member (not shown) relative to the slot. Movement of the actuator 316 is controlled responsive to the terminal processor so that when a user is authorized to receive coin rolls, the user is enabled to move door 44 to an open position. When the user is not authorized to open the door, the actuator 316 operates to hold the door in a closed position. In an exemplary embodiment the door and actuator are configured to operate in a manner similar to that disclosed in U.S. Pat. No. 5,590,609 owned by the Assignee of the present invention and which is incorporated by reference as if full rewritten herein. Of course, in alternative embodiments alternative types of actuator mechanisms may be used.

Figure 26:
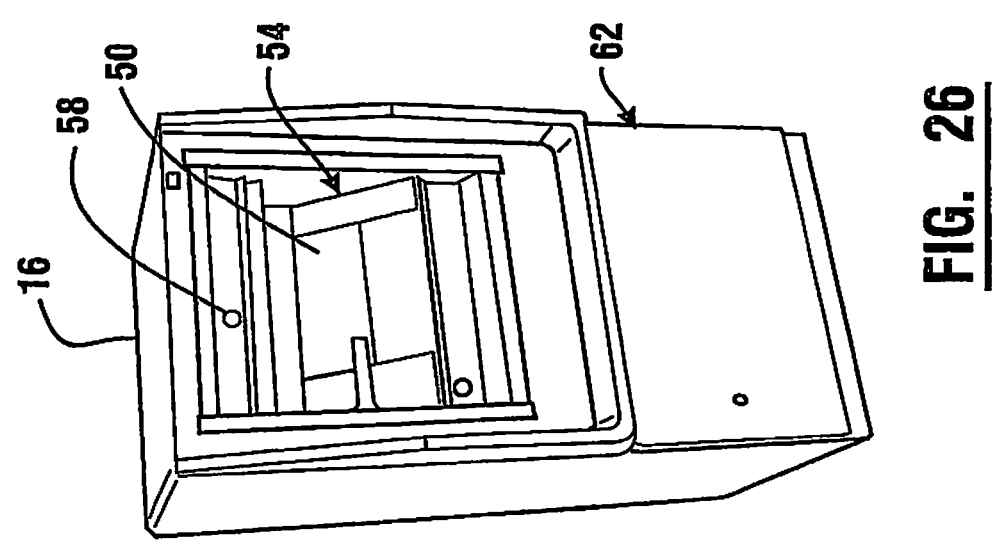
FIG. 26 is a front isometric view of the bag depository portion of the apparatus shown in FIG. 1.
Figure 28:
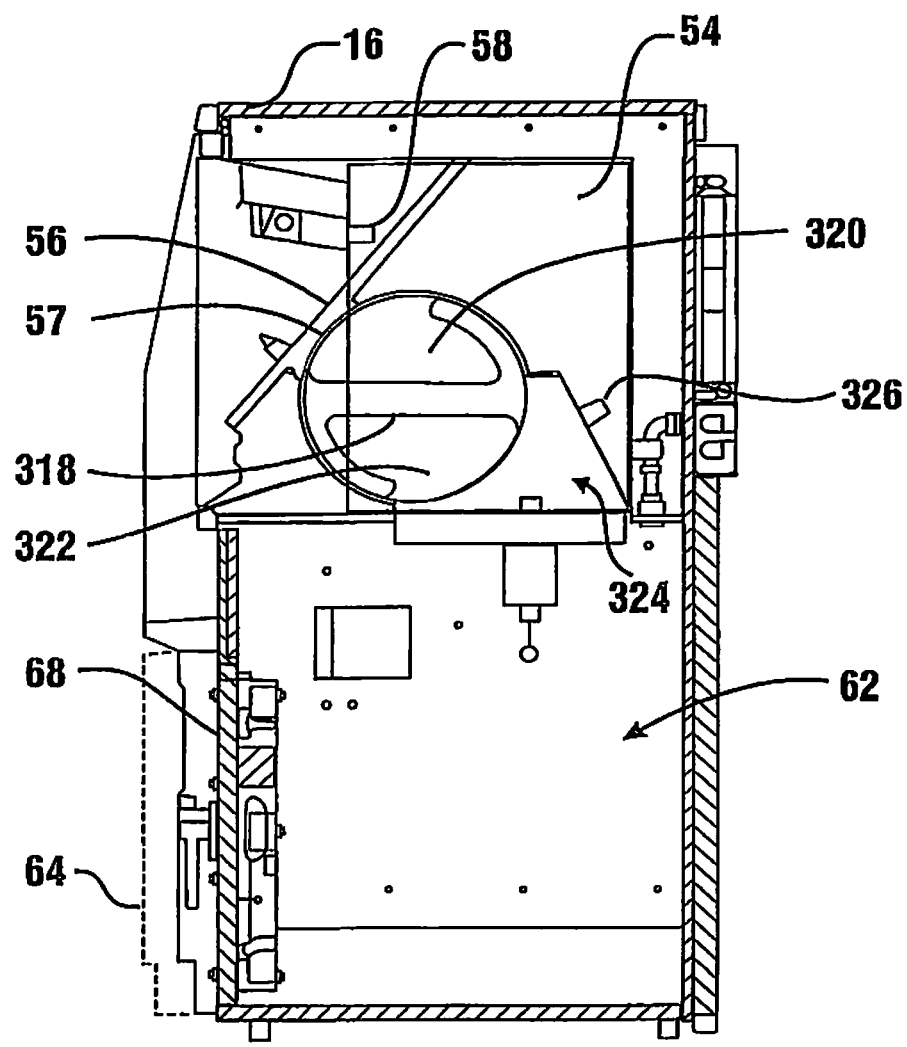
FIG. 28 is a cross-sectional view of the bag depository portion shown in FIG. 26.

FIGS. 26 through 28 describe housing portion 16 which is operative to accept bag deposits or other types of deposit items therein. Depository head portion 54 includes a rotating pocket assembly 318. Rotating pocket assembly 318 serves as an item transport for deposit items and is rotatable responsive to a drive or similar moving device to rotate relative to head portion 54. Rotating pocket assembly 318 includes a first pocket 320 and a second pocket 322. When door 56 is moved to an open position a user is enabled to access the interior area of the housing and the pocket adjacent thereto through the open access opening 57. After a user inserts a bag or other item to be deposited into the adjacent pocket, the rotating assembly 318 is rotated preferably in a clockwise direction as shown in FIG. 28. The deposited item is transported away from the access opening so it cannot be accessed through the opening by a user. The deposit item is passed by gravity out of the pocket through a throat area 324 and moves into the internal storage area of the secure chest 62. As will be appreciated from FIG. 28 the rotating assembly need only rotate one hundred eighty degrees to transfer each deposited item into the secure chest portion.

In the embodiment shown, the head portion 54 includes the exterior camera 58 which captures the user image. The throat area 324 further includes a camera 326 therein. Camera 326 serves as an interior imaging device which has a field of view which includes the interior area of the housing. In one exemplary arrangement the camera 326 is an infrared camera which is capable of delivering images of items in near total darkness conditions which may exist in the internal area of the housing in the vicinity of the throat area. This feature enables capturing images of both the user depositing items into the bag depository as well as the items deposited. This provides further documentation of the making of deposits. The internal imaging device and external imaging device may be placed in other locations in alternative embodiments. Of course, in alternative embodiments other types of cameras or imaging systems may be used. Such systems may include having lighting provided in the throat area so as to illuminate the deposited items. The images of the user and the deposited items are captured in the exemplary system using an Accu-Track™ digital video recorder playback system commercially available from Diebold, Incorporated of North Canton, Ohio or a system of the type described in connection with U.S. Pat. No. 6,583,813, the disclosure of which is incorporated by reference as if fully rewritten herein. Of course, in alternative embodiments other image capturing mechanisms may be used.

In the exemplary embodiment the user image and the corresponding item image are stored as digitized images in a data store operatively connected to the imaging devices and at least one computer. The images are preferably stored together or in correlated relation such that they can be recovered together to show what the deposit item looked like and the appearance of the person who deposited it. In some exemplary embodiments the user image and item image are stored together as a single combined image to create a permanent correlation between the user and the deposit item.

The operation of the described exemplary embodiment in connection with conducting merchant banking transactions is explained in connection with the screens presented in FIGS. 29 through 54. The exemplary embodiment is operative to perform deposit and exchange transactions in the manner described responsive to inputs to the user interface. Of course, in other embodiments additional or alternative transactions may be performed.

Figure 29:
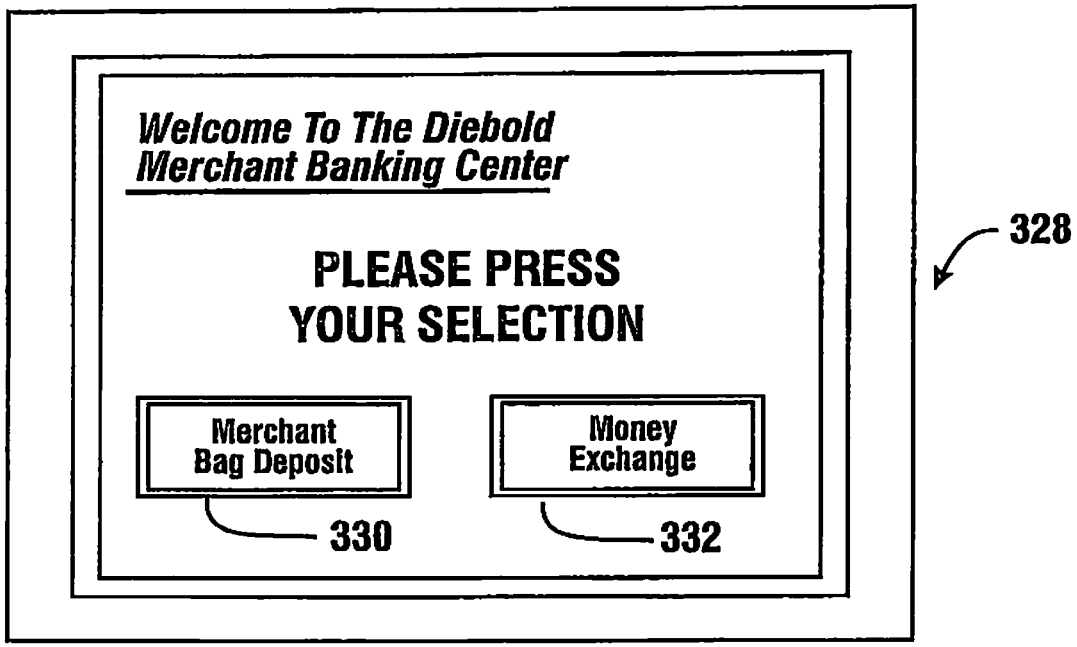
FIGS. 29-43 are exemplary screen displays output through the user interface of the apparatus which exemplify a logic flow used in connection with money exchange transactions.

In the exemplary embodiment, when the apparatus 10 is in a wait or idle state waiting to conduct a transaction, a screen 328 which is shown in FIG. 29 is presented. The screen is produced in the exemplary embodiment responsive to the terminal processor 74 and data in the data store 76. Screen 328 prompts the user to select either a merchant bag deposit icon 330 or money exchange icon 332. This is done by the user bringing their finger adjacent to the touch screen. Of course, in other embodiments other screens may be presented.

It should be understood that embodiments may operate to present other types of opening screens. Such screens may provide marketing information to prospective users approaching the machine. Such marketing information may be provided from the information stored in the data store 76 or may be based on presentations loaded into the apparatus 10 from a remote location such as marketing server 120 shown in FIG. 4.

For purposes of describing an exemplary transaction, it will initially be assumed that a user selects the money exchange icon 332 in FIG. 29. This causes the terminal processor to display a screen 334 shown in FIG. 30. This screen prompts the user to select either an icon 336 indicating that they intend to use a bank card when conducting the money exchange transaction or alternatively an icon 338 in which a money exchange transaction is conducted without the use of a bank card. For purposes of this exemplary transaction it will be presumed that the user selects icon 338 which is an input through which they indicate that they are not going to use a card.

Figure 30:
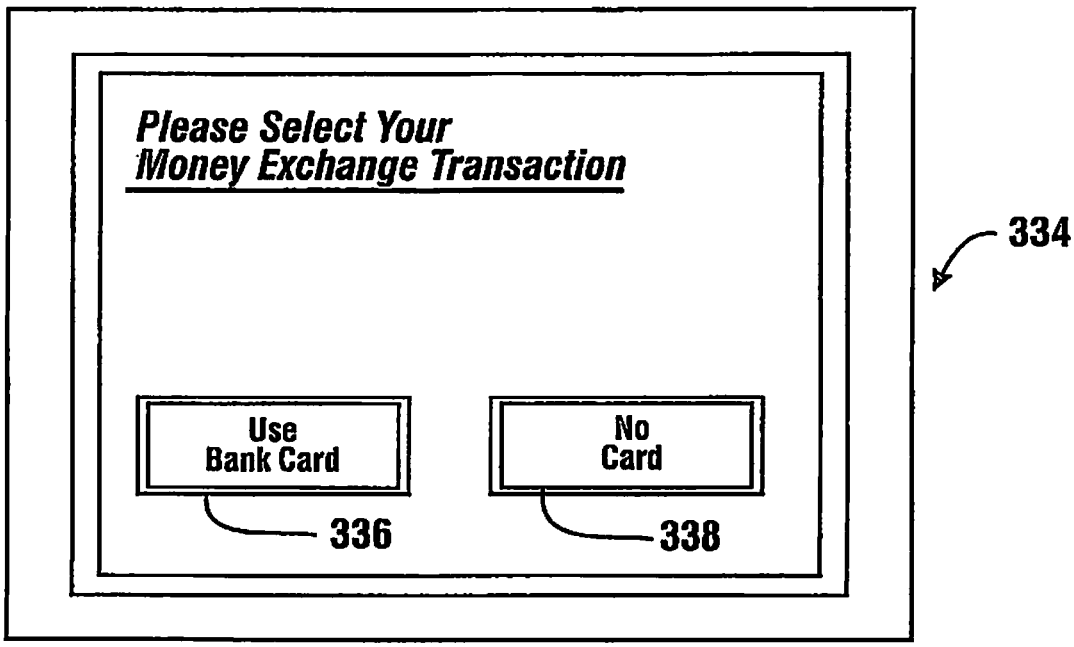
Figure 31:
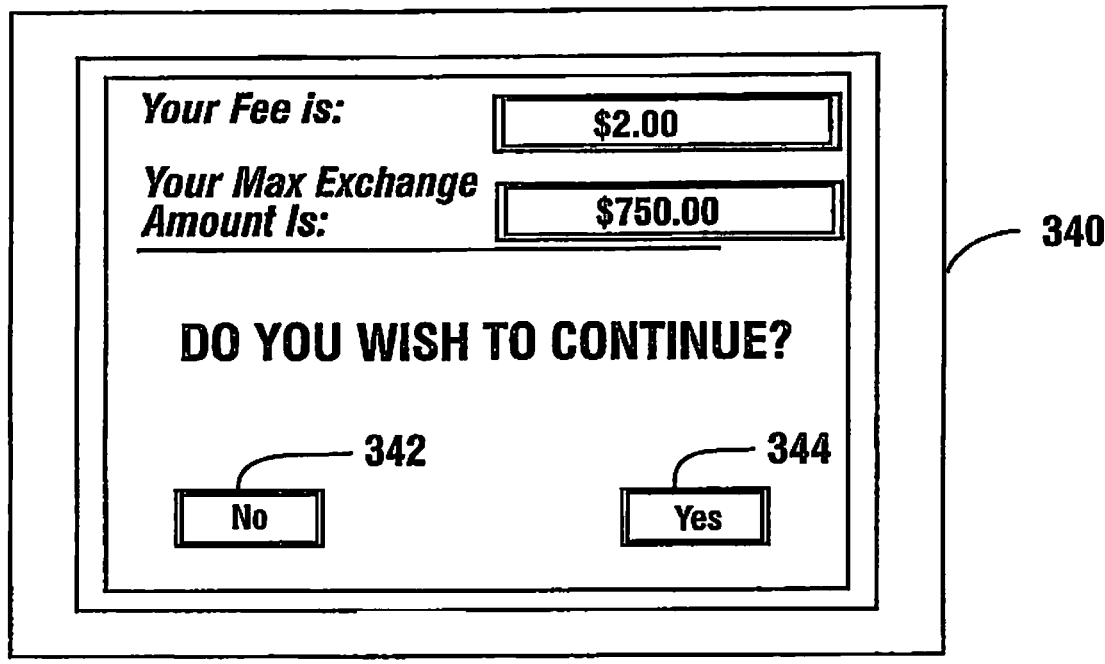
Figure 32:
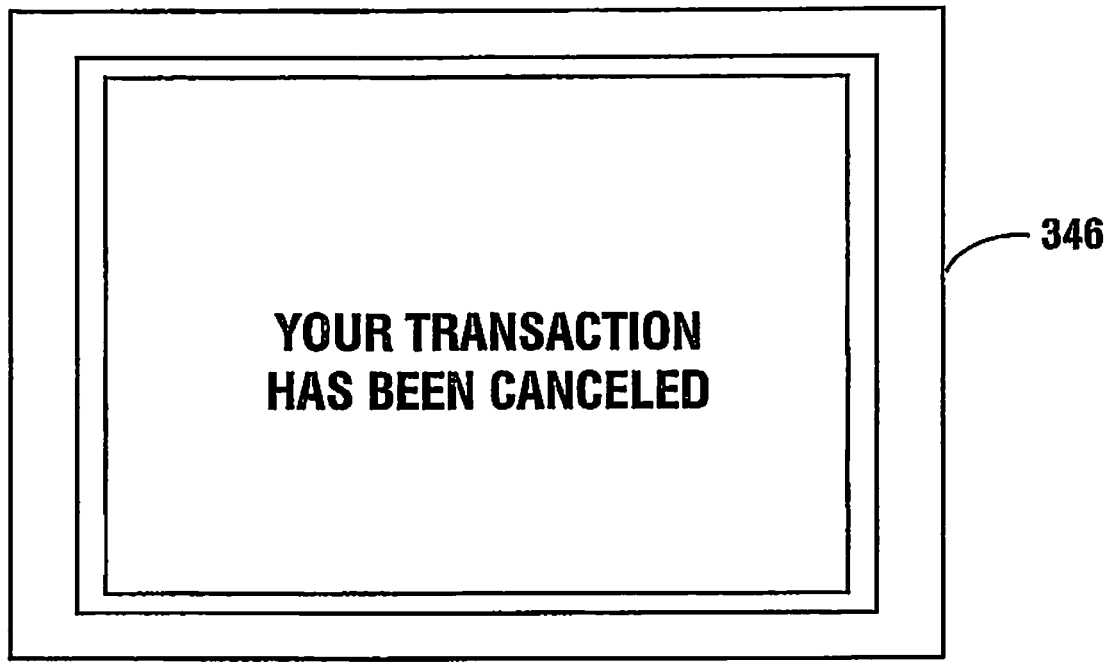

In response to the user selection in FIG. 30, a screen 340 shown in FIG. 31 is caused to be displayed by the terminal processor on the touch screen 20. Screen 340 advises a user in this exemplary transaction that a $2 fee will be charged as a service charge amount and that the maximum amount that can be exchanged is $750. Of course, these thresholds are settable by the owner of the apparatus through programming of the terminal processor. In screen 340 the user is given the option of selecting icon 342 if they wish to discontinue the transaction. The user is also presented with the option of selecting icon 344 if they wish to continue. If the user selects icon 342 indicating that they wish to stop the transaction, the terminal processor responds to this input by displaying screen 346 shown in FIG. 32. Screen 346 indicates that the transaction has been canceled, and after a period of time the terminal processor returns the logic flow relative to the initial screen 328 or other appropriate screen.

Figure 33:
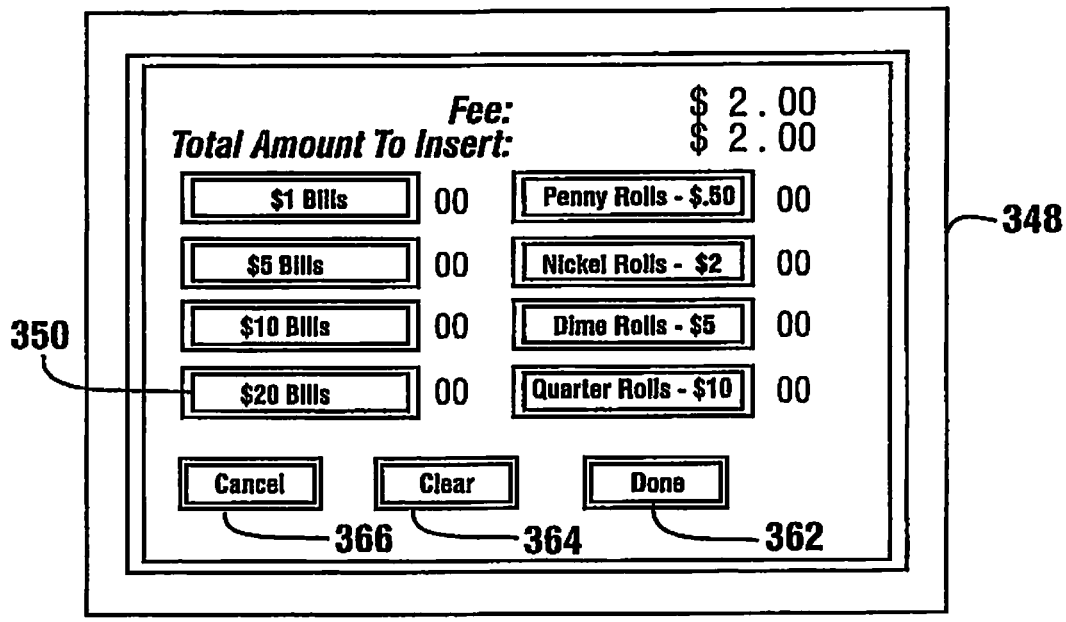

If the user elects to continue the transaction by touching icon 344 from screen 340, a screen 348 shown in FIG. 33 is displayed on the touch screen. In screen 348 the user is allowed to select the quantities of various bill types and roll coins that they wish to receive from the apparatus 10. Each denomination of bills and coins is associated with a respective icon which the user can touch to input the quantity of those particular items the user wishes to receive. In the exemplary embodiment the user can input the bill and coin types in any sequence selected by the user. For purposes of this exemplary transaction, it will be presumed that the user touches an icon 350 which corresponds to ten dollar bills.

Figure 34:
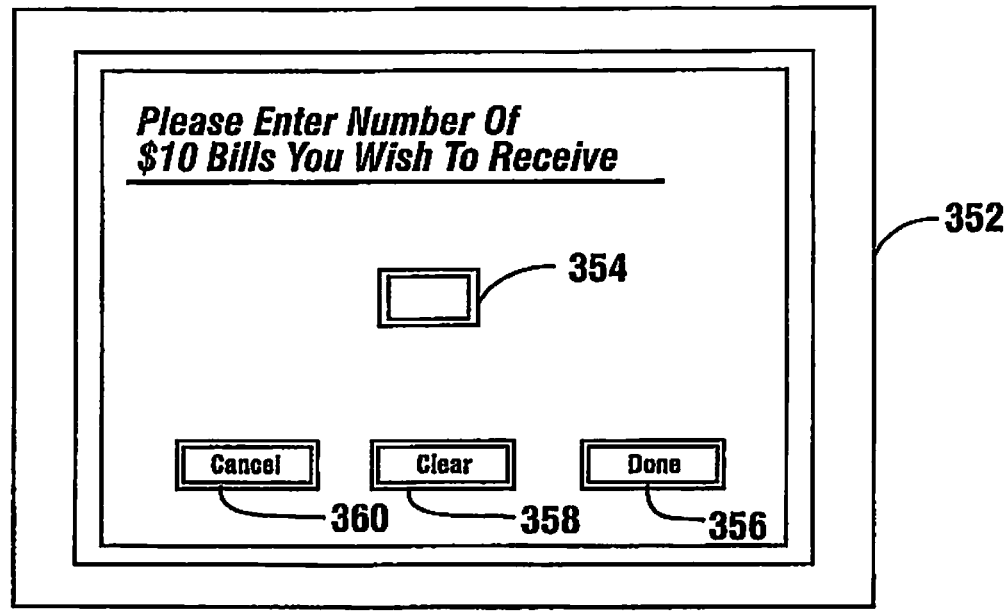

In response to the user touching icon 350 the terminal processor causes a screen 352 shown in FIG. 34 to be displayed. Screen 352 prompts a user to indicate the number or quantity of ten dollar bills they wish to receive. In response the user indicates the number of ten dollar bills by touching keys on the keypad 26. This number is displayed in a box 354 on the screen 352. If the user correctly inputs the number of ten dollar bills they desire, they can press the icon 356 to indicate they are done. The terminal processor returns to screen 348 shown in FIG. 33 with the number of ten dollar bills requested shown next to icon 350. If, however, from screen 352 the user decides that they have input an incorrect number of ten dollar bills, they can touch icon 358 and input a different number through the keypad. If the user decides that they do not want ten dollar bills, they can touch the icon 360 to indicate that they wish to cancel the request for ten dollar bills and return to the screen 348.

Once the user has input the amount of ten dollar bills they wish to receive, the user may repeat the process for each of the denominations of bills or coin rolls that they wish to receive. Each time an icon corresponding to a different denomination of bills or coins is selected, the user is enabled to input the quantity through a screen similar to screen 352. Through this entry of successive type and quantity inputs the user selects what they wish to receive. In the exemplary embodiment the terminal processor is operative to calculate the value associated with each quantity of each respective coin roll or bill type requested by the user. These amounts are included in a total amount which along with the service charge amount, is displayed to the user through the screen 348. The computer operates to update the total amount displayed by including the amount associated with each selection by the user of a quantity of coin rolls or bill types.

When the user has completed the process of indicating the bills and coin rolls they wish to receive, they may touch the "done" icon 362 in screen 348. If, however, the user has made a mistake and/or wishes to start over, they may touch a "clear" icon 364 in screen 348 which clears the screen to indicate zero quantities next to all denominations. Likewise if the user wishes to cancel the money exchange transaction, they may touch a cancel icon 366.

Figure 35:
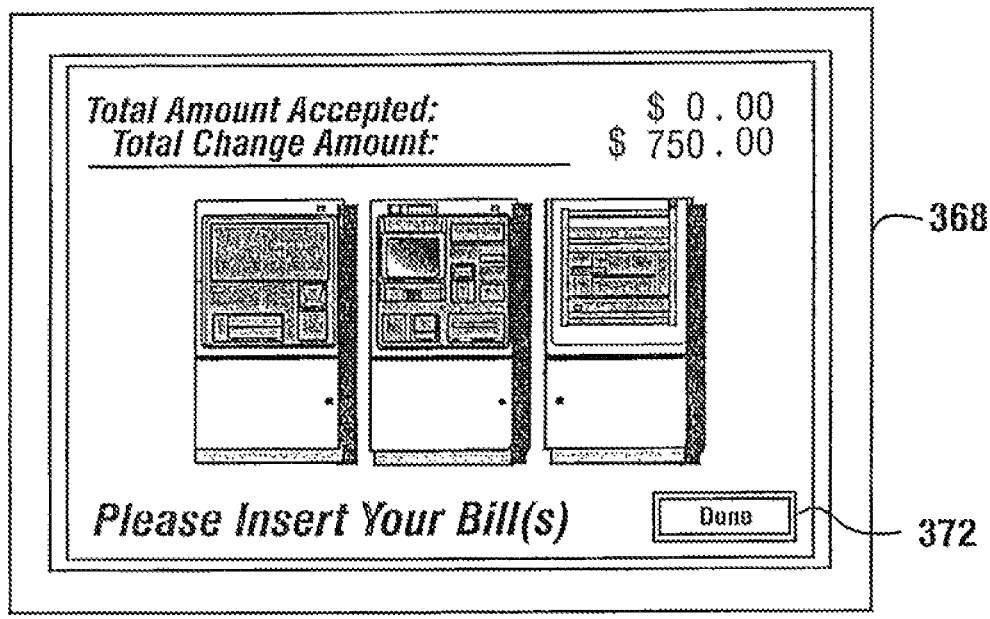

For purposes of the exemplary transaction, it will be presumed that the user requests a total of $748 in bills and coins, which with the $2 transaction fee produces a total change amount of $750. When the user presses the "done" icon 362 from screen 348 a screen 368 shown in FIG. 35 is caused to be displayed on the touch screen. Screen 368 includes a graphic representation of the apparatus 10 with an arrow indicating to the user where to insert their bills into the machine. This arrow points to a graphic representation of the opening to the bill acceptor on the second housing portion. The user then inserts currency notes. The "total amount accepted" quantity shown in screen 368 is incremented upwards each time the user inserts notes that are identified and accepted by the note accepting mechanism.

If the user inserts notes that are not identifiable or acceptable by the note accepting mechanism, such notes are returned to the user who may try to reinsert them again or may try other notes. The user may input notes equaling the total change amount or may input a somewhat greater or a lesser amount. If in the process of inserting the notes the user is slower than a time which is programmed in the data store associated with the terminal processor, a screen 370 shown in FIG. 36 may be displayed. Screen 370 includes icons which can be touched to indicate that the user needs more time or that the user is not requesting additional time.

When the user has inserted the funds that they intend to insert into the note acceptor in response to screen 368, the user touches the "done" icon 372. In response to touching the icon 372, the terminal processor operates the note dispensing mechanism and the coin dispensing mechanism to dispense the quantities and types of bills and coin rolls that the user has requested. In the described embodiment the requested bills are output through the opening from the note dispenser 30 in the first housing portion 12. The coin rolls are dispensed into the coin mechanism 162 and the user is enabled to slide open the door 44 to remove such coins. The terminal processor 74 may further output screen prompts for the user to take the dispensed bills and rolls. This may include screens with graphics similar to those in screen 68 which show the apparatus along with indicating arrows showing the user where to remove the bills and/or how to open the door to access the coin rolls. Such graphical presentations are helpful to a user who may be unfamiliar with the operation of the machine. Alternatively, other approaches such as flashing indicators in the area of the coin roll door or note dispenser may be used.

In some circumstances a user will not be able to insert the exact amount of cash that is required to produce the change and service charge. If from screen 368 the user touches the icon 372 when the total amount accepted is above the total change amount, the terminal processor is operative to dispense to the user all of the change requested as well as change in the form of additional bills (and/or coin) corresponding to the excess amount that the user has input. In this way the user is enabled to insert the amount they have and receive change from the machine. If the user indicates that they are "done" by pressing the icon prior to having input the amount they requested, the terminal processor will satisfy as much of the request as the user has provided funds to accomplish. This will be done in accordance with the programming of the terminal processor.

In the exemplary embodiment the terminal processor is operative to satisfy the dispensing requests by dispensing items until any further dispense would be in excess of the credit the user has on the machine. The user's credit in this situation is the amount the user has input less the service charge. In the case of a card based dispense which is done in response to messages from a host computer, the maximum credit may be set by the institution and the limit may be this maximum less the service charge amount.

In exemplary embodiments the apparatus operates to satisfy the customer's requests in a sequence. The sequence may consist of actually dispensing the items in an order or allocating the customer's available credit to certain of the items requested prior to making the dispense. The sequence is generally established in a predetermined manner based on the programming of the terminal processor.

In some exemplary embodiments the terminal processor is programmed so the sequence causes the terminal processor to be operative to satisfy the requests for the lowest denominations first until the money is used up. Thus, for example, the terminal processor will operate in accordance with its programming to first fulfill the user's request for penny rolls, then one dollar bills, then nickel rolls, then five dollar bills, then dime rolls, then ten dollar bills, then quarter rolls, and then twenty dollar bills. If the amount of money cannot satisfy the request for one denomination of coin or currency, the terminal processor will dispense as many of the requested denomination as the user has provided value for and then will dispense appropriate change. Alternative exemplary embodiments may be programmed to provide either the coin first then the notes or vice versa. The sequence may be lowest to highest denomination or other order. Other alternative embodiments may be programmed to deliver partial requests in the order that the user input them. For example, if the user requested ten dollar bills first in the input of the request, all of the ten dollar bills that the user requested will be dispensed (assuming that the user has input sufficient money to cover the requested ten dollar bills). Then the next item input will be dispensed until the value input has been used up. In this way the user is enabled to receive the full value in change of the amount of funds they input. In addition, if the user still requires additional funds, such funds may be obtained by either accessing a source of monetary value associated with a card in a manner later discussed or by reinserting dispensed bills and by obtaining change therefore.

Figure 37:
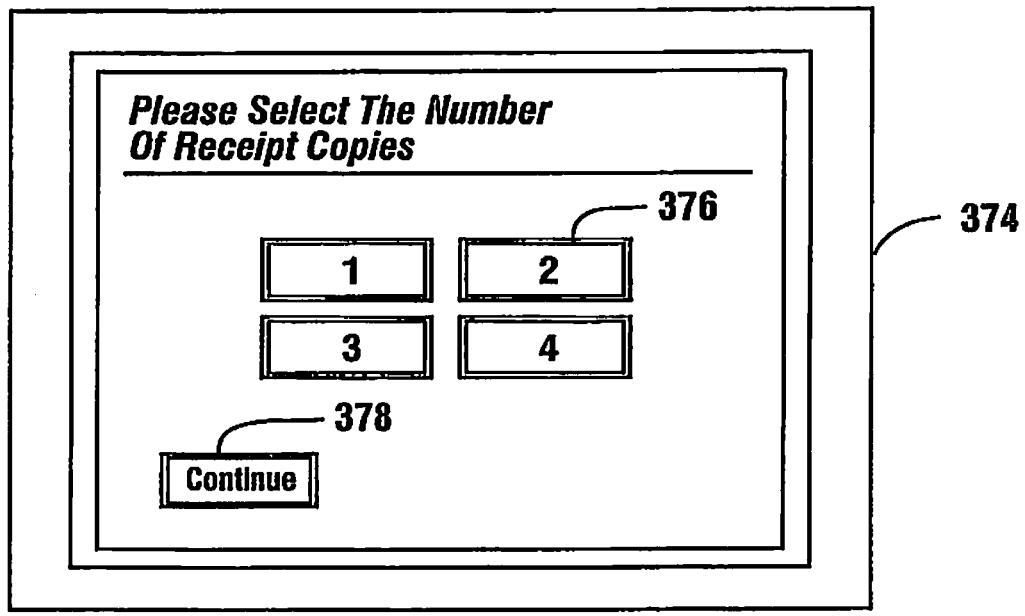
Figure 38:
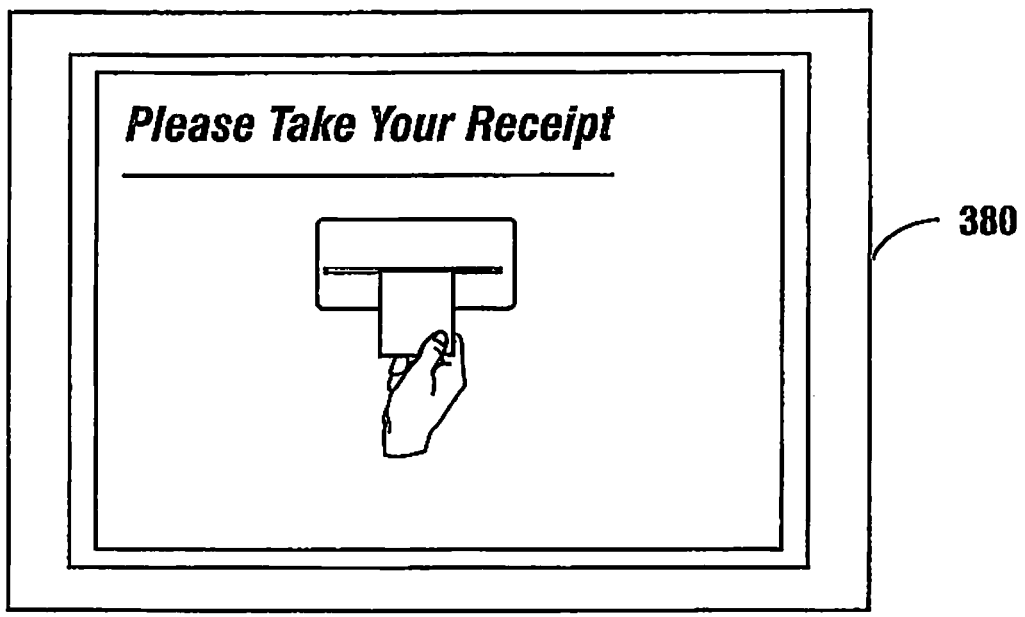
Figure 39:
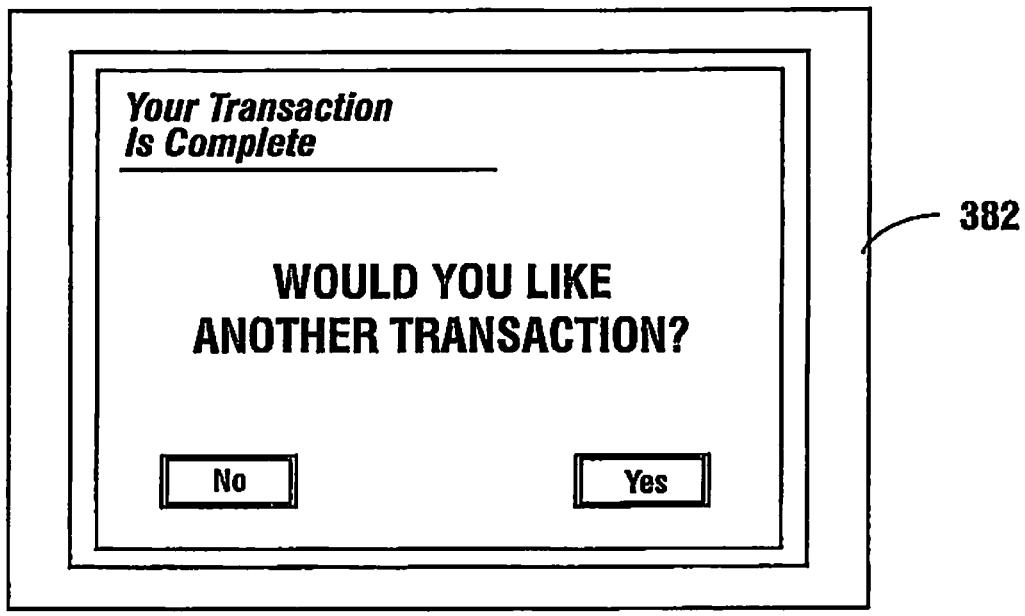
Figure 40:
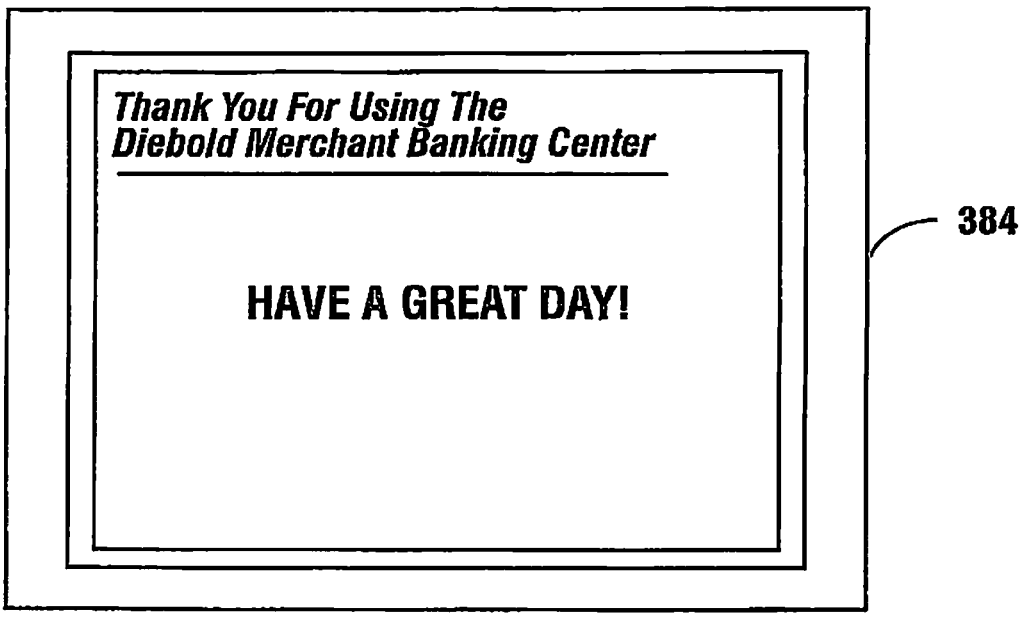

In response to the completion of the dispensing transaction, the terminal processor of the exemplary embodiment causes a screen 274 shown in FIG. 37 to be displayed on the touch screen. Screen 374 prompts the user to select one of four icons 376 indicating the number of receipt copies that they wish to receive. Often a user will prefer to receive several copies of the receipt for the transaction. Multiple copies of the receipt may be used to help verify that the deposit has been made. For example, a user may deliver one copy to their employer and retain one copy for their records to evidence the fact that the deposit was made. Likewise, multiple copies may be provided so one may be kept by the employee making the deposit, the store manager, the accountant and by other persons who may need to be notified of the transaction.

In addition or in the alternative, embodiments may provide for printing machine readable indicia instead of or in addition to human readable indicia on one or more copies of the receipt. As previously discussed in some embodiments the receipt may be provided electronically by the input of data to a portable module. The machine readable indicia may facilitate accounting and tracking deposits made into the machine. The receipt will generally include amount data and other data pertinent to the transaction. Some users may wish to not have a receipt printed and in screen 374 a user is enabled to avoid having a receipt printed by touching an icon 378.

In response to a user touching one of icons 376 a receipt providing mechanism within the apparatus provides the requested number of receipt copies. This is preferably done with the printer 24 in the device printing the requested number of copies. The copies are passed outward through an opening in the first housing portion to the user of the machine. The terminal processor then causes a screen 380 shown in FIG. 38 to be displayed. Screen 348 prompts a user to take the receipt copies. Appropriate sensors are provided for sensing that a user has removed the receipt copies from the opening of the first housing portion. In response to sensing that the user has taken the receipts, the terminal processor of the exemplary embodiment is operative to cause a screen 382 to be displayed on the touch screen. Screen 382 prompts a user to indicate by touching either a "yes" icon or a "no" icon to indicate whether they would like to conduct another transaction. If the user touches the "no" icon, the terminal processor of the exemplary embodiment causes a screen 384 shown in FIG. 40 to be displayed.

If from screen 382 the user touches the "yes" icon, the terminal processor returns in the logic flow to cause screen 328 to be presented on the touch screen. From the screen 328 the user may select either of the icons presented therein. For example, the user may select icon 330 if they wish to deposit a bag of cash, checks, credit slips or other materials. If such icon is selected the terminal processor will execute the logic that will be later described in detail. If the user selects icon 332 the terminal processor will cause screen 334 to be presented again.

While the user could conduct a similar transaction to the one just described by touching icon 338, for purposes of the exemplary transaction it will be presumed that the user touches icon 336 to indicate that they wish to conduct a money exchange transaction using a bank card. Such a transaction will enable a user to receive notes or coin and charge them to an account such as a debit card account or credit card account. In alternative embodiments the user may also charge transaction amounts to other sources of monetary value such as other accounts which may be accessed through a network or a source of monetary value which is represented by data on the card, such as data stored on a smart card.

Figure 41:
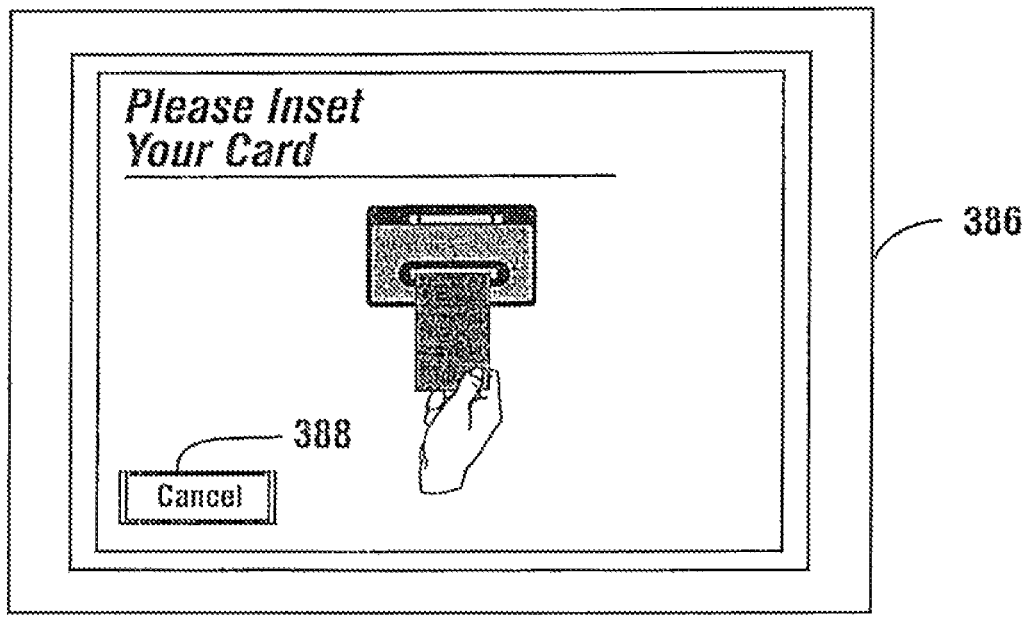
Figure 42:
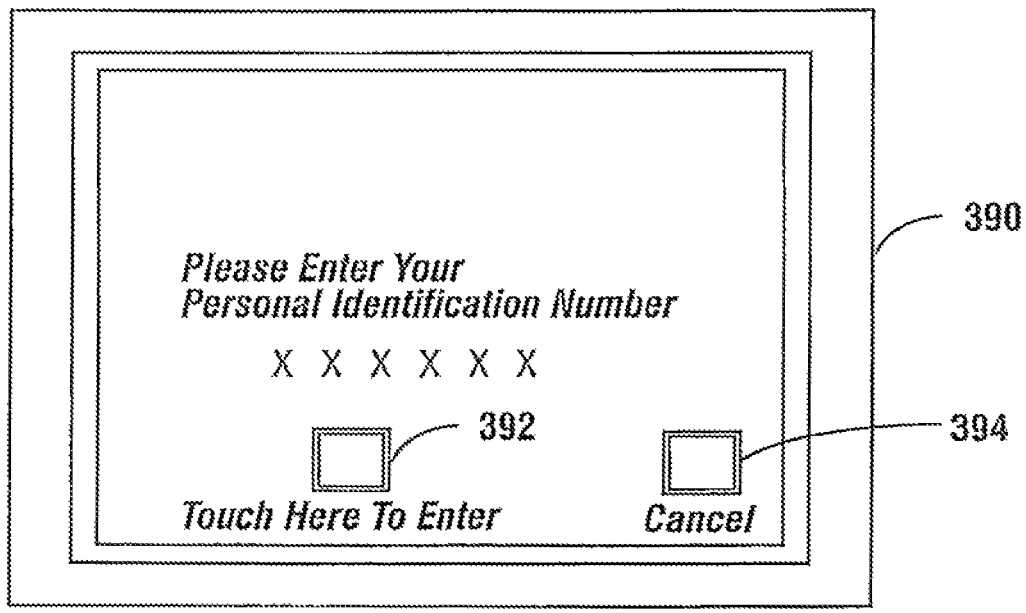
Figure 43:
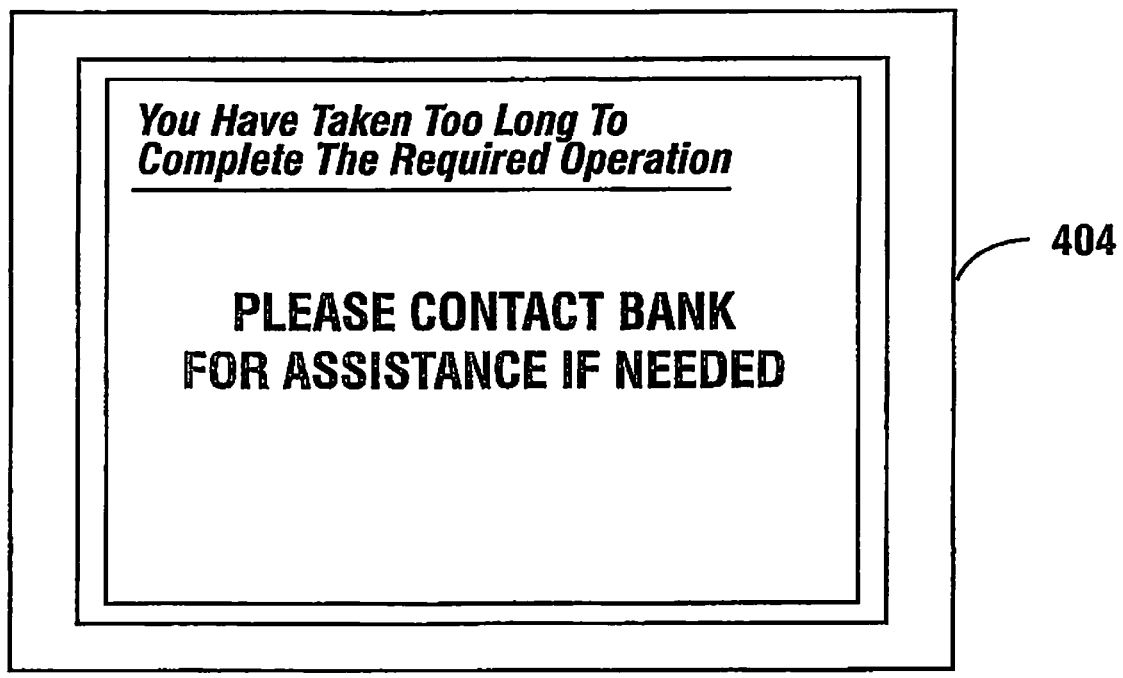
Figure 45:
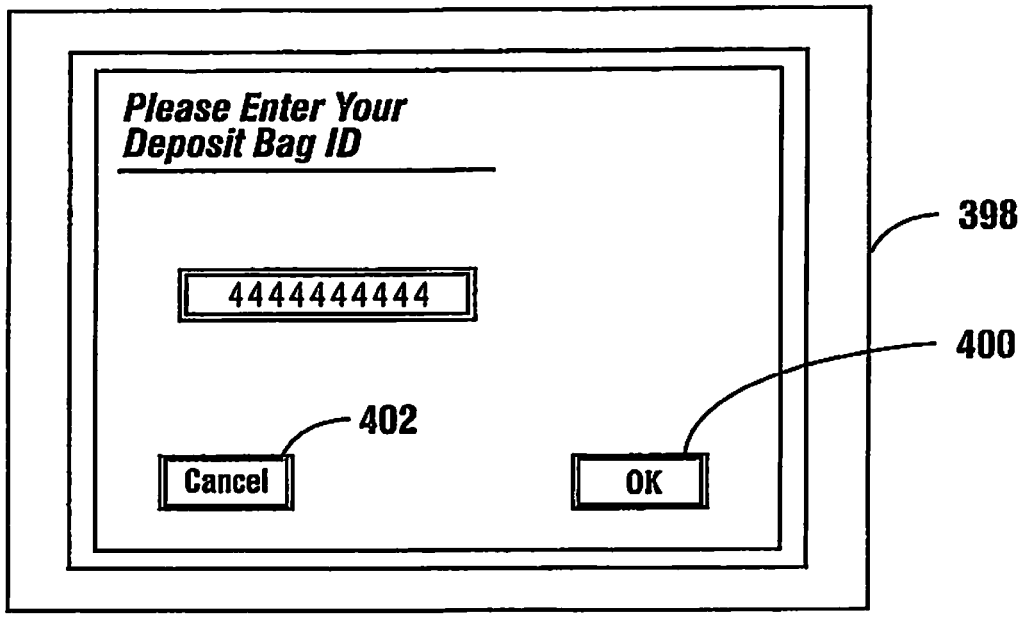
FIGS. 45-51, 53 and 54 are screen displays output by the user interface of the exemplary embodiment associated with a bag deposit transaction into the bag depository portion.

In response to the user selecting icon 336 in screen 334, the terminal processor causes a screen 386 shown in FIG. 41 to be presented. Screen 386 includes a graphic prompting a user to provide an input through insertion of their card into the card reader. As the card is inserted data encoded on the card is read. Screen 386 also includes an icon which a user may touch to cancel a transaction and to return to screen 328. In response to a user inserting a card into the card reader in response to screen 386, the terminal processor causes a screen 390 shown in FIG. 42 to be displayed. Screen 390 prompts a user to further provide a user input by entering their personal identification number (PIN) associated with their card. The user may enter their personal identification number through the keypad 26. On completing entry of the user input of the personal identification number, the user may touch an icon 392. If the user makes a mistake in the entry of their personal identification number, they can start over by touching an icon 394.

After the user has input their personal identification number, the terminal processor causes screen 340 to be displayed. If the user touches icon 344 in screen 340, screen 348 is displayed. The user is then enabled to select the quantity and denomination of coins and bills that they wish to receive in a manner similar to that discussed in connection with screen 352 shown in FIG. 34. In the exemplary embodiment the total of the amounts associated with each successive entry is displayed to the user. After the user has input the values of bills and coins that they wish to receive, they touch icon 362. Of course, if errors are made or the user wishes to cancel the transaction, the appropriate icons may be touched. In response to the user indicating the completion of the inputs in screen 348, the terminal processor is operative to generate a request message to the source of monetary value corresponding to the indicia encoded on the card input by the user. Such communication may be, for example, through exchange of Diebold 91X financial transaction messages developed by Diebold, Incorporated, with a network processor. Alternatively, other forms of messages may be used.

In the exemplary transaction a source of monetary value which is usually a bank receives the request message from the apparatus 10. A host computer associated with the source of monetary value is operative to compare the inputs by the user of the data encoded on the card and the PIN for a corresponding relationship to stored data for authorized users of accounts. If the user input data corresponds to an account and an authorized user thereof the transaction proceeds. A host computer operated by the bank determines if the account associated with the indicia on the user's card contains the amount of funds that the user has requested to be debited to provide change, or if the user has credit available in the amount of funds that the user has requested. If so, the bank returns a response message through the network to the terminal processor in the apparatus 10. The response message includes indicia indicative of whether the user is to be granted a credit amount and/or the transaction should be allowed to proceed. If so, the apparatus 10 is operated by the terminal processor to dispense the requested quantities of coins and bills. If not, the terminal processor is operative to generate an output on the touch screen advising the user that the transaction could not be conducted. Alternatively the user may be provided with the items requested to the extent of their limit less the transaction fee.

If the transaction is carried forward, the user is again presented with screen 374 in which they are requested to indicate the number of receipts that they wish to receive. In response to indicating the number of receipts, the user is presented with the number of receipts they have requested, and the terminal processor operates in the manner previously discussed to complete the transactions. In addition, in the exemplary embodiment, the terminal processor is operative to forward to the bank a completion message indicating that the transaction was properly completed.

An exemplary embodiment of a receipt provided by apparatus 10 at the conclusion of the money exchange transaction is shown in FIG. 44. This exemplary receipt 396 provides a record of the transaction including the quantities of bills and coin requested and the quantities actually dispensed along with amount data. Other information including the time and date, terminal number, service charge and other information is also shown. This provides the user with information concerning the transaction. Corresponding information concerning the transaction is also stored in the terminal to provide a record of amounts accepted and dispensed as well as charges against user accounts. Of course, corresponding information may be stored at the host, in other data stores and computers in the network to which the apparatus 10 is connected.

A useful aspect of the exemplary embodiment is that the programming associated with the terminal processor 74 is operative to generate transaction messages which include indicia representative of denominations and quantities of bills and coin rolls dispensed to a user. Prior art systems have been operative to indicate only the monetary value to be charged or debited to a user's account. Such systems have not provided information representative of the particular denomination, type and quantity of items dispensed which make up the total amount of funds transferred.

In automated teller machine transaction systems commonly in use today, the messages exchanged between ATM terminals and host computers have predefined message formats. A common type among these formats are Diebold 91X formats developed by the Assignee of the present invention. The Diebold 91X formats, like other formats, includes a request message which is produced by the terminal which indicates among other things the type of transaction that the customer has requested, the total amount of value involved (if any), and the customer's account and PIN number. In addition, other transaction data may be included depending on the specific terminal or other circumstances involved.

In response to the request message, the host computer is operative to send back to the ATM a response message. A response message is operative to provide an indication of whether the transaction is authorized and the other account or balance information that responds to the transaction the user has requested. In response to carrying out the activity requested by the customer and authorized by the response message, the ATM terminal provides a completion message. The completion message indicates to the host computer the successful or unsuccessful carrying out of the transaction. If the transaction could not be carried out, the completion message may include an error message associated with the particular malfunction.

Exemplary forms of the messages used in connection with the exemplary embodiment unlike conventional messages, include in at least one of such messages, type and quantity data for the items dispensed. Such type and quantity data may be included for each denomination of coin roll and bill type that the apparatus 10 is capable of dispensing. Such information may be included in the request message to indicate what the user wishes to have dispensed, as well as the total value to be charged to the user's account. Likewise, data representative of such items and quantities may be included in the response message to indicate to the apparatus 10 what is to be dispensed. Finally, the completion message may also indicate to the host the items and quantities that were actually able to be dispensed. In some embodiments, less than all the messages transmitted may include such quantity information. For example, only the request or the completion message sent to the host may include data representative of what is dispensed from the machine. Such information enables the operator of the machine to track what has been dispensed.

Alternative embodiments may include other approaches to dispensing requested items to a user. For example in systems where transaction fees vary between different categories of users or transaction types, the computer at the apparatus or the remote host computer may calculate the particular service charge amount for the particular user. The service charge amount may be based on various factors including the types and quantities of items the user wishes to have dispensed. The charge may be based on other factors such as the balance in the account, the type of account or the institution holding the account from which the credit amount applied to dispensing the items is obtained. In such embodiments the host calculates the service charge amount and includes it in a message from the host to the apparatus.

The apparatus preferably outputs the service charge amount on a display to a screen to the customer. The screen includes a prompt requesting that the customer provide an input through an input device concerning whether they agree to pay the service charge amount. If the customer provides an input indicating they accept the service charge amount the transaction is carried forward. If the customer provides an input indicating that they do not accept the service charge, or they fail to provide an input before a machine time out, the transaction does not proceed.

In the exemplary embodiment which uses the approach of using a three message set to communicate with a host for a transaction, two sets of messages may be used. In this exemplary embodiment a first request message is sent to the host. This first request message includes data corresponding to the card or account number, customer PIN and other data as may be necessary to identify the account or user, and to determine if the transaction is authorized. The first request message further preferably includes data representative of the transaction(s) the user is requesting which enables calculation of the service charge associated with the requested transaction.

The host or a connected computer verifies the card and calculates the service charge in response to the requested transaction type, account data and other parameters in accordance with its programming. The host then sends a response message which includes data representative of the service charge to the apparatus. Responsive to the service charge data the apparatus operates to display the service charge to the customer and a prompt to have the user indicate through an input whether they wish to accept the fee. The first response message may also contain data representative of the limits on available credit for the transaction and/or information on coin or bill denominations that can be dispensed to the user. This information may also be displayed on screens to the user. The apparatus sends a first completion message indicative that the service charge is being displayed and/or that the terminal is ready.

Responsive to the user providing the input indicating that the service charge is accepted by the user, a second request message is sent to the host. The second request message includes data indicative that the user has accepted the service charge. This may include the service charge or alternatively other data to carry out transactions which indicate the assessment of a service charge to the user.

In response to this second request message the host builds a second response message. The second response message indicates to the apparatus how to proceed with the transaction. The second response message may also include one or more instructions to carry out the transaction activities and to run the transaction devices in response to transactions requested by the user. The apparatus responsive to carrying out the operations in accordance with the second response message sends a second completion message to the host. Of course if a malfunction has occurred an appropriate status message will be generated or appropriate data will be sent in the completion message to the host.

An advantage of this exemplary approach is that it enables the use of these message transactions sets for which many ATM systems are already programmed. It also enables individual calculation and acceptance of transaction fees by users. It further provides for responding to request messages with responses more quickly and facilitates asynchronous transaction processing. Such features may find applicability in connection with merchant banking devices as well as with consumer operated ATM machines.

In the exemplary embodiment the information about dispensed denominations and quantities sent to the host or other connected computers is useful in determining when the various supplies of coin rolls and currency notes require replenishment. This information may be very accurately tracked if the operator of the machine requires all users to submit a merchant access card as a requirement to conducting transactions. In this way deposits to the note acceptor can be treated as deposits to the user's account, even though such deposits are going to be followed by immediate withdrawals represented by the dispensing of currency bills and coin rolls. Such activities present the advantage that all of the transactions for a particular merchant can be recorded, even those involving cash. Thus the merchant is enabled to track all transaction activity including currency exchange transactions.

Alternative embodiments may provide for sending messages corresponding to the dispense of notes or coin to locations in the network 116 other than the source of monetary value that is authorized to grant a user authorization to conduct a transaction. For example, messages indicative of the dispense of, coin rolls or currency, may be sent to servers associated with persons responsible for tracking the levels of various bills and coin rolls within the apparatus. Such messages may be received and appropriate calculations made as to when replenishment of such items may be required in various machines. Such information may be helpful, for example, in determining the amount and types of rolled coin to wrap, order or otherwise procure from another source. Such information may also be used in calculating pick up and delivery routes between various merchant banking apparatus that require such replenishment. Alternatively sensors can be used to sense levels of rolled coin types and bill types in storage. Upon the sensor reaching the set level a message may be selectively dispatched to the appropriate roll coin replenisher or bill replenisher. Such messages may be sent through various messaging systems including through the Internet and at various times or in response to sensing various levels. Of course, other approaches may be used depending on the nature of the system in which the apparatus 10 is operated.

As previously discussed, merchants operating the apparatus 10 are also enabled to make other types of deposits. For example, embodiments may enable the user to conduct money exchange transactions in response to the input of checks or instruments other than currency notes. This may be accomplished through the programming associated with the terminal processor 74 providing the user with additional screens and options to insert deposited items through the depository 32. Such deposited items may include, for example, instruments such as checks, which can be read by a check processing and imaging device and immediately credited to user's account. Alternatively, trusted merchants may be granted the authority to input instruments to a depository through envelope deposits (or even bag deposits as later described) and to have their account credited for the deposited amount. Other deposited items such as vouchers, credit slips, or other items may also be accepted through the depository 34 and credited immediately.

Alternative arrangements may have the terminal processor programmed to provide a user with the option to have deposited items credited to their account or alternatively to have change dispensed in the form of bills or coin rolls. Such options may be particularly appropriate in situations where the machine includes mechanisms which both accept, identify, store and redispense currency such as shown in the disclosures of U.S. Pat. Nos. 6,331,000; 6,273,413; 6,109,522; 7,331,513 and/or 7,261,236 which are incorporated by reference in their entirety. Other alternative transactions may be conducted with the apparatus 10 based on the preferences of the operator of the apparatus through appropriate programming of the terminal processor 74.

Another type of merchant banking transaction that is accomplished using the exemplary embodiment is a bag deposit. For purposes of this disclosure any suitable container for deposits which include various types of items will be considered a bag. The user of the machine may select the bag deposit option by providing an input by selecting icon 330 in screen 328. In response to the selection of icon 330, the terminal processor is operative to cause a screen 398 shown in FIG. 45 to be displayed on the touch screen. Screen 398 prompts the user to enter an identifying input which input includes data representative of a deposit item, a user, an entity with which the user is associated or all of these. In the exemplary embodiment the user is prompted to input a depository bag identification number through the keypad 26. When the user has properly entered their identification number, they can so indicate by touching an icon 400. If a user makes an error and needs to re-enter their identification number, they may do so by touching an icon 402.

Figure 36:
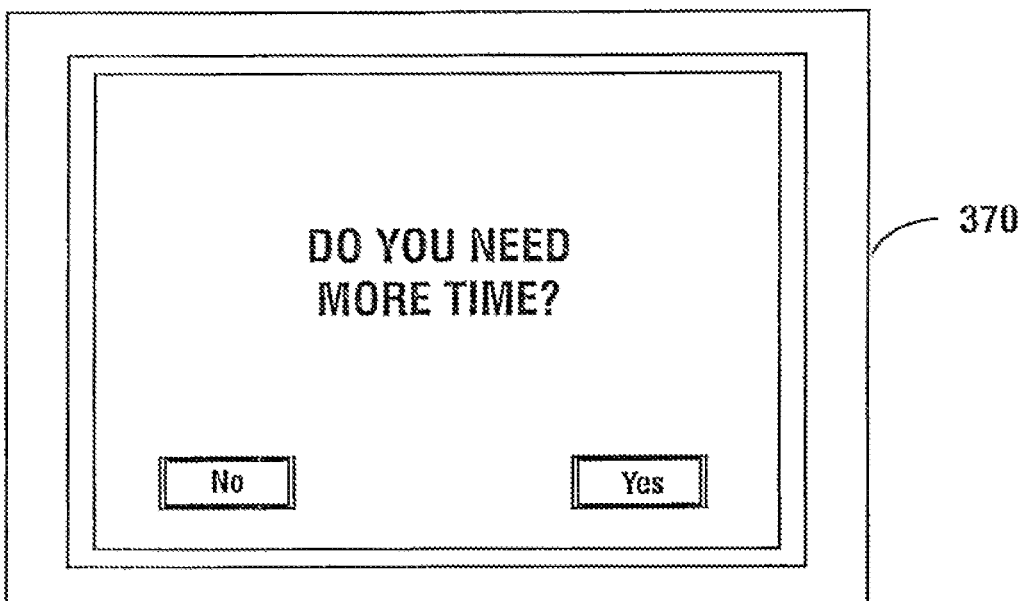

If in the course of entering the depository bag ID number or at other times a user takes too long to complete the transaction, screen 370 shown in FIG. 36 will be displayed. If the user delays beyond the predetermined time in taking any action, the transaction will be automatically canceled by the terminal processor and the screen 404 shown in FIG. 43 displayed. In addition, it should be understood that prior to the terminal processor displaying the screen 398, the terminal processor may be programmed to require the user to input a card and/or PIN to identify the user and their account. The input bag identification or other identification indicia input by the user through the input device may be compared to data in a data store to determine if there is a correlation between input data and the stored data. The correlation to stored data identifies one or more of the deposit, user, merchant or other entity with which the deposit is associated. The existence of the correlation may also be used to determine that the deposit transaction is authorized. The comparison of input data for a correlation to stored data may be made at the apparatus using data stored in a memory at the apparatus, or the comparison may be made to data stored at a remote host computer. Alternatively, the user may be identified based on inputs to other input devices such as encoded card data read by a card reader and/or an input PIN number input through a keypad. Such input data may be used to identify and determine the authority of the user. This may be done by comparing at least portions of the input data to at least portions of stored data for the existence of a corresponding relationship. The transaction is authorized responsive to the corresponding relationship being found. In systems which authorize transactions based on card and/or PIN data, a corresponding relationship for a deposit bag identification number to stored data may not necessarily be required. Various approaches to providing authority to make a deposit may be used and implemented through programming of the terminal processor.

Figure 46:
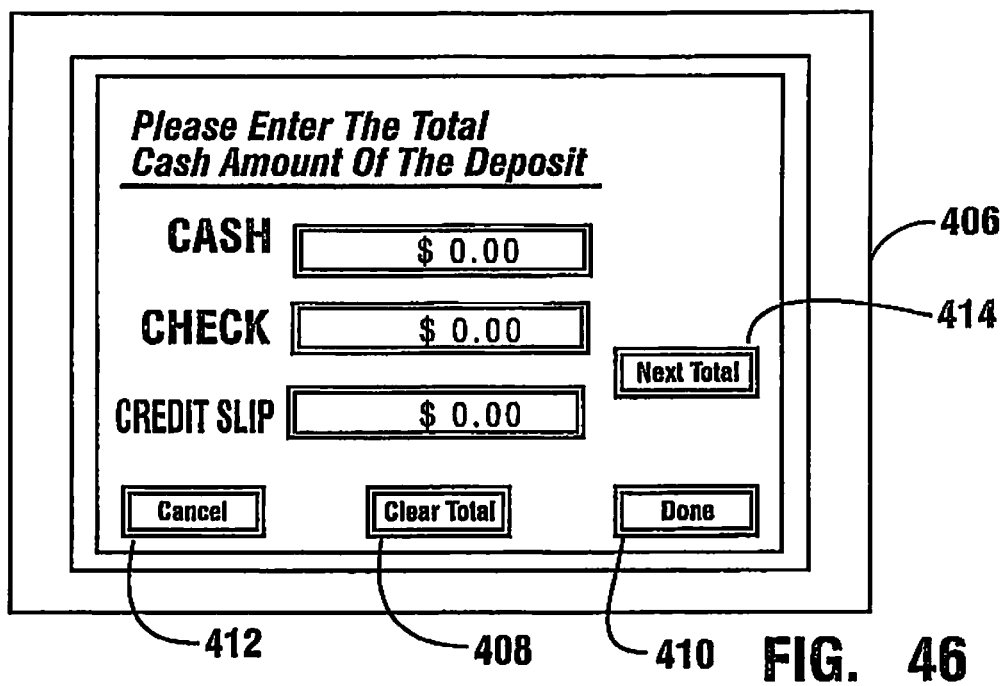

Once the user has identified themself, the deposit, the merchant account or appropriate identification as determined by the programming of the terminal either input by the bag number, input of a card and/or PIN, other data, or a combination of inputs, the terminal processor is operative to cause a screen 406 shown in FIG. 46 to be displayed. Screen 406 prompts the user to enter an amount of cash included among the items deposited in the bag deposit. The user is enabled to do this through inputs to the keypad 26. If the user makes a mistake they can clear the total by pressing an icon 408. If the deposit consists of only cash and there are no checks or credit slips included, the user can indicate this by touching the icon 410 to indicate that they are done. The user can cancel the deposit transaction by touching an icon 412. Typically, once the user has entered the total amount of cash, they can indicate the amount of other items that is included in the deposit by touching an icon 414.

Figure 47:
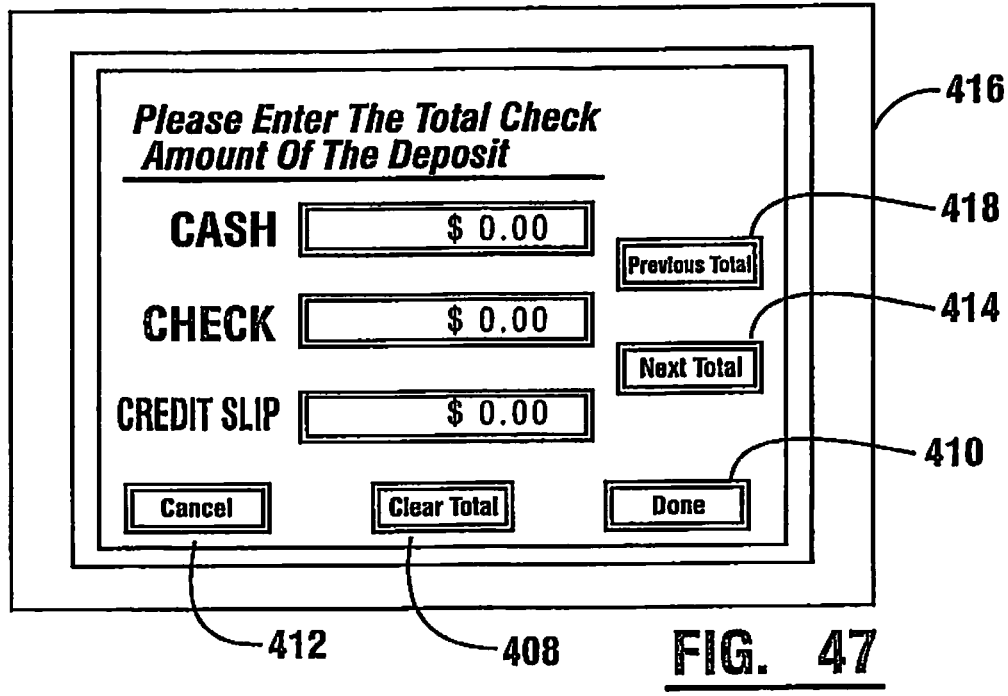

In response to touching icon 414 from screen 406, the terminal processor causes a screen 416 shown in FIG. 47 to be displayed on the touch screen. Screen 416 prompts the user to indicate an amount indicating value of checks included in the bag deposit. Screen 416 includes all of the icons from screen 406 and in addition includes an icon 418. Touching icon 418 enables the user to return to modify a previously input total such as the amount of cash included in the deposit. Once the user has input the total amount of checks included in the deposit through the keypad 26, the user may touch the "next total" icon 414 to input an amount of credit slips included in the deposit. Alternatively, if the deposit to be made includes only checks and cash, the user may so indicate by touching icon 410.

Figure 48:
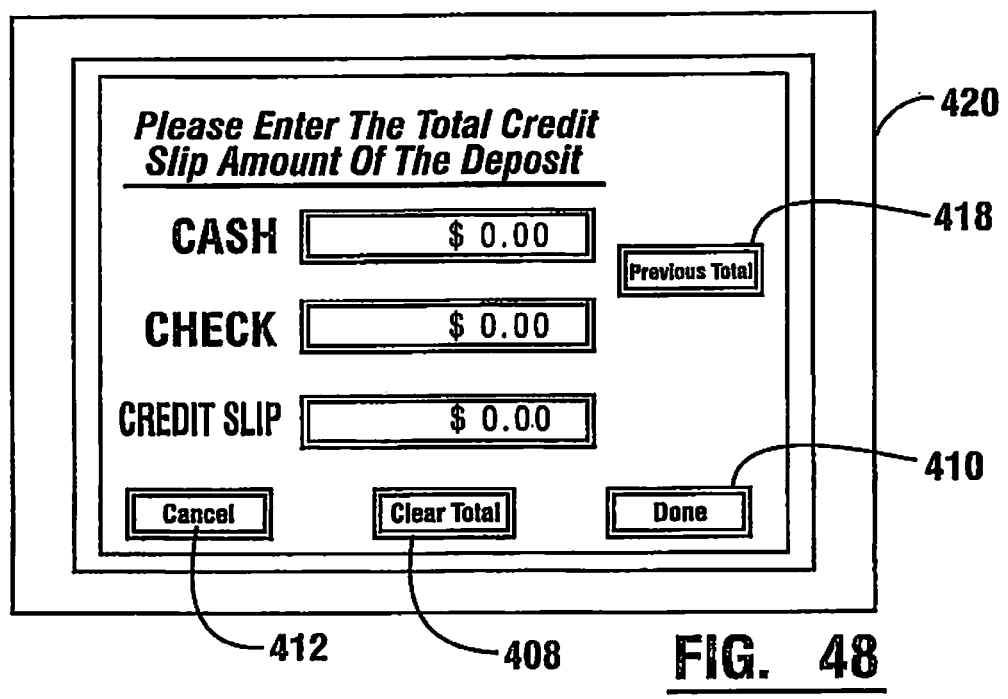

In response to touching icon 414 in screen 416, the terminal processor causes a screen 420 shown in FIG. 48 to be displayed. Screen 420 prompts the user to input a total amount of value in credit slips included in the bag deposit. Credit slips may include, for example, charge card records that the user has received from customers. Such credit slips may be included when a merchant processes credit card transactions on paper rather than electronically. Alternatively, in other embodiments, other forms of credit or charge slips may be used. The user may enter the value of the credit slips included through the keypad 26. The user may correct inputs by touching the icon 408. In addition, prior totals may be corrected by touching icon 418. If, however, the user has correctly input all of the values for cash, checks and credit slips, the user touches icon 410.

Figure 49:
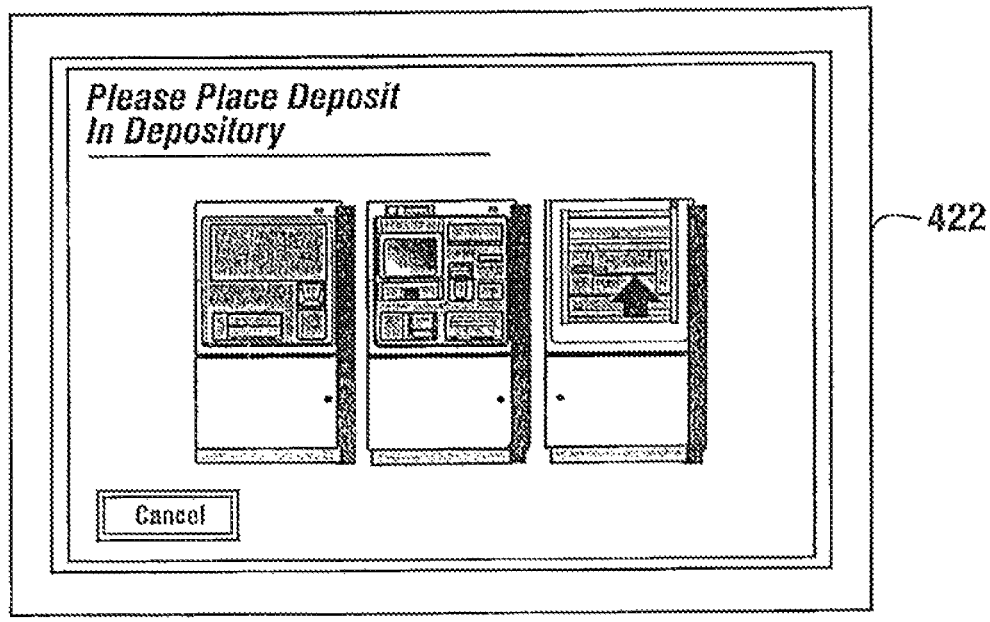
Figure 50:
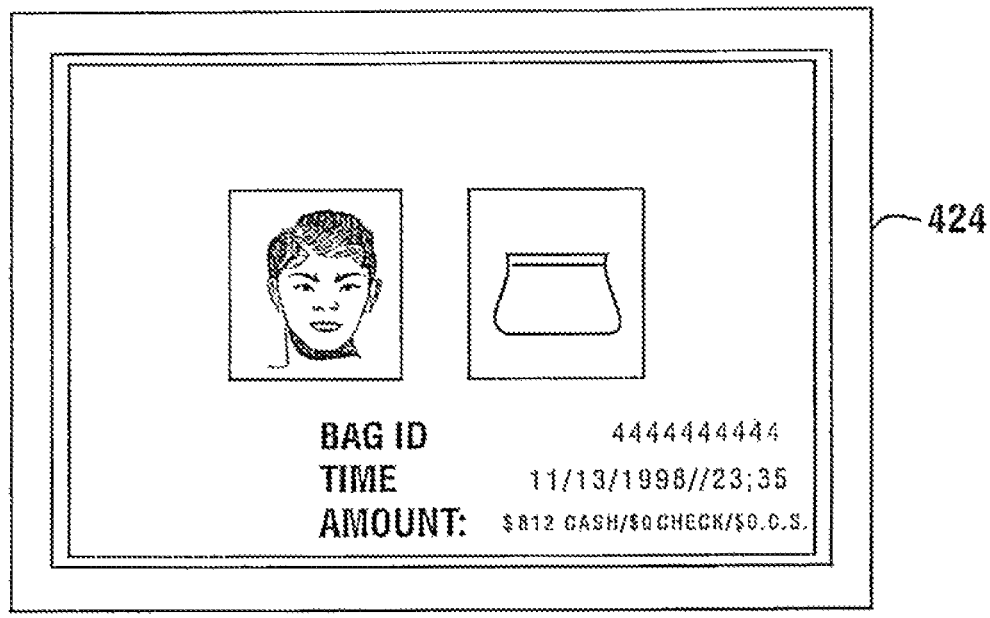

In response to the user touching icon 410, the terminal processor is operative to cause a screen 422 shown in FIG. 49 to be displayed. Screen 422 includes a graphical representation of the apparatus 10 with an arrow indicating that the user should open the bag depository door 56 in order to place the bag deposit within the head portion in the interior area of the bag depository. In some embodiments the computer may cause a lock to unlock enabling opening a door to the interior of the housing. If when the terminal processor presents the screen 422, a user determines that they wish to cancel the transaction, they may do so by selecting a "cancel" icon in the screen. In addition, if a key is required to open the depository door screens may be presented to prompt the user to use their key to activate lock 60.

In response to sensing with a sensor that the user has opened the bag depository door 56 or that the terminal processor has displayed screen 422, or in response to other suitable sensing means, the terminal processor is operative to capture user image data from cameras 58 on the exterior of the housing portion 16 as well as an item image of the deposit item from camera 326 located in the interior area of the bag depository. Alternatively, terminal processor 14 may capture images from the cameras in response to sensing the insertion of the bag deposit through the depository door or in response to movement of the rotating mechanism 318 within the depository head. Such images may be captured concurrently or at times during the transaction steps which are timed to capture images of the user and the item the user has deposited.

Preferably the terminal processor is operative to capture images from the camera 58 and the camera 326 which show both the user and the items they have deposited. In one arrangement the terminal processor is operative to display on the touch screen display images corresponding to the images and data captured during the bag deposit transaction. In the exemplary embodiment, the terminal processor is operative to generate a screen 424 shown in FIG. 50. Screen 424 includes the user image and the deposited item, data representative of which are captured by a computer associated with the deposit accepting device and stored in memory in correlated relation or otherwise associated. Likewise, screen 424 in the exemplary embodiment includes data corresponding to the deposit such as the bag ID amount data as well as date and time information. The time information is preferably determined and caused to be displayed responsive to a clock device which tracks the current time (including date) at the deposit accepting device. The clock device is preferably operative in the terminal processor or other operatively connected computer. The time data is determined by the computer responsive to signals which correspond to execution of one of the process steps associated with the transaction. This may include for example the current time when the user image and deposit item image are captured. Alternatively, it may be the current time when the deposit item is fully secured in the interior area away from the user, or other time during the conduct of the transaction.

In the exemplary embodiment the computer operates the display to display the user image and the deposit item image to the user simultaneously. This provides the user with assurance that the deposit accepting device has recorded the fact that they made the deposit. In some exemplary embodiments the image of the user and the deposit item are captured as part of a single combined image. This may be done in analog systems through use of a frame splitter type device which records both images side by side in a storage medium. In digital systems this is accomplished by programming to layout the images within the image frame in selected areas so as not to interfere with the integrity of each image. Each associated image or the combined image may include certain of the transaction data such as time, amount, bag identification, user identification, merchant identification or other data such as a unique transaction number. Each associated image or a combined image of the user and deposit item may include a watermark of a visible or generally not visible type to provide greater assurance of the integrity of the image. Such a watermark may be imposed by the programming of the deposit accepting machine and/or may be variable with one or more of the values or information items associated with the particular transaction.

The image data corresponding to the user and the bag deposit in the exemplary embodiment is stored in a memory operatively connected to one or more computers in the machine. Such data may be stored in digital file formats (in a compressed or uncompressed forms) as well as in analog formats and/or on tape. The storage of image and/or transaction data may be accomplished under the control of the terminal processor 74 or other connected computers operating in connection the machine to capture and store such data. In addition or in the alternative, such captured image and/or transaction data may also be accessed through a server operating on the apparatus 10, through the network 116 and delivered to other servers in the network. As previously mentioned, the ability to remotely access image data from a remote computer enables merchants to verify the making of such deposits as well as the item that is deposited. In addition or in the alternative, bag deposits which employ tamper-indicating seals or the like may be employed to indicate that a bag has been deposited with such a seal in place. If, for example, at a later date when the bag is opened, a broken tamper seal is uncovered, image data may be accessed to provide an indication if such tamper-indicating seal was installed and its condition at the time of deposit. Other security procedures may be used which may be useful in tracking the source of shortages or losses which occur with respect to deposited items.

In other embodiments contact or noncontact type identifying indicia, such as bar code, "Dallas" chips, inductance type tokens, RFID tags, near field communication (NFC) signals, holograms and other programmable or nonprogrammable indicia may be included on deposited items. Such indicia may be read by appropriate reading devices on (including inside) the deposit accepting device to aid in tracking the deposits. For example such indicia may include indicia corresponding to one or more of the deposit bag ID, the user making the deposit, the merchant, the amounts of various types of items in the deposit or other information. This information may be read by an appropriate reading device or devices on or inside the deposit accepting machine. Thus, a deposit accepting machine can receive depositor input via remote communication through at least one input device (e.g., reading device) that is in operative connection with the machine, where the input includes data associated with at least one deposit item. The use of such indicia and readers can shorten the time a user spends at the machine. For example in such cases at least some and perhaps all user inputs for the transaction would be provided from the indicia on the deposit item. In some cases where the indicia is programmable, the media for the indicia can be cleared by the deposit receiving institution after the deposit is verified so the deposit carrier such as a bag may be reused. Alternatively, the indicia may be input by a user through a handheld or portable device such as a mobile phone, which communicates with the deposit accepting machine through a contact or noncontact connection. In such situations the handheld or portable device may be preprogrammed by the person making the deposit or by others, with the necessary data. This enables the user to quickly input to the deposit accepting device data that may be needed or desired. It should be understood that deposit items may have various forms and indicia carrying capabilities in various embodiments.

Furthermore, in other arrangements to communicate information concerning a deposit, an indicator member such as a noncontact transponder may be used. With noncontact (i.e., remote) communication, the communication does not have to be based on physical contact. A noncontact identifying arrangement may include the use of radio frequency (e.g., radio waves) or microwaves. For example, radio frequency (RF) type readers and/or RF transmitters can be used. Thus, a depositor can input data associated with a deposit item to a deposit accepting machine via radio frequency data communication. The RF noncontact communication can be wireless. The depositor can input the deposit information while being disposed or spaced from the machine. The input can be received by the machine while the depositor and the deposit data source are in noncontact relationship with the machine. That is, the input can be remotely transmitted to the machine (or an input receiver thereof) without the need to physically contact the machine. An exemplary form enables a depositor to make a (data) input-free automatic deposit to a depository. That is, no input is required by the depositor other than the input of the items to be deposited into the machine.

Information and identification (ID) associated with a deposit can be input into a deposit accepting machine in a noncontact manner by using remote communication via use of one or more radio frequency devices. The system can comprise an RFID (Radio Frequency Identification). In an exemplary embodiment an RFID tag (or label or indicator or device or member) can be used to input deposit identifying data. An RFID tag may also be referred to as a "smart label." The structure of an RFID tag and its usages are well known, such as in product manufacturing.

An RFID tag can be used to store and transmit data indicative or reflective of information associated with a financial deposit. For example, an RFID tag can be used to store readable data pertaining to what is being deposited and by whom.

Data communication can remotely occur between an RFID tag and a deposit accepting machine via an RFID tag reader device. The reader device can interrogate an RFID tag to obtain information therefrom. RFID reader devices or readers may also be referred to as "interrogators."

The features discussed herein relating to RFID technology find applicability in connection with deposit accepting machines, such as an automated merchant banking apparatus. Machines such as ATMs which accept deposits are likewise applicable. Furthermore, a deposit accepting machine may be a recycling type of banking machine. In a recycler machine certain deposits into the machine (such as cash in a currency deposit transaction) may be later dispensed from the machine (such as in a cash withdrawal transaction). The recycler machine is operative to dispense deposited currency. Thus, deposited items such as cash may be reused or recycled.

As can be appreciated, the wireless features (e.g., RFID, NFC, etc.) discussed herein find applicability with various automated transaction machines, including automated banking machines that can carry out cash withdrawal transactions. The wireless features herein can be used with banking systems that are controlled at least in part by data bearing records. Also, the automated banking machines of a banking system can comprise self-service machines.

RFID tags comprise data bearing records. The structure and operation of RFID tags and RFID readers are well known. The RFID tags discussed herein may be made or produced in any known manner. The RFID tags and RFID readers discussed herein may have RFID Industry Standards developed by ANSI (American National Standards Institute) or the International Standards Organization (ISO) or other standard developing organizations.

As is well known, an RFID tag may include any of an integrated circuit, power source, memory, circuit card assembly, transmitter, receiver, and antenna. In an exemplary embodiment any suitable power source may be employed. An RFID device may have a power source that is active (e.g., a battery) and/or passive (e.g., a magnetically coupled device). An RFID device can be of a type that does not need its own power source (e.g., battery), but lives on provided RF energy. For example, the power source can comprise a magnetic coil that receives power through magnetic coupling with a reader device, as is well known. That is, the RFID device can have a transponder that receives power and transmits by using magnetic coupling. The RF energy may be provided by a reader device and/or by a separate machine component. RFID tags may operate on the backscatter principle. For example, an RFID device can comprise a backscatter modulator.

An appropriate reading device or devices (e.g., RFID tag reader) can be in operative connection with the deposit accepting machine. For example, the reading device may be on or inside the machine. A machine may comprise the reader device. A reading device may be separate or independent from a machine. A reading device may be mounted exterior of but adjacent to a machine. A reading device can communicate with a machine through a known communication format. For example, a reader device may be connected or linked to a machine through wires or cables. An RFID reader can be operatively connected to a machine computer or controller. The machine computer or controller can operate to control the RFID reader.

Alternatively, the communication between a reader device and a machine may be wireless. A reader may be connected to a host computer external of the machine, such as a host computer of a banking network of which the machine belongs. The communication path between a reader and a host computer may also include the Internet. A controller in operative connection with the machine (e.g., the controller may be in and/or out of the machine) can operate to control the RFID reader. For example, the machine controller may communicate with the reader via the Internet. The reader may be instructed or operated by the controller to read the tag data and transmit the data to the host computer or to the controller.

As is well known, an RFID reader may include any of a CPU, memory, controller, and antenna. In an exemplary embodiment any suitable power source may be employed.

An RFID tag can be loaded or programmed with deposit information. The information can correspond to one or more of a deposit bag ID; an account number, a user making the deposit; a merchant, a merchant ID; a depositor ID; names; the respective amounts and types of various items involved in the deposit; PIN; dates; times; machine ID; primary bank; affiliated banks; passwords; authentication codes; preferences (e.g., screen display; marketing); customer profile data; number of bags being deposited which correspond to the tag data; and other information. Specific information regarding the amount and types of cash, coins, checks, and coupons being deposited may also be included in a tag. Additionally, tag data may correspond to one or more checks, e.g., check numbers, the maker of (particular) checks, and image data (e.g., images of checks, user, or other items). Other tag data may correspond to currency. For example, each respective currency note may have an RFID tag containing data corresponding to the value of the respective note. An RFID tag can include depositor bank account information. Tag information can be operative to inform the machine whose (or which) account(s) to credit for the deposit.

A tag may also include security features, such as features to avoid or prevent tampering. For example, a tag may include some type of value like a digital signature and/or one or more values that are a function of other values. The values may be taken from an item to be deposited, such as an ID or account number. Cryptography may be used. The digital signature and value function can be interpreted and understood by the tag reader and/or the machine.

An RFID tag may be associated with any type of depositor component involved with the deposit in any manner that enables reading of the tag by a reading device. For example, a tag may be (embedded) in, on, or affixed to a deposit bag, a deposit ticket or slip, or a user card (e.g., bank card). A tag can be integral or one-piece with a depositor component (e.g., card). A self-adhesive label may comprise an RFID tag. The label may also have indicia thereon. The label can be affixed to a deposit item. For example, the label may have removable backing enabling a label adhesive to stick to an item. Other noncontact or wireless manners of communicating identifying indicia can also be used, including near field communication (NFC) signals and other RF-type communications. For example, these other wireless communication types can be used to provide information about what (account data, deposit value, denominations of currency, quantity of bills and/or checks, etc.) is contained in a deposit bag. As previously discussed, deposit data can be wirelessly provided from a deposit bag to a depository.

One or more deposit items may comprise one or more tags. A tag may be positioned with an item so that it cannot be seen. For example, a tag may be built or sewn into a liner of a deposit bag. A tag may also be in user's wallet or on a key chain. A tag may also be removably held by a tag holder of a deposit item. For example, a tag may be inserted into a clear plastic holder, similar to a luggage tag holder. The holder may also have a closure portion (e.g., tongue and groove relationship lock or seal) to prevent the tag from falling therefrom and protect the tag from the environment exterior of the holder volume.

Each of the RFID tags can comprise the deposit data necessary to ensure a proper recordation of the deposit. For example, a tag may include deposit data representing a depositor account number to be credited, the number of checks being deposited, the value of the checks, the types of currency notes being deposited, the number of each type of currency note, the value of the currency notes, and the total value amount being deposited.

FIG. 60 shows a self-adhesive label 500 comprising an RFID tag 502. FIG. 61 shows the label 500 attached to a deposit ticket 504. The ticket 504 has indicia listed thereon of the types and amounts of the items being deposited. The listing of the deposit data on the deposit ticket 504 is merely exemplary, as the label tag 502 has stored therein data representative of the indicia data. It should be understood that a deposit ticket may include an RFID tag without having any deposit data indicia listed thereon. As shown in FIG. 61, the deposit data includes a depositor account number; the number of checks being deposited; the value of the checks being deposited; the number of respective $100, $50, $20, $10, $5, and $1 currency bills; the value of the coins being deposited; the value of the bills and coins being deposited; and the total value amount (of the checks and cash) being deposited. The ticket 504 included a reserved unused area for placement of the label 500.

In an alternative embodiment the tag may comprise the deposit ticket. For example, the tag may be of a size enabling deposit data indicia to be printed thereon. Furthermore, a tag may have an indicia data label attached thereto. Likewise, both the tag and the indicia data can be on separate labels, with the labels affixed to another member.

FIG. 62 shows a deposit bag 506 having an RFID tag 508.

FIG. 63 shows an alternative deposit bag 510 (e.g., a cash bag with a zipper) with a tag 512.

Figure 64:
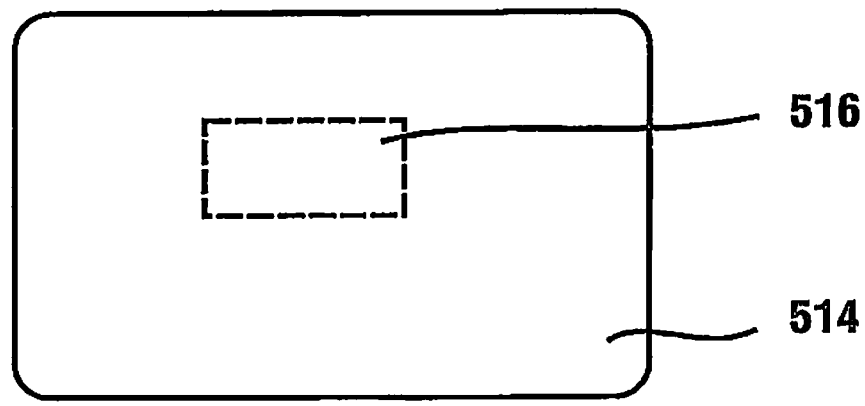
FIG. 64 is an exemplary showing of a card having an RFID tag.

FIG. 64 shows a user card 514 having an RFID tag 516. The tag is embedded in the card. The tag 516 can include data associated with deposit information, e.g., information regarding at least one deposit item, as previously discussed. Alternatively, or in addition thereto, the tag may contain depositor identification and/or authorization data.

In an exemplary embodiment, one or more RFID tags are deposited into a deposit accepting machine along with at least one deposit item. A deposited tag can be remotely read once the tag is within reading range of the machine's tag reader. Thus, a reader may be located in the machine and operative to only read a tag that has been inserted into the machine. The deposit data input may be remotely read from a tag after the deposit item(s) has been securely deposited in the machine. That is, the tag may be interrogated after the deposit can no longer be retrieved or removed by the depositor. For example, after a deposit bag having a tag thereon has been inserted or deposited into the machine, the depositor no longer has access to the deposited bag. The access may be denied by moving the bag to a non accessible secure area in the machine, or by closing and locking the depository door, or by other arrangements.

More than one RFID tag may be used in the depositing process. Plural tags may be used to reflect the information of the valued items being deposited. Other tags may be used to provide identification of the depositor and may be used to compare to stored data to identify an authorized user. One or more tags may be used to authorize the deposit transaction. Some tags may have plural types of information. Other tags, such as single tag, may include all of the input information necessary for a deposit transaction.

A deposit accepting machine can be programmed to automatically open (or unlock) a depository door (or cover) for entry of deposit items upon receiving authorization via interrogation of an RFID tag. The authorization can be contained in an RFID tag separate from the tags having the deposit information reflective of the items to be deposited. The authorization RFID tag can be reusable. Thus, the authorization RFID tag does not have to be deposited into the machine with deposit items.

The tag reader may be in or on a depository door. In certain embodiments a depositor is able to insert a deposit without requiring contact with any part of the machine. Sensors in the machine can be used to determine when the entire deposit has been received by the machine. The sensors may comprise tags read by the machine. For example, an interrogated tag can indicate to the machine the number of bags being deposited. Each bag may have a total bag tag. Each bag may also have a tag reflecting its bag deposit number. For example, three bags may have different tags respectively containing bag numbering data, e.g., one of three, two of three, and three of three. After determining (via one or more sensors) that the machine has received all of the bags involved in the deposit, the machine can then automatically close the depository door.

A vehicle (e.g., an automobile) may also be equipped with an RFID data tag. The RFID tag can contain identification/authorization data to perform a deposit transaction. Of course it should be understood that an RFID tag associated with a vehicle may also contain data reflective of the items being deposited (e.g., amount of deposit). An RFID tag may be positioned on the auto at any location enabling its reading by an appropriately placed RFID reading device affiliated with the deposit accepting machine. For example, an RFID reading device may be situated to read a tag positioned on a window, mirror (e.g., rearview mirror), license plate, or license plate holder of an auto. A tag reader can automatically read the tag information once the auto is within a predetermined range of the machine, process the information, and prompt the user by name on how/where to insert the deposit. A reader may be positioned adjacent to a drive-thru lane upstream of the deposit accepting machine. One or more computers associated with the machine can enable a presentation of a welcome display screen to be quickly made to a particular named user (e.g., whose name is in the tag or corresponds to data in the tag). The use of an RFID data tag on a vehicle can enhance efficiency at a drive-thru depository.

Figure 65:
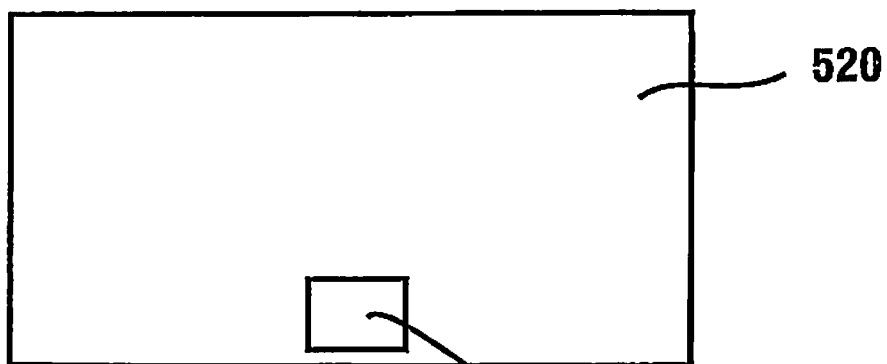
FIG. 65 is an exemplary showing of a license plate having an RFID tag.

FIG. 65 shows a vehicle license plate 520 comprising an RFID tag 522. For clarity only the tag is shown on the plate. A vehicle having the license plate 520 is adapted to make an automatic deposit at a drive-thru depository system having an RFID reader device. The reader is operative to read the plate tag. More than one reader may be strategically positioned relative to the drive-thru lane to ensure reading of the tag.

An RFID tag may be on or in one or more checks (e.g., financial checks, bank checks, personal checks, travelers checks). For example, one or more tags may be on each check being deposited. A check tag may include check data corresponding to indicia (e.g., visible and/or nonvisible) on the check. A check tag may include information regarding one or more of an account number, check (sequence) number, check amount, payee, payer, financial institution, bank ID, verification data, and other information. Check data may also include a value that is a function of plural check indicia.

Figure 66:
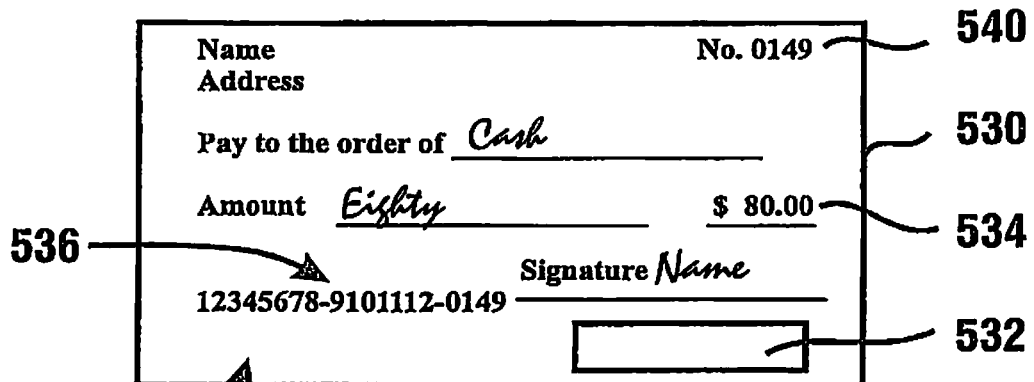
FIG. 66 is an exemplary showing of a check having an RFID tag.

FIG. 66 shows a check 530 having an RFID tag 532. The tag comprises data representing indicia on the check, such as the check amount 534, the checking account number 536, the financial institution associated with the checking account 538, and the check number 540. For clarity not all check indicia has been shown. The check 530 may be read by a check reader. A machine controller can control operation of the check reader. A check reader may be part of a system of the type described in connection with U.S. Pat. No. 6,554,185, the disclosure of which is incorporated herein by reference as if fully rewritten. Of course, in alternative embodiments other check reader systems may be used.

A check RFID tag may include all the information necessary to enable the check to be cleared or processed through one or more banks and/or the U.S. Federal Reserve Bank. Check processing systems, such as those of a bank, can also use reader devices that can read the pertinent check information from the data in an RFID tag. A particular tag of a check may be read several times. For example, the tag may be read upon initial deposit at a deposit accepting machine, then by the bank and/or Federal Reserve.

A check tag may also include verifying data corresponding to physical features on the check. This verifying data can be used in verifying or authenticating a check to reduce or prevent tampering. For example, the face of a check may have a particular security feature (e.g., marking or code) thereon. An RFID tag is operative to store this security feature. A verification device, such as a tag reader, could then determine whether the check is valid by comparing security features. That is, the security feature stored in the tag can be read and the security feature on the check can be read. The two security features can then be compared to determine whether the check has been tampered with. The security features may be converted to a common format prior to comparison.

Additional check security may be implemented. For example, the tag could also include information additionally corresponding the check security marking to another check feature such as the amount or the check number. Therefore, correspondence of a tag's stored security marking (or markings) with both a check's security marking and the check amount would need to match in order to validate the check as trustworthy. The tag/reader system can be used to distinguish an item as a valid check or an invalid check (e.g., unfit for transaction or deposit credit). An invalid check may also be determined or classified by the deposit system as one of not a check (e.g., blank paper), a suspect check, or a counterfeit check.

Furthermore, it should be understood that the use of RFID tags for checks is likewise applicable for other instruments (e.g., currency) that may be deposited. An RFID tag may be on or in currency (e.g., bills or coins). One or more tags may be on each currency item being deposited. A currency tag may include currency data corresponding to the indicia on the currency. For example, the tag data may include currency value (e.g., $50), serial number, country of issue, type of currency, date of printing, manufacturer, location of manufacture, treasurer, and other information. Thus, each respective currency note being deposited may have an RFID tag containing data corresponding to the value of the respective note. The tag may be embedded in the paper of the note or permanently affixed to the note. Contrarily, the tag may be temporarily removably attached to the note (or coin) for later removal therefrom. The tag may be on a removable adhesive label. In further exemplary embodiments, a currency (e.g., bill or coin) reader, validator, and/or counter can comprise an RFID tag reader.

A customer bank card may also have one or more RFID tags. The bank card may include information in RFID tags instead of or in addition to information in magnetic stripes and/or information in a programmable memory of a card (e.g., smart card). That is, magnetic stripe cards and/or smart cards may further include RFID tags. One or more tags may be removably attached or mounted to a card (e.g., thereon or therein). A card tag may be removable. Alternatively, tags may be permanently affixed to a card, such as embedded in a card substrate (e.g., plastic, polymer, film material). A card tag may also be part of a self-adhesive card label.

The card's RFID tags may be read external to a reader device of a deposit accepting machine. Alternatively, the card may be inserted into a reader device (e.g., card reader) associated with a machine, such as into a card slot in the machine fascia. An RFID reader device is operative to read an RFID tag located within a predetermined distance of the RFID reader device. Thus, an RFID reader device can be operative to read an RFID tag whether the tag is located inside or outside (and adjacent to or within range of) the reader device. The RFID reader device may also be operative to read any magnetic stripe or programmable memory of a card inserted into the reader device. For example, a multi reader device may be capable of reading the RFID tag, the magnetic stripe, and the programmable memory of a smart card.

Figure 67:
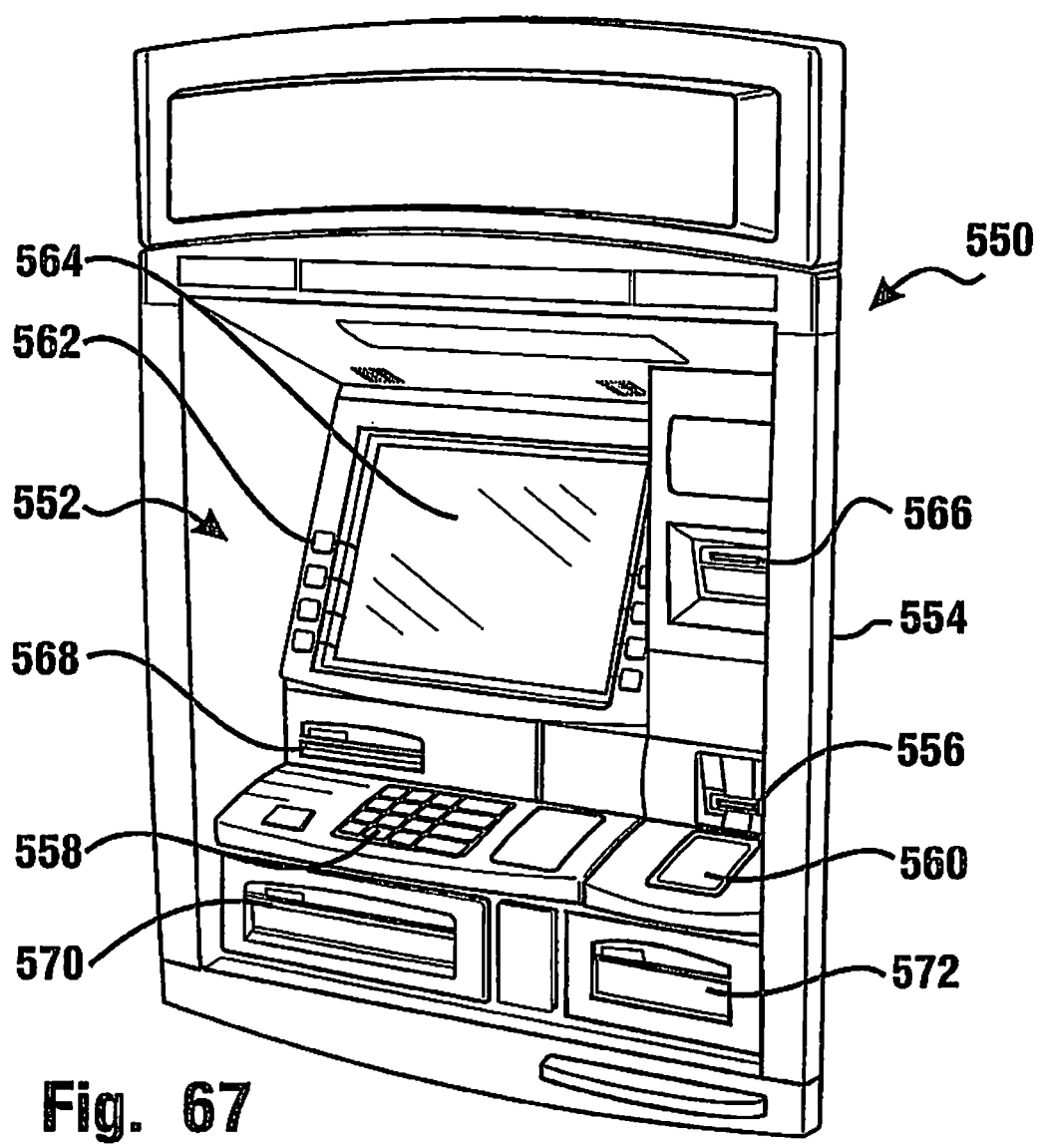
FIG. 67 is an exemplary showing of a deposit accepting machine.

FIG. 67 shows an exemplary deposit accepting machine 550. The machine 550 can be an automated banking machine (e.g., ATM). The machine 550 includes a fascia 552 which serves as a user or customer interface.

The machine 550 further includes a housing 554 which houses certain components of the machine. The components of the machine can include input and output devices. The input devices include an RFID reader device 560. The input devices also include a card reader 556 that is operative to read the magnetic stripe of a customer's card.

The fascia includes a keypad 558, function keys 562, display 564, receipt outlet slot 566, mini account statement outlet 568, and a document (e.g., cash) withdrawal opening 570. A deposit accepting opening 572 is also shown. It should be understood that these features of the described machine user interface are exemplary and in other embodiments the user interface may include different components and/or features and/or arrangements.

FIG. 68 shows the reader 560 of FIG. 67 in remote communication with an RFID tag 580. The tag 580 can include deposit data of a type previously discussed. The reader 560 is operative to interrogate the tag 580 as represented by communication arrows A and B. The reader 560 is operative to transmit (arrow A) a data request to the tag 580. The reader is also operative to receive data transmitted (arrow B) from the tag in the form of signals. A deposit accepting machine controller can control operation of the reader 560. As previously discussed, the tag 580 may be interrogated after it has been deposited in the machine. That is, remote communication between the reader 560 and tag 580 may occur while the deposited tag is in the machine. Thus, even though a deposited RFID tag may be located in a deposit accepting machine (and not remote therefrom), the communication between the RFID tag and the machine's RFID tag reader can occur remotely. Furthermore, as previously discussed, a deposit transaction arrangement may not permit the tag 580 to be interrogated until the deposit (including the deposit items and the tag) has been secured in the machine so that the depositor can no longer access or retrieve the deposited items or the tag. Again, the deposit accepting machine controller may control the machine components and thus operation of the deposit transaction process.

Other exemplary arrangements may be used. For example, a tag may be read prior to the deposit being secured. Upon reading deposit data from a tag, a display may be produced showing the data (e.g., amount of deposit) to the depositor.

The display may request that the depositor confirm whether the deposit should proceed. The confirmation may be input by touching a button on the screen (e.g., touch screen), or pressing a key on a keyboard, or another input process. Upon the machine receiving confirmation from the depositor, the machine may then secure the deposit in the machine so that the deposit can no longer be retrieved. Also, rather than entering a confirmation input, the depositor may enter a cancel deposit transaction input. The machine can then return the deposit to the depositor and cancel the transaction.

A standard type and sized RFID tag may be used for several different deposit items. Alternatively, custom sized tags may be made for selected deposit items or other items. For example, a first sized tag may be used to record deposit data corresponding to a small amount of checks and cash to be deposited. However, a larger custom sized tag may be generated and used for recording the data corresponding to a much larger amount of checks and cash.

Figure 70:
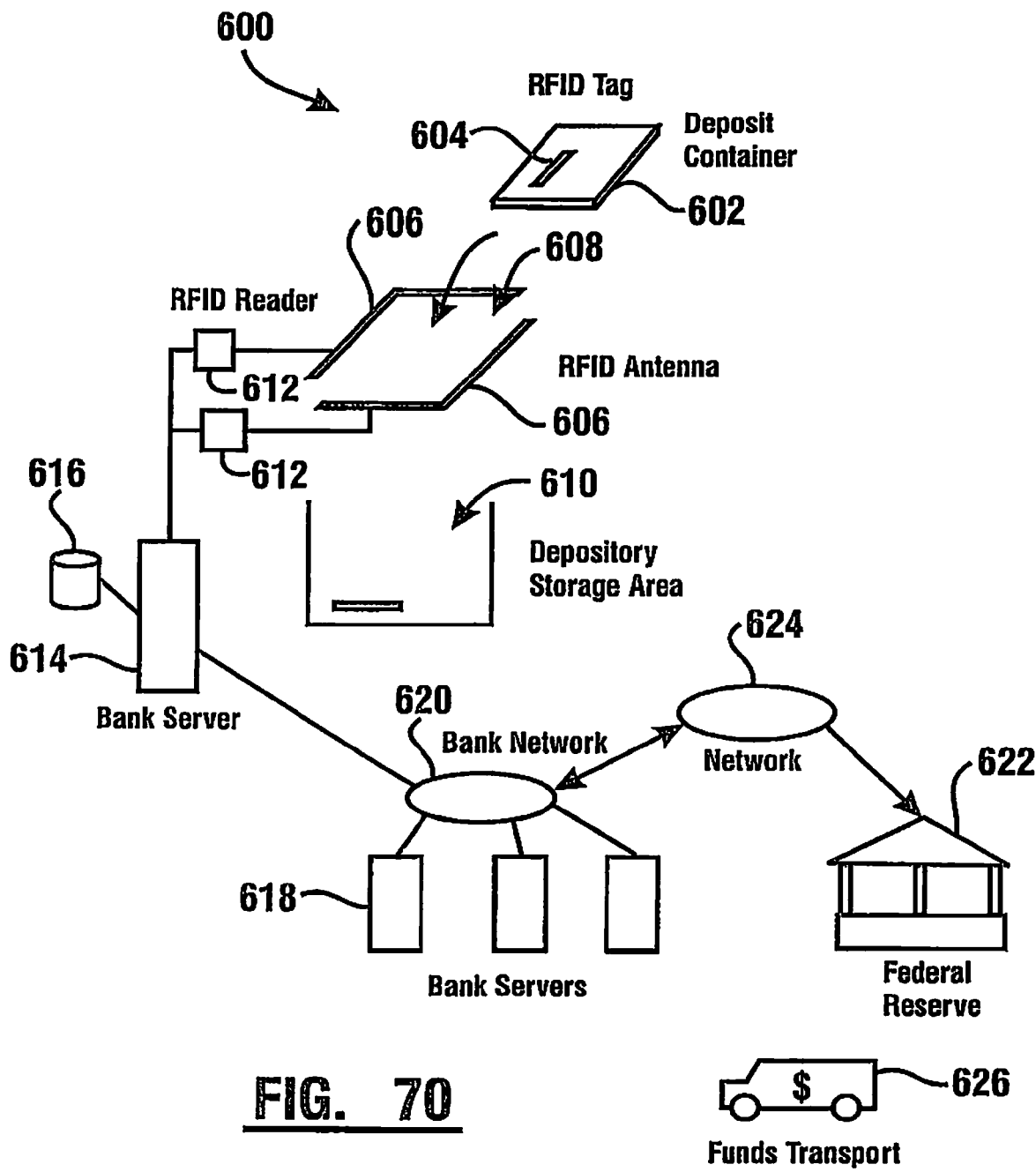
FIG. 70 is a schematic view of an alternative embodiment of a system that accepts deposits.

FIG. 70 schematically represents an alternative system 600 which may be used to carry out methods for receiving deposits. In this exemplary embodiment deposit containers such as deposit bag 602 is received in a depository. In some exemplary embodiments the depository may be of the type like that previously described in connection with third housing 16 of the automated banking machine. In other embodiments the depository may be of another type such as a standalone depository that receives deposits. In some embodiments the machine may be in operative connection with a card reader that reads data from user cards, which corresponds to a financial account to which a value associated with a deposit item is to be credited. An exemplary deposit container 602 is in operative connection with an RFID indicator tag schematically represented 604. RFID tag 604 in some embodiments may be an intregal part of the deposit container. In other embodiments the RFID tag 604 may be an article which provides RFID data which is removably installed in the deposit holding container. In some embodiments the RFID tag 604 may be of the programmable type. In other embodiments the RFID tag may be of a type that outputs predetermined data and is not changeable or otherwise programmable. Of course in other embodiments other approaches may be used.

In the exemplary system 600 the deposit container 602 is received in a depository which includes at least one antenna 606 operative to receive signals corresponding to data transmitted by the RFID tags. In the exemplary embodiment antenna 606 comprises one or more circular or semi-circular antennas which extend in generally surrounding relation of an area 608. Area 608 in some exemplary embodiments may include a throat area similar to throat area 324 previously discussed. The antennas extend on at least portions of all the walls or other structures that define the throat area, and thus generally surround the area. In an exemplary embodiment deposit containers placed in a depository head through an opening of the housing of the deposit accepting device must pass through the throat area 608 in order to reach a deposit storage area 610. In some embodiments the throat area 608 may be below a depository head similar to depository head 54 previously discussed. Alternatively the throat area may be below another mechanism through which a deposit container is accepted. In some embodiments the deposit storage area 610 may be within a chest portion of a secure housing similar to chest portion 62 previously discussed. Of course these approaches are exemplary.

In the exemplary embodiment the RFID antenna or antennas are positioned adjacent to the throat area through which deposit containers pass after being deposited into the depository and before they are positioned in the deposit storage area 610. In this way RFID tags may be read at a time when they are within the depository but before they become positioned in close adjacent relation with deposit items that may contain other RFID tags. In addition the exemplary arrangement enables sensing when the deposit item including the RFID tag is received in the depository. In this way a time associated with receipt of the deposit can be determined by an RFID reader and/or a connected computer.

In the exemplary embodiment RFID antennas commercially available from Intermec Corporation are used. In the exemplary embodiment circular polarized antennas are operative to send data corresponding to the RFID data read from the deposit items to one or more RFID readers 612. The RFID readers 612 include at least one processor and are operative to interpret the signals and determine the data provided by the RFID tags. The one or more RFID readers 612 also include an electronic interface to other computers which enables the data concerning items received to be passed to one or more other computer systems. Of course these approaches are exemplary and in other embodiments other approaches may be used.

In the exemplary system the one or more RFID readers 612 are in operative connection with a bank server schematically indicated 614. Server 614 comprises a computer that is in operative connection with at least one data store 616. In the exemplary embodiment the bank server 614 is operative to receive the information from the RFID tags and to store the data in the at least one data store. In the exemplary embodiment the at least one server has computer software operating therein that is operative to communicate through the interface with the RFID reader or readers, and to resolve the data from the tags on the deposited items. In the exemplary embodiment the RFID tags comprise data bearing records, and the data output by the RFID tags corresponds to information such as the name of the depositor, the depositor's account number and the time of the deposit. Such information may also include in exemplary embodiments, information on checks deposited, credit slips deposited and cash deposited. The information concerning the cash deposited may include for example, the denomination and number of each type of currency bill that is included in the deposit. Likewise deposit data may include the type and number of each type of coin included in the deposit. In exemplary embodiments the bank server is operative to resolve and store the information regarding the deposit including the type, number and amount of each type of currency included therewith in at least one data store. Of course this approach is exemplary and in other embodiments other approaches may be used.

In some exemplary embodiments the deposit may also include information about checks. This may include for example data useful in electronically processing the check transactions. For example the data transmitted may include the micr line data on each particular check, the amount of the respective check, as well as other data that the merchant who received the check has read from the check either with a reading device or visually and then recorded with an input device. Such information may be useful in processing the check and/or settling the payment associated therewith. In still other exemplary embodiments the merchant or other entity who received the check may include with the check data, image data associated with each check. Such image data may be included on a portable storage media included in the deposit item, such as on a portable flash memory. Alternatively or in addition, merchants who receive checks may have scanners at their facility so as to produce image data corresponding to the visual appearance of each check, that along with other data facilitates processing of the check as an electronic image and enables disposal of the paper check. Methodologies used in connection with such activities may include approaches similar to those described in U.S. Pat. No. 7,147,147 the disclosure of which is incorporated herein by reference in its entirety. Further if sufficient data is available from the programmable RFID tag, data corresponding to images of checks may be read through operation of the RFID readers. This may be useful in avoiding the need for further manual processing or image capture by the bank of the deposited checks. Of course these approaches are exemplary and in other embodiments other approaches may be used.

As shown in FIG. 70 in the exemplary embodiment the bank server operates in accordance with its associated programmed instructions to record the data concerning each deposit. Bank server 614 is in operative connection with other bank servers schematically represented 618 through a bank network 620. Bank servers 618 include processors and associated data stores and operate in accordance with their respective programming to carry out various functions. These functions include recording information concerning the deposit, the crediting of depositor accounts, the processing of associated transactions and other functions associated with the deposit or the depositor's account.

In an exemplary embodiment one or more of the bank servers 618 are also operative to execute instructions that determine an amount of cash that each bank facility requires for its operation. This may include for example, determining the denomination and amount of bills and coins that each bank facility is estimated to need for the operation of that facility during the next business day or some other future business period. The bank servers may be operative to calculate the estimated need for various numbers and denominations of cash based on current usage, calculations and projections of future usage and for user inputs.

In exemplary embodiments the bank servers calculate the need for such cash at each bank facility and place orders therefor with a source of cash schematically represented 622. In some embodiments the source of cash may be a Federal Reserve branch that may provide amounts of cash in the various requested denominations to each bank facility. As schematically represented, the bank's servers may communicate information concerning the type and amount of cash needed at each facility to the Federal Reserve through a network 624. Network 624 may be a public or private network suitable for providing communications between the bank servers and the Federal Reserve or other source of cash. In some embodiments network 624 may include the Internet through which communications may be made on a suitable encrypted or secure basis. Of course these approaches are exemplary.

In operation of exemplary embodiments the Federal Reserve or other cash source 622 receives the request for cash from the particular bank and makes such cash available. It should be appreciated that such cash will be transported by an armored truck or other suitable methodology to the particular bank or other facility where the cash is needed. This is represented by a transport vehicle 626. As will be appreciated, in the exemplary embodiment the bank will have determined the number and type of bills and coins that it needs at each facility for its operations during a particular future period. This calculation may be a period of a business day or a portion thereof. Alternatively in some embodiments the period for which the estimate is calculated may be several days. The amount requested may depend on several factors such as how frequently the bank may receive the shipments of cash from the cash source. Also in some embodiments certain bank or other facilities may have checks or other items including cash that they have received, and these items will be transported to the Federal Reserve or other facility. Generally the bank will receive a credit for these items. It should be understood that while the exemplary embodiment is described in connection with bank branches and the receipt and exchange of cash and other items with the Federal Reserve, the principles described may be applied to other situations and facilities which receive items such as deposits and/or which require cash from a cash source.

In accordance with an exemplary embodiment, the ability of a computer system in operative connection with at least one depository to determine the amount and denomination of cash received with each deposit may be useful in reducing the need to transport cash from a cash source to a particular bank facility that has received the deposits. Specifically the capability provided by the exemplary embodiment for the facility or facilities having the depository or depositories, to know the amount of cash included in each deposit at the time it is received, provides the capability for the bank to be immediately aware that cash in the amount and type that has been deposited may be available for use by the bank facility or facilities as soon as the deposit containers are removed from the depository storage areas. The availability of this information may be utilized in calculations executed by the bank's servers to consider the amount available from deposits in making its requests to the cash source for additional funds needed for operations. Thus in an exemplary embodiment for a given banking facility or group of banking facilities the amount of the additional cash that would normally be requested from the cash source can be reduced by the cash on hand that has been received in recent deposits by depositors. This is possible in exemplary embodiments even though the deposits have not yet been opened by bank personnel. Thus the system is able to avoid having to transfer as much cash from the cash source to the bank or to a bank facility based on amounts that are available from deposits that have been received but have not yet been opened. Of course these approaches are exemplary and in other embodiments other approaches may be used.

Figure 71:
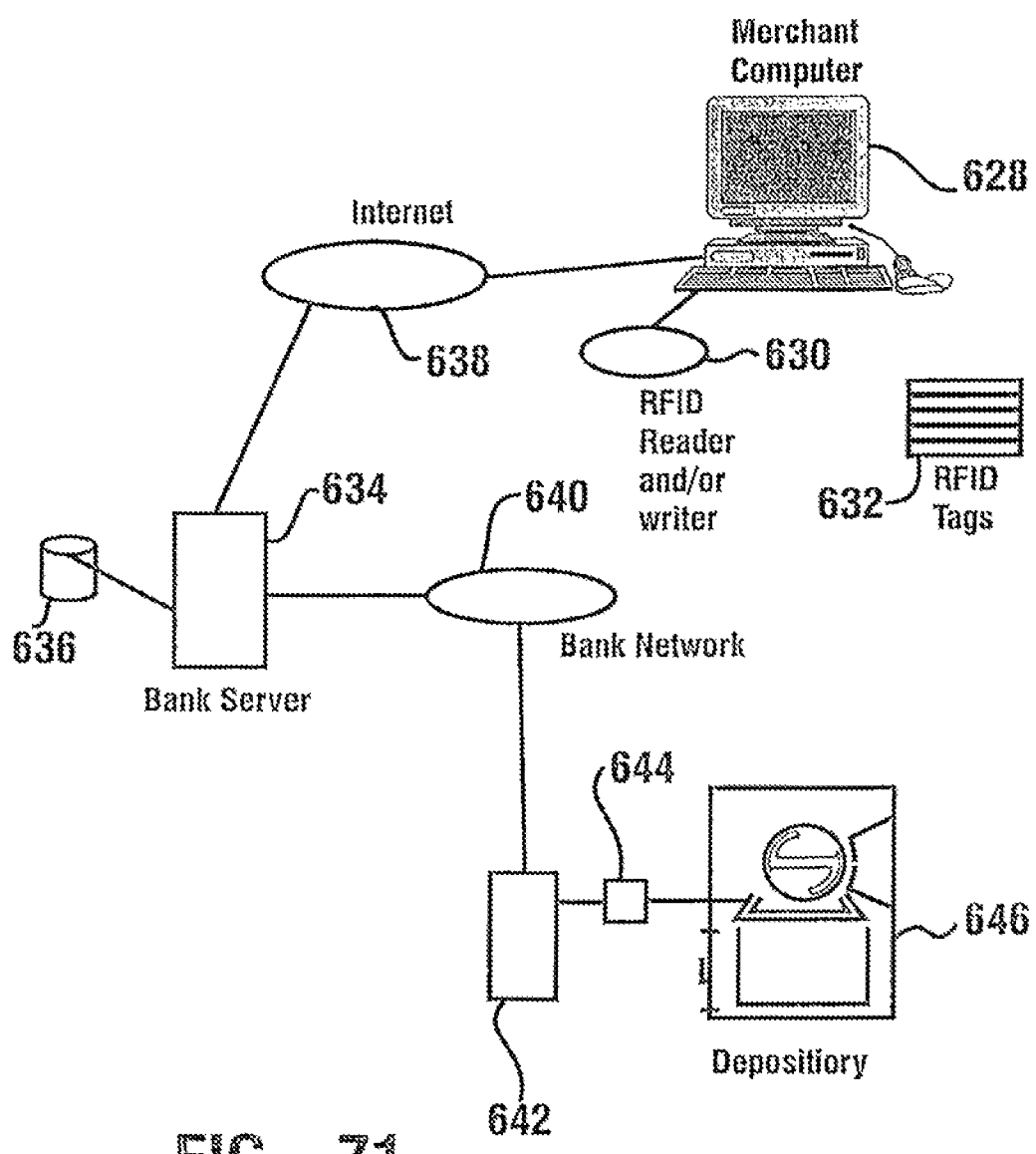
FIG. 71 is a schematic view of an alternative embodiment for tracking deposits using RFID tags.

FIG. 71 schematically represents exemplary methods that may be used by merchants or other depositors in providing the information to the system concerning the content of deposits. In exemplary embodiments a merchant may have one or more computers 628. The merchant computer may include at least one processor and software including computer executable instructions. The computer executable instructions may include software which operates at least one peripheral device 630. Peripheral device 630 may in some embodiments include an RFID reader which is operative to read RFID tags schematically represented 632. In other embodiments device 630 may include an RFID reader/writer that is operative to program programmable type RFID tags.

In some exemplary embodiments the merchant computer 628 may be operated to compile the information necessary to include on a programmable RFID tag that will be included with the deposit items. This may include the types of information previously discussed such as information that identifies the depositor, their account and each of the various numbers and types of deposit items to be included in a deposit. In such embodiments the merchant computer 628 may operate in accordance with its programming to program an RFID tag or other article with such information. The RFID tag may then be included within or on a deposit container. The deposit container may then be deposited in a depository in a manner like that previously discussed.

In some embodiments the at least one merchant computer 628 may also include software which is operative to communicate with one or more bank servers 634. Such bank servers may include one or more processors and one or more data stores schematically indicated 636. Communication between the merchant computer and the bank servers may be carried out through a network 638. Such communications may be encrypted communications carried out through a network such as the Internet. Of course in other embodiments other approaches may be used. The bank server 634 is in operative communication with a private bank network 640 which in the exemplary embodiment is a private network within the bank. Bank network 640 is in operative connection with one or more bank servers 642. Bank server 642 is in operative connection with an RFID reader 644 which is in operative connection with a depository adapted for receiving deposit items 646.

In an exemplary embodiment the merchant computer 628 can communicate to one or more bank servers 634 information about the planned deposit including the deposit item information. This information may be received and stored in at least one data store associated with the bank server. The information may be stored prior to the deposit item being received by a deposit receiving machine operatively connected with the system. In some exemplary embodiments when the deposit item has been received at a depository in communication with the bank network, one or more bank servers may operate to identify the deposit, credit the merchant's account for a value associated with one or more items in the deposit and provide one or more messages back to the merchant computer to indicate that the deposit has been received. Such messages may also include information corresponding to the crediting of the merchant's account for deposited items. In some embodiments the bank system may also make available to the merchant other information concerning the deposit including for example, images associated with the making of the deposit which the merchant user may store in at least one data store associated with the merchant computer. Of course these approaches are exemplary and in other embodiments other approaches may be used.

In some alternative exemplary embodiments the merchant computer may be in operative connection with a peripheral device 630 which is only operative to read data from preprogrammed and generally unchangeable RFID tags. These tags may be low-cost, one-time use tags which include data which is generally unique to the particular tag. Such tags may be a low-cost alternative to programmable tags of the type previously described.

In some exemplary embodiments the merchant computer is used to provide information concerning a planned deposit of a type previously described. The merchant computer is operative to read the data from one of the preprogrammed RFID tags. This data is read through operation of the RFID reader 630 and associated with the information concerning the deposit. The deposit information including the RFID tag data is then transferred to the remote bank server through the network. The RFID tag is included with the deposit that is sent for deposit to the bank.

In this exemplary embodiment the data concerning the deposit and the RFID tag data is stored in at least one server associated with the bank. As a result when the deposit including the RFID tag is sensed as received in a depository through operation of an RFID reader, the at least one computer of the bank is operative to correlate the information about items included in the deposit with the RFID tag data. Systems of some exemplary embodiments may also operate in the manner previously discussed to provide the merchant computer with confirmation of receipt of the data through messages transmitted through at least one network.

An advantage associated with this alternative embodiment is that less expensive, fixed data output RFID tags may be used. In addition in this embodiment the RFID tags included with the deposits need not contain any data concerning the merchant's accounts or other information that might be used for improper purposes in the event the deposit item is stolen. In some embodiments the RFID tags may contain only numerical and/or alphanumerical data which is of no value to a third party who does not have access to the bank's private network. Of course these approaches are exemplary.

It should be understood that although in some embodiments the processes described refer to deposits carried out by a merchant, the principles described may be used with other types of depositors. These may include individuals who make deposits but who are not necessarily merchants.

A bank card RFID tag may also be used in some embodiments to store any of the previously discussed deposit information therein. In an exemplary embodiment, tags can contain much more customer-related data than can be represented by a magnetic stripe type of arrangement. For example, a card tag may also contain information reflective of additional security features and card data. A tag may also carry a unique customer identification number of 32 bits or longer. A tag can be used which enables a card to store more information in a smaller space in comparison to prior art magnetic stripe cards.

An RFID tag can be on a multi use card which has plural distinct RFID tags. The same card may have several RFD tags, each only usable for a specific purpose. For example, one tag may be a deposit tag which is readable by a deposit accepting machine for carrying out a deposit transaction, whereas another tag may be a cash withdrawal tag which is readable by a cash dispensing ATM for carrying out a cash withdrawal transaction, whereas a further tag may be a credit card tag (e.g., having account information) useable in making purchases. The specific use tags may be readable only by specific readers. Also, a multi use card may have a generic RFID data tag which is readable by all RFID reading devices. The generic RFID data tag may include information (e.g., an account number, a PIN or other data) which generic or common to all transactions available with the multi use card.

RFID tags may have read-only or rewritable memory for storage of deposit information. A tag may have fixed or unchangeable data. In such a situation, a combination of plural read-only tags may need to be assigned or attached to a particular deposit component (e.g., bag or card) to fully represent the total deposit information content. A deposit component may also have a combination of read-only and programmable tags.

RFID tags may have a memory which can be changed or modified by authorized personnel or equipment. A tag memory may be changed or reprogrammed to correspond to a respective different deposit. For example, a merchant employee can use a tag programming device that is operative to communicate with an RFID tag to change and/or insert new data therein. The RFID tag programming device may be hand-held.

In other data-loading of tag arrangements, a tag programming device may be combined with another device. For example, a check reader system or scanner may include a tag programming (or reprogramming) device or a tag generator (i.e., for creating initial tag programming). The check reader could read a check and then program an RFID tag (new or used) already on the check with data specific to that check. A check reader system may also read a check, create an RFID tag with data specific to that check, and affix the tag to that check. A check reader system may also have the combined ability to both program existing tags or generate and affix new tags. A deposit accepting machine can include the checker reader system or the check reader system can be a stand-alone device.

In an exemplary embodiment, RFID tags do not require contact (e.g., physical, mechanical, or electrical contact) with a tag reader component. In the exemplary embodiment a depositor can pass or wave the tag (or the item containing the tag) adjacently to or over a scanning area associated with an RFID reader device of a deposit accepting machine to have the tag data (containing deposit information) remotely read. The scanning area can comprise a surface area of a fascia of the deposit accepting machine. A tag reader and an RFID tag can be remotely physically separated or spaced during reading of the tag. The contactless arrangement can prevent damage (wear and tear) to a reader and a machine fascia. Thus, machine down time associated with maintenance and service can be reduced.

Furthermore, other scanning and/or reading arrangements may be used. For example, deposited items such as checks may be on a conveyor or transport during RFID reading thereof. A reader can be relatively positioned above or below the conveyor, which may include a belt. A reader may also be combined with another component in a common device. That is, the device can be operative to provide more than one function. For example, an RFID check reader and a check imaging component may both be in or a part of the same device or system.

With the use of an RFID tag in a card, the physical aspects of a through-the-fascia portion of a contact type card reader interface can be avoided. Thus, the service and/or reliability issues for an RFID card reader can be reduced and/or eliminated. Also, the wear of components (e.g., contact read head, mechanical card transports, and card sensors) associated with conventional contact type card readers can be eliminated. Wear to a user's card can also be reduced.

When an RFID tag is within range of a deposit accepting machine's RFID reader, then reader device circuitry can interrogate the tag to receive information about the particular deposit and/or depositor and/or a depositor's account. The reader may periodically check for an RFID deposit tag. For example, the reader on a predetermined timed basis may transmit a signal and expect a response signal from an RFID tag. If no return signal is received then the reader will later transmit another signal. In alternative embodiments the reader may become active (e.g., transmit a signal) responsive to an initiating action by the depositor. The depositor action can be sensed by the machine/reader as an indication that a depositor may be present. For example, a reader may become active responsive to a depositor touching a keypad, function key, or touch screen. Alternatively, a reader may become active responsive to use of a depository key, or opening of a depository door, or sensing a bag in the machine. Also, a tag may initiate communication with a reader. That is, an RFID deposit tag may notify an RFID reader of its presence.

The reader circuitry may comprise a circuit card assembly including one or more processors. The information communicated or exchanged between an RFID tag and an RFID tag reader may include signals that are encrypted to provide additional security. Thus, a reader may comprise a decoder in decoding circuitry.

In an alternative arrangement more than one RFID tag reader device may be used. For example, a plurality of reader devices may be used to increase the tag reading range of a machine. The plural tag reader devices can be disposed from each other at respective predetermined distances. Plural tag reader devices may also be used to ensure an accurate reading of tag deposit information. These reader devices may be positioned closely adjacent each other to enable a similar reading. The readings from different readers can be compared, such as through the use of statistical analysis. For example, if two of three readings agree, then the matched reading can be determined as the accurate reading. The comparison of readings can also be used to determine faulty readers.

The use of an RFID reader(s) may permit a deposit accepting machine to have a reader device located at a previously unacceptable reader device position. The physical space of an RFID tag reader and any RFID tag reader interface (e.g., card scanning area) can be located at an area of the fascia different from the area previously required for use with previous readers, such as a contact type card reader. Also, all or a portion of an RFID tag reader device can be remotely mounted adjacent to the machine. That is, an RFID tag reader device need not be mounted on the fascia or the machine, but may be disposed from the machine. An RFID tag reader device can be positioned so as to free up fascia space for additional transaction devices, thus increasing a machine's functionality. The freed up space allows other devices to be added to the valuable customer access area. For example, the additional fascia space may be used in some machines for installation of coin acceptor.

An exemplary process of remotely receiving depositor input with a deposit accepting machine system includes generating an RFID deposit tag that has data representative of deposit items to be deposited. Placing the tag in (or on) a deposit bag or on or with a deposit item. Placing items (e.g., cash, coins, checks) to be deposited in the deposit bag. Transporting the item containing deposit bag to a deposit accepting machine, wherein the machine includes an RFID deposit tag reader and a depository. When the bag is within range of the reader, transmitting RF energy (i.e., power) from the reader to the tag. Transmitting the deposit data from the tag to the reader. Inserting the bag into the depository. Printing a receipt reflective of the deposit. Presenting the receipt to the depositor. Of course it should be understood that other exemplary processes of remotely receiving depositor input in carrying out a deposit transaction may be used. For example, as previously discussed, a tag may be located on a check, and opening of a depository door may trip the reader to an active state.

It should also be understood that in the exemplary embodiment, in addition to capturing images from camera 58 and camera 326, during deposit transactions, additional images may be captured during the course of transactions conducted at apparatus 10. For example, camera 28 in housing portion 12 may be actuated at various times during the course of transactions to capture images from users of the apparatus. Such images may be stored in one or more data stores in association with corresponding transaction data related to transactions conducted by users. Such transaction data may be captured and stored by terminal processor 74 or other connected processors, computers or devices which are capable of capturing and storing image and transaction data. As previously discussed, certain exemplary embodiments can operate to capture and store transaction data in the manner of the AccuTrack™ digital video recording and playback system commercially available from Diebold, Incorporated of North Canton, Ohio or described in U.S. Pat. No. 6,583,813, the disclosure of which is incorporated herein by reference in its entirety. Of course, in other embodiments other procedures and approaches may be used.

Figure 51:
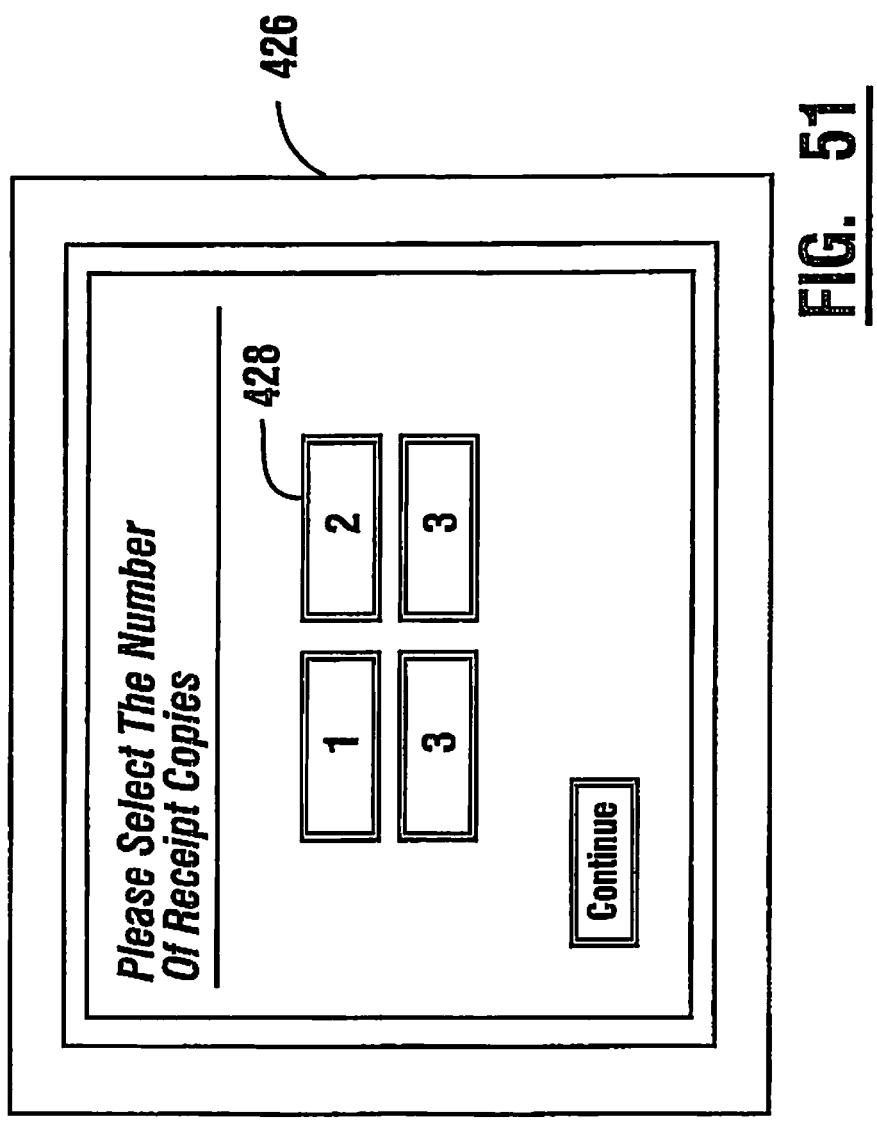

Returning to the description of a bag deposit and the transaction logic associated therewith, the terminal processor in the exemplary embodiment is operative to cause a screen 426 shown in FIG. 51 to be produced on the touch screen after the bag deposit has been made. Screen 426 in the described embodiment may be identical to screen 374 and prompts the user to indicate the number of receipt copies they wish to receive by touching icon 428. As previously discussed, a user may wish to have several deposit receipt copies for purposes of tracking and documenting deposits. Deposit receipts may include machine readable indicia as well as human readable indicia for purposes of facilitating the tracking of deposit transactions.

Figure 52:
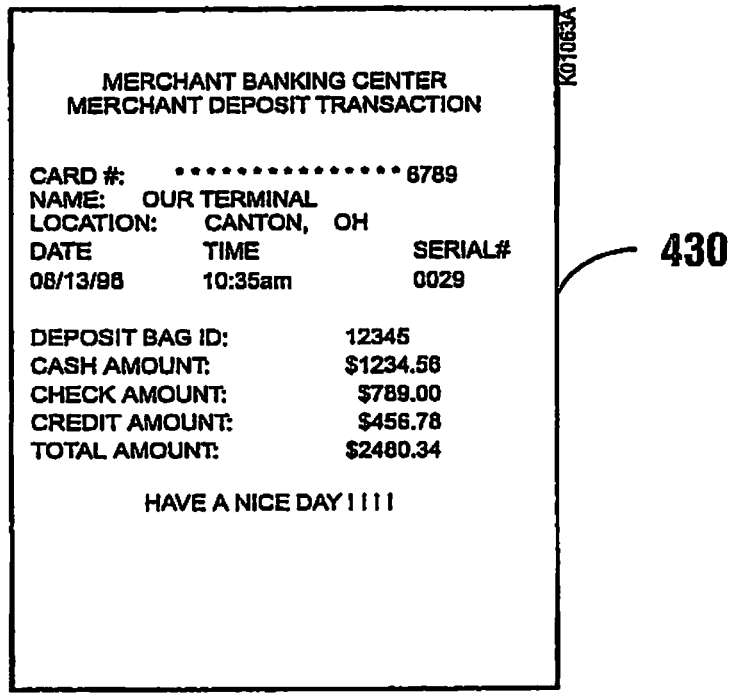
FIG. 52 is an exemplary deposit transaction receipt provided by the apparatus shown in FIG. 1 in connection with a bag deposit transaction.

FIG. 52 shows an exemplary receipt 430 for a deposit transaction. Deposit transaction receipt 430 indicates information regarding the bag deposit transaction including the time and date, bag identification numbers, one or more amounts, terminal, location, card number (if used), and serial number of the transaction. Of course, other information may also be included including machine readable information. The number of receipts requested by the user are produced by the machine responsive to the user input and provided to the user.

A deposit accepting machine can also include a receipt generator that uses RFID tag technology. The receipt generator can prepare or create a receipt that contains an RFID tag. The receipt tag can include information reflective of the deposited items. The machine can program a tag of a paper receipt either before or after the tag is part of the paper receipt. For example, the tag may be already part of the receipt and then programmed with the deposit data. That is, the tag (awaiting programming) is already affixed to or embedded in the receipt paper (e.g., a receipt paper roll includes the tags therein). Alternatively, the tag can first be separately programmed and then affixed to the receipt. Tags already in a receipt paper roll can be spaced in a predetermined manner. If the machine determines that the receipt will need to be longer than the predetermined receipt length then the machine can turn the roll to produce a receipt of double length (with only one or both tags therein used). Alternatively, with the need for a longer receipt, a receipt (without a tag) can first be printed and later a tag (containing the receipt information) affixed to the receipt. The use of separate tags permits custom sizing of receipts. It should be understood that a receipt may comprise materials other than paper (e.g., plastic).

The information inserted into a receipt tag can include more or less data than was printed on the receipt. For example, a novel deposit verification code (which may be encrypted) can be placed in the RFID tag but not printed on the receipt. Alternatively, the code may be printed on the receipt and placed in the RFID tag to ensure that the tag corresponds to the receipt. One or more images of the depositor and/or the items (e.g., deposit bag) securely deposited (e.g., cannot be retrieved by the depositor) in the machine can also be loaded into one or more receipt tags. To guard secrecy, the depositor name, deposited amount, and/or account number may be placed in RFID format but not in printed indicia format. A receipt may also have an RFID tag without any printed indicia. The data in the RFID tag provided with the receipt may also be used to access data of the type described that is accessible from a computer in operative connection with a network.

The machine may also be operative to change or modify (i.e., reprogram) the RFID tag associated with the deposit component (e.g., deposit bag or bank card). Thus, the machine can modify the tag to include the receipt data. That is, the verification (receipt) data for the deposit transaction can by placed into the same tag from which the deposit information originated (i.e., which contained the user's deposit information). The user-supplied RFID tag can also be (used as) the receipt tag. Thus, only one tag may be needed for storing both the deposit data and the receipt data.

FIG. 69 shows a deposit transaction receipt 590 having an RFID tag 592. The receipt 590 is similar to the receipt 430 of FIG. 52, except the receipt 590 additionally includes the tag 592. The receipt tag 592 includes data reflective of at least the indicia information printed on the receipt. It should be understood that a receipt may include an RFID tag without having any receipt data indicia listed thereon.

Other information may be loaded onto the user-supplied RFID tag. For example, tags may be used to track account transactions. Retrievable transaction information can be tracked by being recorded (stored) in the tag. The deposit transaction information may relate to the particular depositor, previous transaction dates and times, amounts of deposit, machine IDs, length of time at machines, and other information.

User preference or marketing information may also be stored in a user's RFID tag. For example, the machine may have access to an advertisement sequence, which may be internally stored in memory thereof. The sequence is to be presented to a user in a specific order (e.g., first message one, then message two, etc.). A tag can be used to keep track of the message sequence. For example, the tag can contain sequence data (e.g., a number value) representative of a message in the sequence. Tag sequence data can be read by the machine to determine which message in the sequence (e.g., the next message in the sequence that has not yet been presented) to play to that specific user at that specific time. The machine can also update the sequence data in the tag.

An exemplary process of providing a deposit transaction receipt includes having a deposit accepting machine comprising an RFID tag generator, a receipt printer, and a computer controller operatively connected to the generator and printer. Generating an RFID receipt tag that has data representative of the deposited items. Placing the receipt tag on paper from a paper roll in the machine. Printing indicia on the receipt, wherein the indicia may be printed on at least a portion of the tag. The printed indicia also includes data representative of deposited items. Separating or cutting the paper receipt from the paper roll. Transporting the receipt in the machine to an output opening where it is accessible to the depositor. Of course it should be understood that other exemplary processes of preparing a deposit transaction receipt may be used. For example, as previously discussed, the printing may occur prior to a tag being placed on the receipt. Alternatively, as previously discussed, the paper roll may already have programmable tags therein or thereon.

Figure 53:
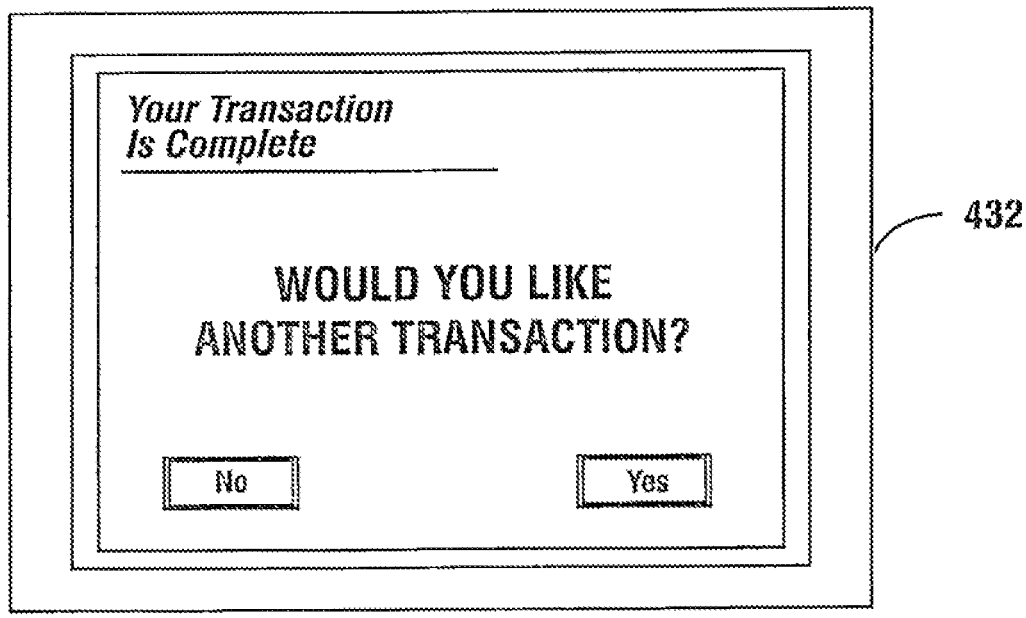
Figure 54:
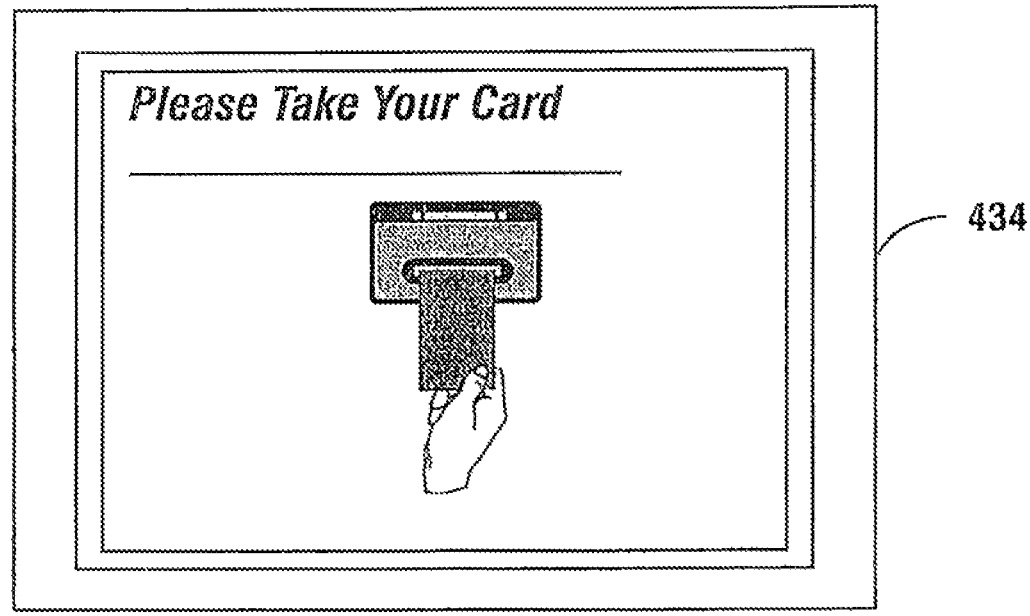

After completing the transaction concerning the deposit (e.g., bag deposit), the terminal processor is operative to cause a screen 432 shown in FIG. 53 to be displayed. Screen 432 prompts the user to indicate whether they wish to have another transaction conducted. If the user selects the icon which indicates they wish to have another transaction, the terminal processor returns the control logic sequence to the point where screen 328 is displayed. If the user indicates that they do not wish to have another transaction, the appropriate closing screens such as those previously discussed, are caused to be displayed by the terminal processor. In addition, if the transaction conducted is a card-based transaction in which a user has input a card, the terminal processor will cause a screen 434 shown in FIG. 54 to be output on the touch screen to remind the user to take their card.

It should be understood that the logic flow associated with the transaction screens described herein is exemplary. In other embodiments other or additional transaction screens may be presented. The inclusion of additional transaction function devices in the apparatus 10 may also require the terminal processor to output additional or different screens and to carry out other logic flows in order to prompt users in the operation thereof.

The exemplary embodiment of the automated merchant banking apparatus further enables authorized users of the machine to access the information stored in the data store 76 concerning transactions conducted at the machine. Such information may be recovered by users of the machine who are authorized to recover such information from the data store. In addition or in the alternative, such information may be reviewed or recovered by other authorized users operating terminals connected to the network 16. Such authorized remote users are enabled by accessing such data to monitor the overall operation of the merchant banking apparatus including the amounts it has received from and dispensed to merchants. In addition merchants themselves may be authorized to access data corresponding to their own transactions as well as corresponding image and account data so they may track activities regarding their account.

Figure 55:
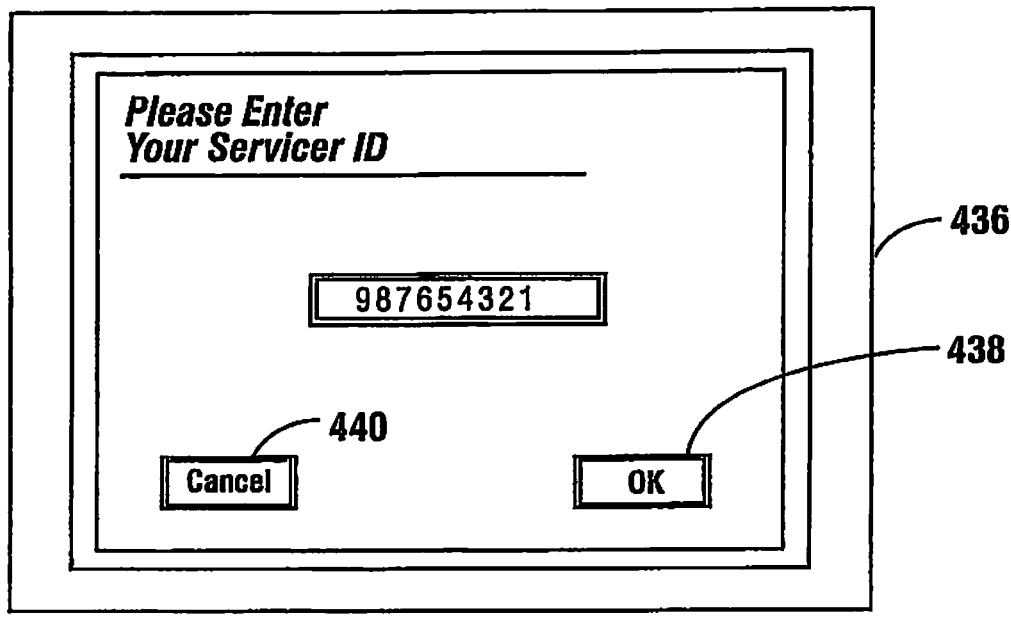
FIGS. 55-56 are exemplary screen displays output by the apparatus shown in FIG. 1 or a remote computer presented in connection with accessing data concerning transactions conducted at the apparatus shown in FIG. 1.
Figure 56:
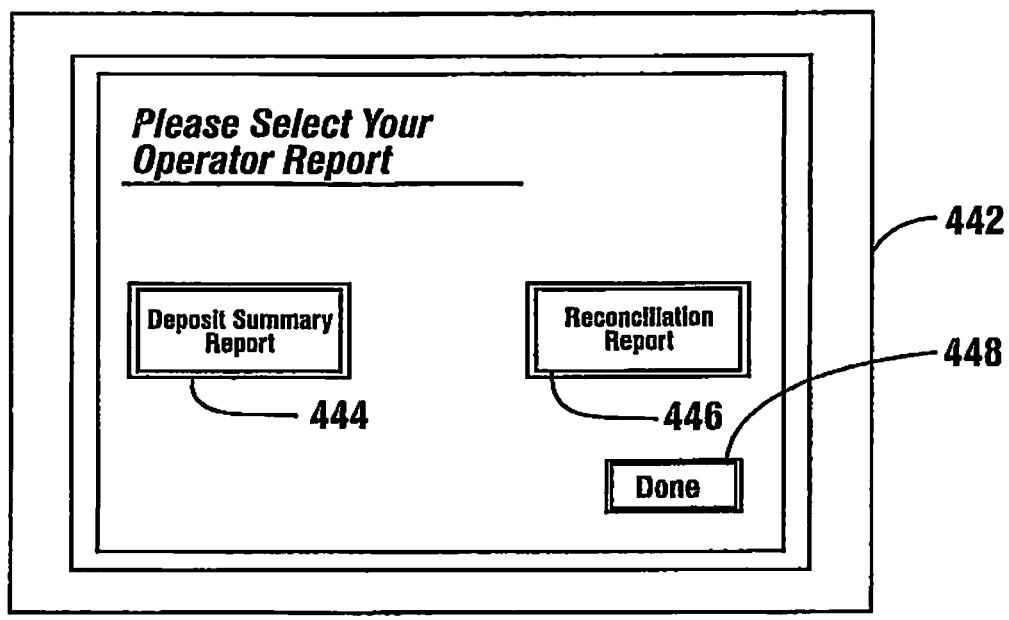

In the exemplary embodiment, authorized servicers are enabled to access data from the data store 76. This process is initiated by inserting a card with special servicer data into the card reader of the machine. The programming associated with the terminal processor responds to reading the indicia encoded on such card. The touch screen displays a screen 436 shown in FIG. 55. Screen 436 prompts the servicer to enter through the keypad 26 a servicer ID which in addition to their card identifies them as an authorized servicer who is permitted to recover data from the data store 76. If the user has properly entered their ID they touch an icon 438. If the servicer makes an error in entering the ID, they touch an icon 440 to cancel. If the identification number entered by the servicer corresponds to the card data as determined by the programming associated with the terminal processor, a screen 442 shown in FIG. 56 is displayed. In the screen 442 the user is presented with the option of printing a deposit summary report represented by an icon 444, as well as the option of printing a reconciliation report as represented by the icon 446. The user also has the option from screen 442 of touching an icon 448 to indicate that they have completed their activities.

If the user touches the icon 446 in response to screen 442, a reconciliation report is printed by the printer 24. An exemplary reconciliation report 450 is shown in FIG. 57. The reconciliation report indicates change dispensed, change available, currency accepted and miscellaneous totals, currency accepted and currency available. The reconciliation report also indicates fees assessed. Reconciliation report is useful for verifying the amount of currency and coin in the machine and for determining whether action is needed to either remove currency from or place additional coin or currency in the machine.

After the reconciliation report is printed, the terminal processor is operative to return to screen 442. If the servicer selects icon 444 from screen 442 a deposit summary report is printed by the printer 24. An example of the deposit summary report 452 is shown in FIG. 59. The deposit summary report 452 includes a summary of deposits that have been made into the apparatus 10. Summary report 452 includes only the total amount of deposits made.

Alternative embodiments may also be operative to print detailed reports of transactions conducted at the machine. For example, authorized servicers or persons with local or remote authorized access to data store 76 may access a detailed transaction log of all the different transactions conducted at the apparatus. Such reports may include, for example, a detailed transaction report such as report 454 shown in FIG. 58. Such a report may show selected or all details concerning deposit transactions or other types of transactions that have been conducted.

In addition to printing the various reports through the printer at the machine, embodiments may provide the capability of loading transaction reports or records in machine readable form. This may be done, for example, by recording data on a recording medium such as a smart card inserted into the card reader. Alternatively, such transaction logs may be recorded onto a computer disc, CD, or other recording medium that is inserted into an appropriate recording device on or in connection with the apparatus 10. Information regarding transactions conducted may be recorded on the recording medium for later analysis by appropriate personnel.

In the exemplary embodiment, authorized users operating terminals connected to the network 16 may be authorized to obtain information from data store 76 concerning the transactions that have been conducted. These may include, for example, terminals operated by employees of the entity which owns apparatus 10 and which tracks account activities by all of the users thereof. In the alternative, merchants themselves may be authorized to gain access to the network 116 and may access the stored data corresponding to their particular transactions. Of course, it should be understood that the transaction reports shown herein are exemplary and various types and formats of reports may be produced.

The merchant banking apparatus and its method of operation described in this exemplary embodiment enables merchants to carry out banking transactions which are not achievable using conventional automated teller machines. The described embodiments provide for attending to the needs of merchants and provides more convenient banking hours for merchants. In addition, the exemplary embodiment provides for carrying out merchant transactions with heightened levels of security and with provisions for closely monitoring and tracking such transactions in a manner commensurate with the increased amount of value such transactions may involve.

The exemplary embodiments also allow for the wireless communication of information to be applied in the periodic balancing (reconciling, an accounting) of cash dispensing automated banking machines. The balancing process allows for the checking/verifying of whether the cash amount currently in the machine plus the amount of cash dispensed (since the last balancing) matches the cash previously allocated to the machine at the time of the last cash balancing.

An exemplary automated banking machine can store information about its prior cash balancing. The starting amount of cash can be indicated to the machine. Alternatively, the machine itself (via note stack sensors) can determine or calculate its starting cash amount.

Machine balancing can involve obtaining from the machine, information about the previous cash balance in the machine. During the previous machine balancing process, cash was likely added to the machine. Thus, the information obtained can include the amount of tangible cash in the machine as a result of the last balancing. For example, the information may comprise the total number of notes that were present in the machine in each of the denominations of 50 s, 20 s, 10 s, 5 s, etc.

The exemplary automated banking machine can also track its dispense activities as it operates. That is, the machine can keep (internal) records regarding each transaction, and how much money (cash) was dispensed. The dispense data can include the number and denomination of the notes dispensed. The machine can print the dispense data in a journal or as a receipt.

In an exemplary balancing process, a cash handler takes all of the cash out of the machine, such as by removing all of the currency cassettes. The cash handler also obtains from the machine, a printed (paper) record of the cash amount the machine started with, along with the type and amount of bills that the machine dispensed. The currency cassettes and the dispense record are then taken to a cash handling facility for review. The removed cassettes are opened, and the amount of money in each cassette is counted. A determination is made whether all of the currency notes are accounted for by comparing the amount the machine started with, the machine's recorded dispense amount, and the amount of notes removed from the machine. There is a problem if the machine is out of balance. The problem may be the result of a malfunctioning machine or a theft by a cash handler.

In another exemplary balancing process, a cash handler does not have to transport the cassettes. Instead, the cash handler can just open the machine and then empty the entire contents of the cassettes into a first deposit bag(s). They can then load (new) cash into the cassettes to fill them up, close the machine, and then reinitialize it. The process still includes obtaining machine data concerning how much cash the machine started with, and how much cash was dispensed since the last time the machine was loaded (or balanced). However, the first (unload) deposit bag includes at least one data storage device that is configured to wirelessly receive data from the machine. For example, the at least one data storage device can comprise a memory, an RFID tag, and/or an NFC device (e.g., component, chip, chip component, etc.). The machine is configured to wirelessly provide to the at least one data storage device, its stored recorded information regarding its starting cash amount(s) and its dispensed cash amount(s). As a result, the cash handler does not need to obtain a printed (paper) record of this recorded information from the machine. A digital record can be obtained.

A second (load) deposit bag includes bricks of cash that will be inserted in the machine. The loaded bag includes a data storage device (e.g., an RFID tag or NFC chip) which holds loading information. For example, the loading information can include data about the particular machine to which the bills are to be inserted, data about the number and types of bills, and other data (e.g., ID of the person responsible for transporting the bills to the machine). The cash handler can use this deposit bag to load the bills therefrom into their correct positions in the machine. The loading information from the bag's data storage device (memory) is wirelessly downloaded to the machine. That is, the balancing process can include wirelessly notifying the machine of the total amount of cash that is present in the machine. As a result, the machine has a record of how many bills have been loaded and their denominations. Thus, a new baseline from which to begin cash dispensing is provided to the machine.

As can be appreciated, the second (load) deposit bag can perform (encryption) handshaking with the machine. In a handshaking example, the machine can indicate to the bag that it has received the loading information from the bag, etc.

The cash handler can put the second (load) deposit bag in the first (unload) deposit bag, seal it, and return it to the cash handling facility. During the "balance" process at the cash handling facility, the cash removed from the machine is counted, and the machine's recorded information (e.g., starting cash amount and dispensed cash amount) is obtained from the first (unload) deposit bag's data storage device. The total of the counted amount plus the dispensed amount can then be compared to the starting cash amount to determine whether the amounts agree.

An alternative exemplary embodiment to this balancing approach includes using only a single deposit bag to: carry all of the cash to be loaded into the machine; wirelessly provide the loading data to the machine; wirelessly receive the recorded information from the machine; and carry all of the cash removed from the machine.

Another alternative exemplary embodiment to the balancing process includes using an intermediate (shared) storage arrangement. Instead of carrying the data (loading data and recorded information) in the memory of the deposit bag(s), the data can be stored in a remote data store system, such as in a "cloud". A deposit bag's memory can include identifying data for the particular bag. This bag identifying data can be (wirelessly) read/received by the machine during cash loading. This bag identifying data can be used by the machine (or a host, a data server, etc.) to determine where the complete loading data is located in the remote storage or cloud system. Likewise, a deposit bag's memory can (wirelessly) receive machine identifying data from the machine. This machine identifying data can be used by the cash handling facility (or a data server, etc.) to determine where the complete recorded information is located in the remote storage or cloud system. Of course this same data (regarding the loading data and the recorded information) may be stored in different places, including both in memory of the bag(s) as well as duplicated in the remote data storage system.

In a further alternative exemplary embodiment, instead of the balancing data being in the memory of a deposit bag, the data can be stored in a portable mobile device that is carried by the cash handler. The portable device (instead of the deposit bag) can wirelessly communicate with the automated banking machine during a cash loading/balancing operation. The secure communication can include (encrypted) identification handshaking with the machine. The portable device can include a communication application that allows it to communicate with at least one processor of the machine. The portable device can be of various portable formats. For example, the portable device can comprise any of: a mobile phone (e.g., cell phone, smart phone, iPhone®, etc.), a portable computing device (e.g., laptop computer, notebook computer), pager, personal digital assistant (PDA), electronic/digital wallet, e-reader, Blackberry device, Bluetooth device, iPod®, iPad®, tablet device, slate device, MP3 device, GPS device, magnetic induction devices, other types of mobile communication devices, etc.

During the balancing operation, data (e.g., loading data) can be communicated from the portable communication device to the machine. Likewise, data (e.g., recorded information) can be communicated from the machine to the portable communication device. The portable communication device includes a data store (e.g., a programmable memory) that holds data that is to be provided to the machine. The data store can also hold data that is received from the machine. The machine can include a data reader that is operable to wirelessly read the data from a portable communication device such as a deposit bag.

As previously discussed, a cash handling container (e.g., a deposit bag) can use various data storage formats for storing data and various communication formats for communicating data. For example, a bag can include and/or be involved with any of: a bar code, magnetic stripe, smart chip features, inductance/capacitance tokens, flash memory, SD card, memory stick, electronic ink, optical indicia, holograms, UV, infrared (IR), mobile (cellular) frequencies, encrypted data, fobs, radio signals, Internet, satellite, WiFi, WAP, GPS, Blackberry, iPod®, Bluetooth, microwave, RF-type communication, RFID, NFC, etc.

An exemplary automated banking machine keep a record regarding the amount of money (cash) that remains in (is currently stored in) the machine. For security reasons, the machine (e.g., a bank lobby ATM) may have its cash removed every evening. The next morning a known amount of cash is loaded into the machine. A cash handling container (e.g., a flexible bag) can be used to hold the removed cash. The cash handling container includes a data receiver that is operable to wirelessly receive data communicated by the machine, including cash remaining data corresponding to the amount of cash that remained in the machine. The cash data can also include the number and denomination of the remaining notes. During a balancing process, the received cash amount in the cash data can be compared to the counted cash-amount of the physical cash that was placed in the container. Thus, cash data that is wirelessly transmitted from the machine to the container can comprise various types of cash data, including cash remaining data, cash dispense data, cash loaded data, cash date data, cash needed data, cash type data, etc.

Figure 72:
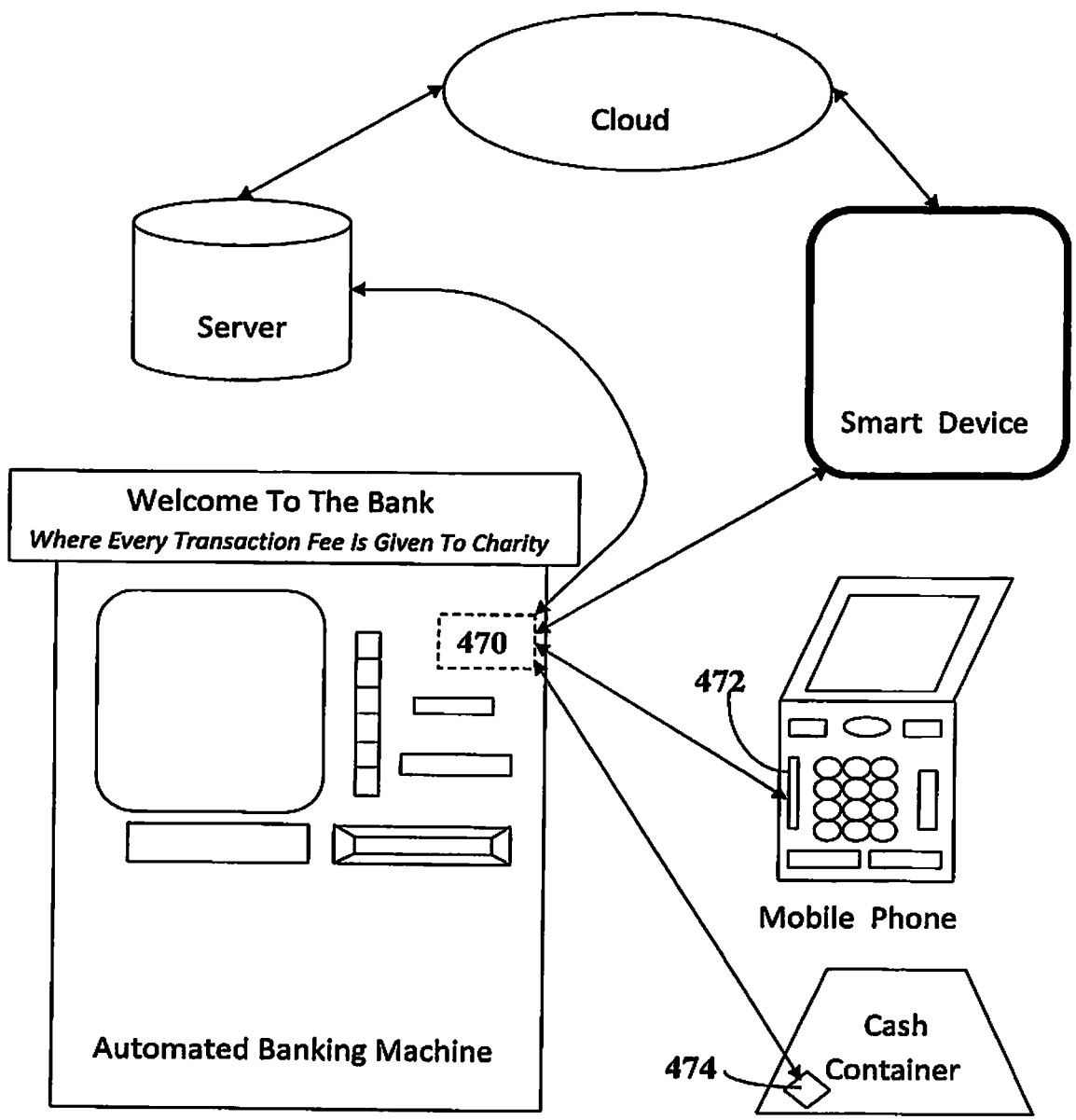
FIG. 72 shows wireless communication between an automated banking machine and a portable communication device.

FIG. 72 shows (two-way) wireless communication between portable communication devices and a cash dispensing automated banking machine (e.g., ATM) during a cash loading/balancing operation. The machine is operable to communicate data with one or more portable devices during a cash balancing process. The machine can include at least one communication device 470. A communication device can include at least one data reader, at least one processor, etc. As previously discussed, the at least one data reader can include various types of wireless readers, including a RF reader, an NFC reader, magnetic reader, etc.

As shown, the machine is operable to communicate directly with each of a cash container (e.g., a flexible deposit bag), a mobile phone, and a smart device (e.g., a smart phone, tablet, etc.). As previously discussed, each of the machine, cash handling container, mobile phone, and smart device has a data storage structure (e.g., memory) for storing data related to the cash balancing operation. For example, the cash transport container can include an NFC chip 472 that is configured to store data. The mobile phone can include a programmable RFID tag 474. The smart device can include an internal data storage device (e.g., flash memory). It should be understood that in other embodiments other storage arrangements can be used. For example, the cash transport container can alternatively (or in addition) have an RFID tag.

As previously discussed, a cloud storage arrangement can also be used in the communication of cash balancing data. A storage cloud can be used to store data received from both the automated banking machine (e.g., ATM) and a smart device. The storage cloud may include one or more remotely located servers associated with data stores. As shown in FIG. 72, the smart device can provide (e.g., via NFC) the machine with identifying data corresponding to particular cash loading data that is stored in the storage cloud. The identifying data may also indicate where the data is located in the cloud. The machine can then use this received identifying data to obtain the complete cash loading data from the storage cloud. The machine may communicate with at least one server (e.g., a machine host) in accessing the cloud. Alternatively, the machine may communicate with the cloud without an intermediate server(s).

In a similar manner, the machine can provide (e.g., via RF signals, etc.) the smart device with identifying data which corresponds to cash dispense information that was previously stored in the cloud. The smart device can then use this received identifying data to wirelessly access the total cash dispense information from the storage cloud. Thus, cash balancing data can be properly obtained with limited direct communication between the smart device and the machine.

Figure 73:
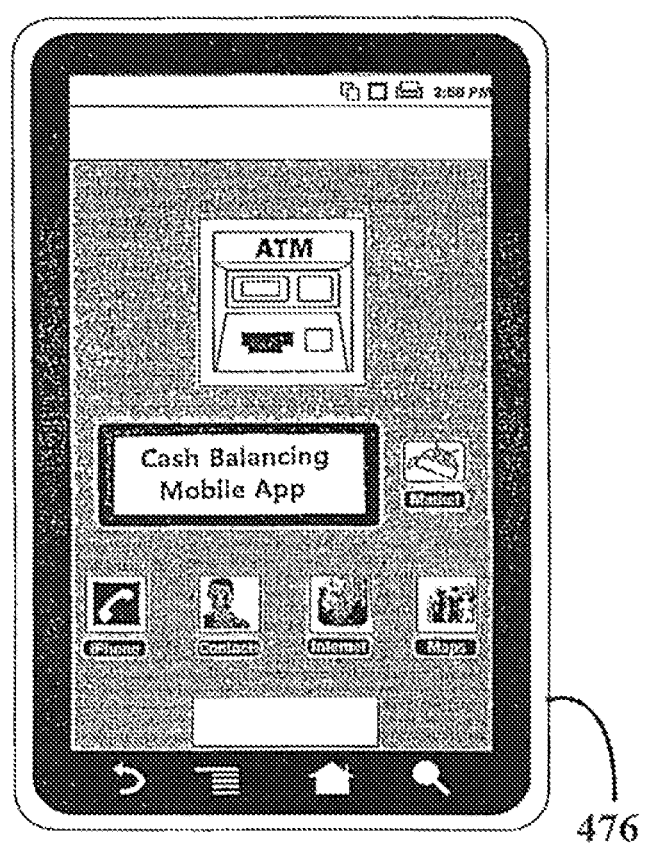
FIG. 73 shows a smart device that is configured to send and receive cash data during a cash balancing operation involving an automated banking machine.

FIG. 73 shows a smart device 476 (e.g., a smart phone) loaded with a cash balancing application. The specific application allows a cash handler to use the smart device to securely communicate data with the machine and/or cloud. Data received by the smart device (from the machine and/or cloud) can be downloaded to one or more computers at the cash handling facility.

Again, an exemplary arrangement includes an automated banking machine and at least one manually transportable container that is configured (sized) to physically hold currency notes therein. Both the machine and each cash container can include a communications arrangement. A communications arrangement can include various device and formats for communicating data, including those already discussed. For example, an exemplary communications arrangement can wirelessly transmit and/or receive data. In an exemplary embodiment, a communications arrangement can include any of a data transmitter, a data receiver, a data transmitter/receiver, and a transceiver. As previously discussed, the communications arrangement can include various communication interfaces, formats, and/or protocols, including those involving RF, NFC, Bluetooth, microwave, UV, infrared (IR), WiFi, WAP, MP3, GPS, PDA, Blackberry, radio signals, Internet, HTTP, HTML, satellite, electronic ink, optical indicia, holograms, mobile (cellular) frequencies, encrypted data, fobs, magnetic, inductance, capacitance, electromagnetic, electronic, bar codes, magnetic stripe, smart chip features, flash memory, SD card, memory stick, mobile phone (e.g., cell phone, smart phone, iPhone®, etc.), portable computing device (e.g., laptop computer, notebook computer, smart phone), pager, electronic/digital wallet, e-reader, iPod®, iPad®, tablet device, slate device, and/or other types, etc.

Each data transmitter/receiver can wirelessly transmit and wirelessly receive signals as previously discussed, such as RF, NFC, and/or microwave signals. Thus, an exemplary cash container is operable to wirelessly receive data (e.g., cash dispense data) that was wirelessly transmitted by an automated banking machine. Likewise, the automated banking machine is operable to wirelessly receive data (e.g., cash loading data) that was wirelessly transmitted by one or more cash containers. The transmission of data may be active or passive. For example, a signal received by a cash container from an automated banking machine may provide enough power to allow the container to output (transmit) its stored data (e.g., cash data, ID data, servicer data, etc.). This outputted data can then be received (read, captured, etc.) by the machine.

Both the machine and cash container can include at least one data store. A data store may comprise memory, including programmable memory. A data store may also be passive or active. Both the machine and cash container are operable to store received data in their at least one data store. For example, both the machine and cash container can include at least one data handling component (e.g., a processor, an electronic circuitry, a controller, etc.) that is operable to cause received data to be placed in the at least one data store. The at least one data handling component may be analog or digital.

As can be appreciated, the exemplary arrangement allows for a cash container and an automated banking machine to communicate (e.g., exchange data) with each other. The automatic communication of data between machine and container can free a cash handling person from having to manually collect this data. Thus, the exemplary arrangement can reduce the time needed to load cash into an automated banking machine. This reduction in time can result in several benefits, including increases in cost savings, security, and machine availability to customers.

Thus, the new and improved features and relationships achieve at least one of the above stated objectives, eliminate difficulties encountered in the use of prior devices and systems, solve problems, and attain the desirable results described herein.

In the foregoing description certain terms have been used for brevity, clarity and understanding. However, no unnecessary limitations are to be implied therefrom, because such terms are used for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art capable of performing the recited function, and shall not be limited to the structures or methods shown herein or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

Having described the features, discoveries, and principles of the invention, the manner in which it is constructed and operated, and the advantages and useful results attained; the new and useful structures, devices, elements, arrangements, parts, accommodations, combinations, processes, systems, equipment, operations, methods, and relationships are set forth in the appended claims.

We claim:
1. An apparatus, comprising:
a processor;
a reader,
  wherein the reader is operable to read user data usable by the processor to identify an association between user data read by the reader and a financial account;
a cash dispenser,
  wherein the cash dispenser is operable to selectively dispense cash from stored currency notes to users authorized to request financial transactions based at least in part on user data read by the reader;
a data store; and
a wireless receiver;
wherein the wireless receiver is operable during a cash loading operation involving the cash dispenser to wirelessly receive cash loading data which corresponds to an amount of cash to be loaded in the cash dispenser during the cash loading operation, from a portable device; and
wherein the processor is operable to store the cash loading data in the data store.

2. The apparatus according to claim 1 wherein the cash loading data is received from a manually transportable container configured to hold currency notes therein.

3. The apparatus according to claim 2 wherein the manually transportable container comprises a flexible cash transport bag.

4. The apparatus according to claim 1, further comprising a transmitter;
  wherein the data store includes cash data, the cash data includes one of a group consisting of:
    cash dispense data which corresponds to an amount of cash dispensed by the cash dispenser since a prior loading of cash into the cash dispenser, and
    cash remaining data which corresponds to an amount of cash remaining in the cash dispenser since the prior loading of cash into the machine;
  wherein the transmitter is operable to wirelessly transmit the cash data to the portable device.

5. The apparatus according to claim 4, wherein the cash data in the store comprises cash dispense data, and
  wherein transmitter is operable to wirelessly transmit the cash dispense data.

6. The apparatus according to claim 5, wherein the cash dispense data comprises cash dispensed data for a plurality of denominations.

7. The apparatus according to claim 4, wherein the cash data in the data store comprises cash remaining data; and
  wherein the transmitter is operable to wirelessly transmit the cash remaining data.

8. The apparatus according to claim 7, wherein the cash remaining data comprises cash present for a plurality of denominations.

9. The apparatus according to claim 7, wherein the cash data in the data store further comprises an initial amount of cash in the dispenser; and
  wherein the transmitter is operable to wirelessly transmit the initial amount of cash in the dispenser.

10. The apparatus according to claim 1, wherein the cash loading data comprises data identifying machine to be loaded, number and denominations of bills, and an identification of cash handler.

11. The apparatus according to claim 1, wherein the cash loading data comprises data identifying a cash loading device and data identifying a remote computer where additional loading data is located.

12. The apparatus according to claim 1, further comprising a transmitter;
  wherein the transmitter is operable to wirelessly send balancing data to the portable device during a cash unloading transaction.

13. The apparatus according to claim 12, wherein the balancing data comprises data identifying a remote server for obtaining cash dispense data.

14. The apparatus according to claim 12, wherein the processor is operable to obtain cash dispense data from a remote server; and
  wherein the transmitter is operable to wirelessly send the cash dispense data.

15. The apparatus according to claim 1, wherein the receiver includes a radio frequency (RF) component operable to receive RF signals that include the cash loading data.

16. The apparatus according to claim 1, wherein the receiver includes a near field communication (NFC) component operable to wirelessly receive NFC signals that include the cash loading data.

17. A non-transitory, tangible computer readable medium having instructions encoded thereon for execution by a processor and when executed operable to:
  obtain user data from a reader that is usable by the processor to identify an association between user data read by the reader and a financial account;
  selectively dispense cash from stored currency notes associated with a cash dispenser to users authorized to request financial transactions based at least in part on the user data read by the reader;

operate a transmitter to wirelessly send balancing data to a portable device during a cash unloading transaction involving currency notes associated with the cash dispenser.

18. The computer readable medium according to claim 17, wherein the balancing data comprises data to identifying a remote server for obtaining additional balancing data.

19. The computer readable medium according to claim 17, wherein the balancing data comprises data representative of an initial balance at a predetermined time and data representative of cash dispensed since the predetermined time.

20. The computer readable medium according to claim 17, wherein the instructions are further operable to wirelessly receive from the portable device cash loading data which corresponds to an amount of cash to be loaded in the cash dispenser during the cash loading operation; and wherein the processor is operable to store the cash loading data in a data store.

21. The computer readable medium according to claim 17, wherein the cash loading data comprises data identifying a cash loading device and data identifying a remote computer where additional loading data is located.

22. A non-transitory, tangible computer readable medium having instructions encoded thereon for execution by a processor and when executed operable to:

during a cash loading transaction, wirelessly send data representative of cash being loaded into an automated teller machine (ATM); and during a cash unloading transaction, wirelessly receive balancing data from the ATM;

wherein the cash loading data comprises data identifying an ATM to be loaded, number and denominations of bills, and identification of a cash handler; and wherein the balancing data includes one of a group consisting of:

cash dispense data which corresponds to an amount of cash dispensed by the ATM since a prior loading of cash into ATM, and cash remaining data which corresponds to an amount of cash remaining in the cash dispenser since the prior loading of cash into the machine that is being unloaded.

23. The computer readable medium according to claim 22, wherein the balancing data comprises data identifying a remote server for obtaining cash dispense data.

* * * * *